(12) United States Patent
Sekii et al.

(10) Patent No.: US 8,284,515 B2
(45) Date of Patent: Oct. 9, 2012

(54) FLUID DYNAMIC PRESSURE BEARING DEVICE, SPINDLE MOTOR AND DISK DRIVE APPARATUS

(75) Inventors: Yoichi Sekii, Kyoto (JP); Hironao Sasaki, Kyoto (JP); Takuro Iguchi, Kyoto (JP); Hironori Ando, Kyoto (JP); Toshihiro Akiyama, Kyoto (JP); Takunori Shinao, Kyoto (JP); Yuichi Shigematsu, Kyoto (JP); Yasutaka Ino, Kyoto (JP); Tatsuyoshi Nakatani, Kyoto (JP)

(73) Assignee: Nidec Corporation, Kyoto (JP)

(*) Notice: Subject to any disclaimer, the term of this patent is extended or adjusted under 35 U.S.C. 154(b) by 0 days.

(21) Appl. No.: 13/197,820

(22) Filed: Aug. 4, 2011

(65) Prior Publication Data

US 2011/0299193 A1 Dec. 8, 2011

Related U.S. Application Data

(63) Continuation-in-part of application No. 12/765,122, filed on Apr. 22, 2010, which is a continuation-in-part of application No. 12/400,884, filed on Mar. 10, 2009, now Pat. No. 8,144,423.

(30) Foreign Application Priority Data

| Mar. 11, 2008 | (JP) | 2008-060769 |
| Apr. 23, 2009 | (JP) | 2009-105583 |
| Dec. 22, 2009 | (JP) | 2009-290163 |
| Dec. 24, 2010 | (JP) | 2010-287815 |

(51) Int. Cl.
*G11B 17/08* (2006.01)

(52) U.S. Cl. ............... 360/99.08; 360/98.07; 360/271.3; 384/110; 384/123

(58) Field of Classification Search ............... 360/98.07, 360/99.04, 99.08, 271.3; 384/110, 114, 119, 384/121–123, 132
See application file for complete search history.

(56) References Cited

U.S. PATENT DOCUMENTS 6,154,339 A * 11/2000 Grantz et al. ............... 360/99.08

OTHER PUBLICATIONS

Sekii et al.; "Fluid Dynamic Pressure Bearing Device, Spindle Motor and Disk Drive Apparatus"; U.S. Appl. No. 12/400,884, filed Mar. 10, 2009.
Sekii et al.; "Fluid Dynamic Pressure Bearing Device, Spindle Motor and Disk Drive Apparatus"; U.S. Appl. No. 12/765,122, filed Apr. 22, 2010.
Iguchi et al.; "Method of Manufacturing Spindle Motor, and Spindle Motor"; U.S. Appl. No. 12/277,328, filed Nov. 25, 2008.

* cited by examiner

*Primary Examiner* — Allen Heinz
(74) *Attorney, Agent, or Firm* — Keating & Bennett, LLP

(57) ABSTRACT

A fluid dynamic bearing mechanism includes a stationary shaft, a sleeve portion arranged to rotate with respect to the shaft, and a thrust portion including an upper end surface arranged oppose to a lower end surface of the sleeve portion. An inside surface of the thrust portion includes an inside surface contact portion arranged in contact with an outside surface of the shaft, and an inside surface lower non-contact portion spaced away from the outside surface of the shaft, and arranged to extend downward from a lower end of the inside surface contact portion. An outside surface of the thrust portion includes an outside surface inclined portion arranged in contact with an interface of a lubricating oil. The lower end of the inside surface contact portion is arranged at a level axially higher than that of a lower end of the outside surface inclined portion.

14 Claims, 50 Drawing Sheets

FLUID DYNAMIC PRESSURE BEARING DEVICE, SPINDLE MOTOR AND DISK DRIVE APPARATUS

BACKGROUND OF THE INVENTION

1. Field of the Invention

The present invention relates to a fluid dynamic pressure bearing device, a spindle motor provided with the bearing device and a disk drive apparatus provided with the spindle motor. The present invention also relates to a bearing mechanism using fluid dynamic pressure, a spindle motor, and a disk drive apparatus.

2. Description of the Related Art

In recent years, a storage disk drive apparatus has been used in a personal computer, a car navigation and so forth. The storage disk drive apparatus is required to have increased density while also being small-sized, low-profile and lightweight. Demands for a high rotation number and a highly accurate rotational operation exist in a spindle motor used in rotating disks.

A conventional fluid dynamic pressure bearing device includes a conical dynamic pressure bearing unit for radially and axially supporting a shaft or a sleeve. As the shaft and the sleeve rotation relative to one another, a fluid dynamic pressure is generated in the lubricating fluid filled in a minute gap by the pumping action of dynamic pressure groove arrays of the conical dynamic pressure bearing unit. The shaft or the sleeve is radially and axially supported by the fluid dynamic pressure thus generated.

However, with the conventional dynamic pressure bearing device it is sometimes the case that a strong impact caused by external factors is applied to the fluid dynamic pressure bearing device in a tapering seal portion formed between the outer circumferential surface of an annular member and the inner circumferential surface of a seal member (or the inner circumferential surface of a rotating member such as a hub or the like in case of not employing the seal member). At this time, the width of a minute gap between the radial outermost portion of the annular member in a cross-section containing a center axis and the inner circumferential surface of the seal member (or the inner circumferential surface of the rotating member) becomes momentarily zero. As a result, the annular member and the seal member (or the rotating member) make contact with each other in the zero-width region. The lubricating fluid held in the tapering seal portion then momentarily leaks out from the zero-width region.

Some conventional electric motors include a bearing mechanism using fluid dynamic pressure. For example, a fluid dynamic bearing apparatus used in a spindle motor disclosed in JP-A 2007-162759 includes a shaft and a tubular sleeve body inside which the shaft is inserted. The shaft is fixed to a base plate of the motor. The sleeve body is fixed to a rotor of the motor. The shaft is provided with two annular thrust flanges which are arranged above and below the sleeve body, respectively. The fluid dynamic bearing apparatus includes a radial bearing portion, which is arranged between the shaft and the sleeve body, and thrust bearing portions, which are arranged between each of the two thrust flanges and the sleeve body. As a result, the sleeve body and the rotor are rotatably supported relative to the shaft. The sleeve body has a communicating hole defined therein so as to communicate two thrust gaps with each other. Interfaces for lubricating oil are formed in the vicinity of upper and lower end openings of the communicating hole.

A fluid dynamic bearing motor disclosed in JP-A 2000-245104 includes a shaft fixed to a base, and a sleeve arranged to rotate around the shaft. A disc-shaped thrust plate made of stainless steel is fixed to the shaft. The sleeve is provided with an annular thrust bushing made of a different type of stainless steel. The thrust plate and the thrust bushing are arranged opposite to each other along a direction parallel to the shaft. The thrust plate and the thrust bushing together define a thrust gap therebetween. The thrust bushing in this fluid dynamic bearing motor is made of a stainless steel of superior durability, and this contributes to preventing an edge of the thrust plate from damaging the thrust bushing.

However, in the case of a bearing mechanism having the structure as described in JP-A 2007-162759, it is difficult to discharge air bubbles generated within the lubricating oil through an interface of the lubricating oil during the drive of the motor.

Some conventional electric motors include a bearing mechanism using fluid dynamic pressure. For example, in the spindle motor disclosed in FIG. 3 of JP-A 2005-48890, a hub 6 provided in a rotor is rotatably supported with a shaft 3 inserted therein, as described in paragraph 0034 of JP-A 2005-48890. As described in paragraph 0038 of JP-A 2005-48890, after the shaft 3 is inserted inside the hub 6, a seal plate 14 is press fitted to a top portion of the shaft 3. The seal plate 14 is arranged in close proximity to an upper end surface of an inner sleeve 9 of the hub 6. As described in paragraph 0039 of JP-A 2005-48890, the upper end surface of the inner sleeve 9 includes dynamic pressure generating grooves defined therein. As described in paragraph 0043 of JP-A 2005-48890, a working fluid is fed into a gap defined between the seal plate 14 and the upper end surface of the inner sleeve 9, so that a thrust bearing 18b is defined therein.

In the conventional motor disclosed in JP-A 2005-48890, an outside surface of the seal plate 14 is a substantially conical surface arranged to become gradually closer to a central axis of the shaft 3 with increasing axial height. Accordingly, an upper portion of the seal plate 14 has a smaller thickness than that of a lower portion of the seal plate 14, and hence, the upper portion of the seal plate 14 has a lower rigidity than that of the lower portion of the seal plate 14. Therefore, when the seal plate 14 is press fitted to the shaft 3, the upper portion of the seal plate 14 will experience a greater deformation than the lower portion of the seal plate 14. This may lead to a reduction in the perpendicularity of a lower surface of the seal plate 14 with respect to the shaft 3, which in turn may lead to a failure to achieve a desired level of dynamic pressure in the thrust bearing 18b, which is defined between the lower surface of the seal plate 14 and the upper end surface of the inner sleeve 9.

SUMMARY OF THE INVENTION

A fluid dynamic bearing mechanism according to a preferred embodiment of the present invention includes a stationary shaft, a sleeve portion arranged to rotate with respect to the shaft, a thrust portion including an upper end surface arranged opposite to a lower end surface of the sleeve portion, and a cover portion arranged opposite to an outside surface of the thrust portion.

The shaft and the sleeve portion are arranged to together define a radial gap therebetween. The lower end surface of the sleeve portion and the upper end surface of the thrust portion are arranged to together define a thrust gap therebetween. A lubricating oil is arranged in the radial gap, the thrust gap, and a gap between the thrust portion and the cover portion. The radial gap includes a radial bearing portion arranged to generate a radial dynamic pressure acting on the lubricating oil through a dynamic pressure groove. The thrust gap includes a thrust bearing portion arranged to generate a thrust dynamic pressure acting on the lubricating oil through a dynamic pressure groove.

The cover portion and the outside surface of the thrust portion are arranged to together define a tapered gap therebetween. The tapered gap is arranged to gradually increase in width in a downward direction, and includes an interface of the lubricating oil located therein.

The thrust portion is preferably fixed to the shaft through tight fit. An inside surface of the thrust portion includes an inside surface contact portion arranged to be in direct contact with an outside surface of the shaft, and an inside surface lower non-contact portion spaced away from the outside surface of the shaft, and arranged to extend axially downward from a lower end of the inside surface contact portion. The outside surface of the thrust portion preferably includes an outside surface inclined portion arranged to be in direct contact with the interface of the lubricating oil. The lower end of the inside surface contact portion is arranged at an axial level higher than that of an axially lower end of the outside surface inclined portion.

The present invention is arranged to achieve an improvement in perpendicularity of the upper end surface of the thrust portion with respect to the outside surface of the shaft.

The above and other elements, features, steps, characteristics and advantages of the present invention will become more apparent from the following detailed description of the preferred embodiments of the present invention with reference to the attached drawings.

DETAILED DESCRIPTION OF THE PREFERRED EMBODIMENTS

In the following description, the side on which a rotor unit 4 lies along a central axis L will be referred to as "upper" and the side on which a stator unit 3 lies along the central axis L will be called "lower". However, these terms are not intended to limit the installation postures of a fluid dynamic pressure bearing device, a spindle motor and a disk drive apparatus of the present invention.

Figure 1:
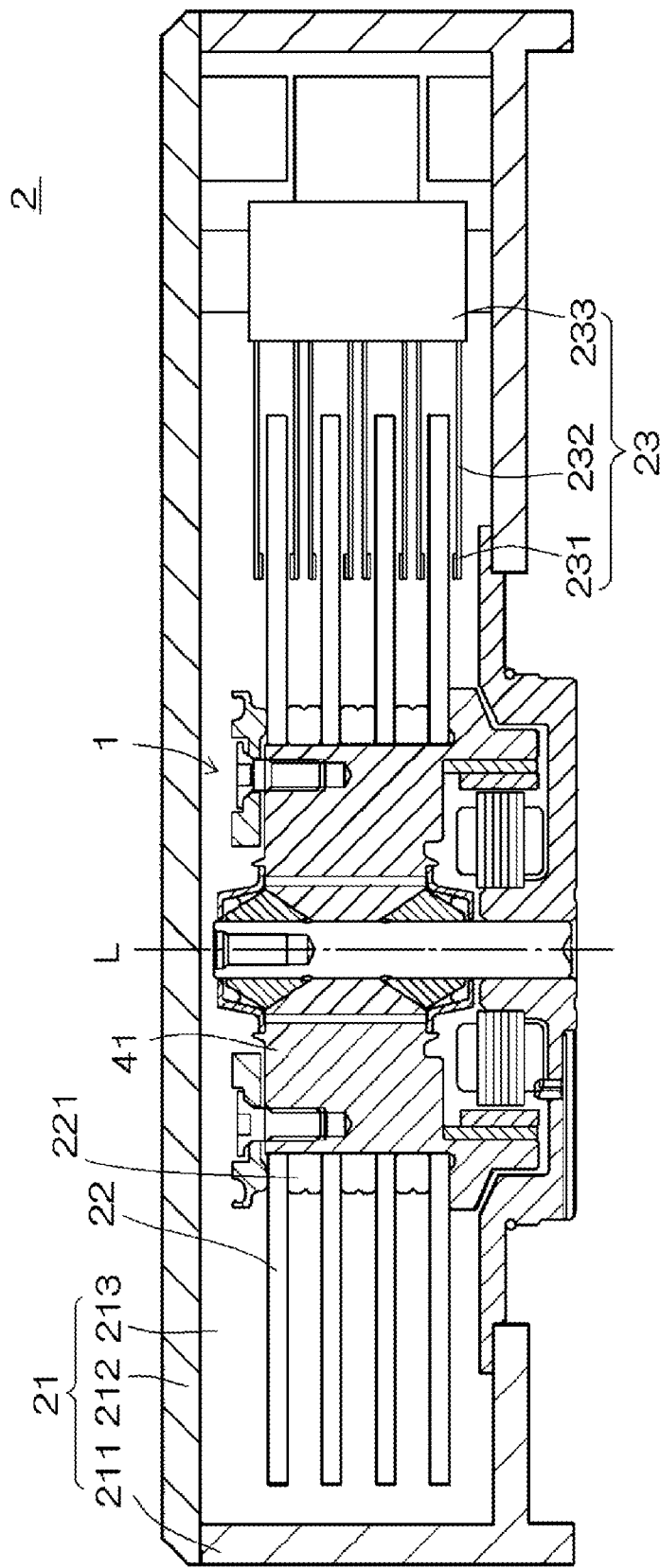
FIG. 1 is a vertical section view showing a disk drive apparatus.

FIG. 1 is a vertical section view showing a disk drive apparatus 2 provided with a spindle motor 1 in accordance with a first preferred embodiment. The disk drive apparatus 2 is a hard disk drive that reads and writes information from and on a plurality of (e.g., four) magnetic disks 22 while rotating the magnetic disks 22.

As shown in FIG. 1, the disk drive apparatus 2 preferably includes an apparatus housing 21, storage disks (hereinafter simply referred to as "disks") 22 such as, for example, magnetic disks or optical disks, an access unit 23 and a spindle motor 1.

The apparatus housing 21 preferably includes a substantially cup-shaped first housing member 211 and a substantially flat shaped second housing member 212. The first housing member 211 preferably has an upper opening. The spindle motor 1 and the access unit 23 are preferably installed on the inner bottom surface of the first housing member 211.

The second housing member 212 is preferably connected to the first housing member 211 so as to cover the upper opening of the first housing member 211. The first housing member 211 and the second housing member 212 define a clean internal space 213 in which dust is rare. The disks 22, the access unit 23 and the spindle motor 1 are preferably accommodated within the internal space 213.

The disks 22 are preferably disk-shaped data storage media each having a central aperture. The disks 22 are preferably mounted to a rotating member 41 of the spindle motor 1 and arranged one above the other in a mutually parallel and equally spaced-apart relationship, with a spacer 221 interposed therebetween.

The access unit 23 preferably includes a plurality of (e.g., eight) heads 231 opposing the upper and lower surfaces of the disks 22, arms 232 arranged to support the respective heads 231 and a swing mechanism 233 arranged to swinging the arms 232.

The access unit 23 is preferably designed to swing the arms 232 cross the disks 22 with the swing mechanism 233, thereby allowing the heads 231 to gain access to desired positions on the disks 22. Thus the heads 231 preferably perform the tasks of reading and writing information from and on the recording surfaces of the disks 22 under rotation. It may be possible for the heads 231 to perform only one of the reading and writing tasks.

Figure 2:
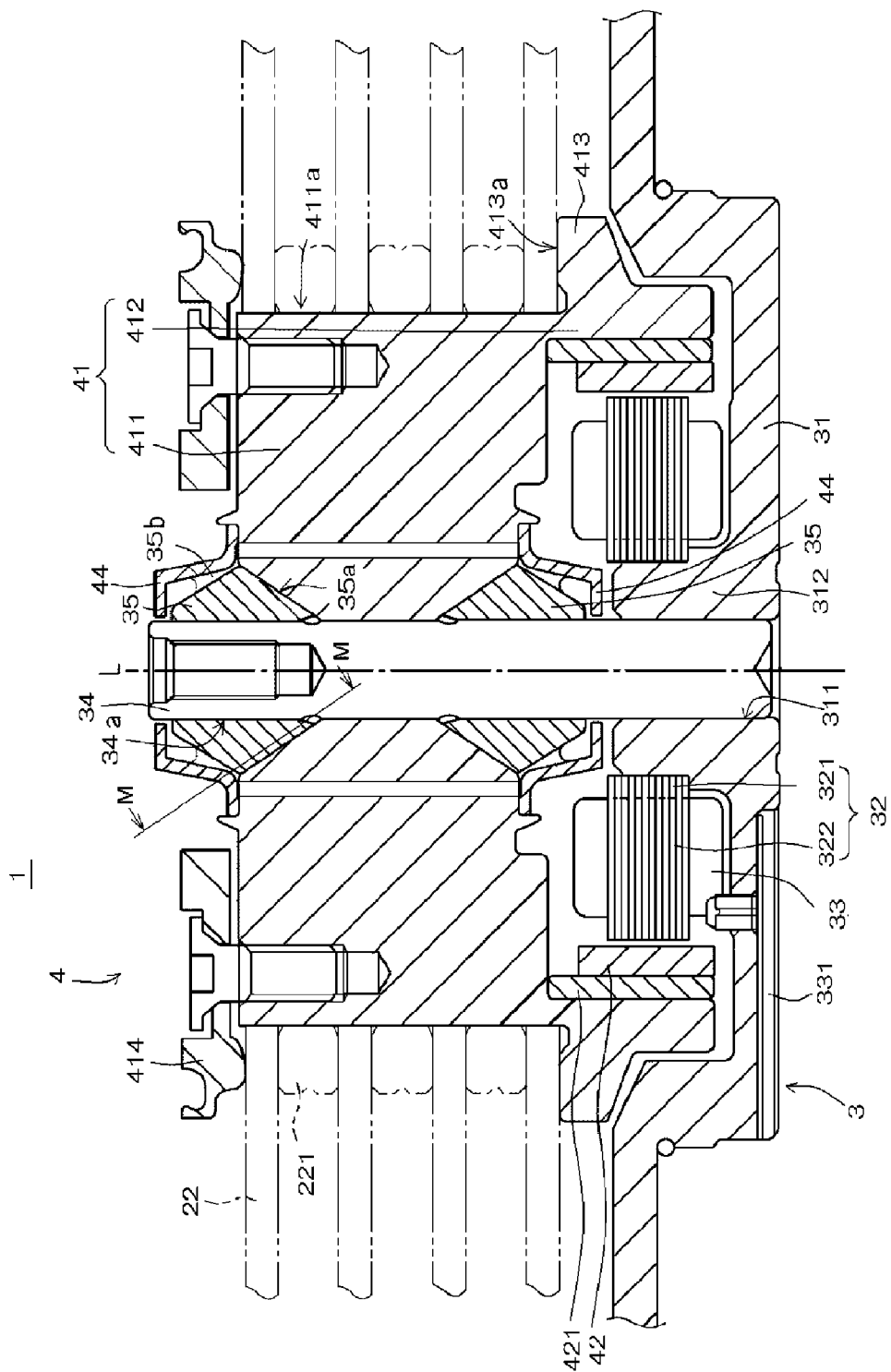
FIG. 2 is a vertical section view showing a spindle motor.

FIG. 2 is a vertical section view showing the spindle motor 1. Preferably, the spindle motor 1 includes a stator unit 3 fixed to the apparatus housing 21 and a rotor unit 4 which holds the disks 22 and rotates about a specified central axis L.

The stator unit 3 preferably includes a base member 31, a stator core 32, coils 33, a shaft 34 and annular members 35.

The base member 31 is preferably made of, e.g., a metallic material such as aluminum or the like and is fixed to the apparatus housing 21 by screws or other fixing devices. A substantially cylindrical holder portion 312 protruding in the axial direction (in the direction extending along the central axis L) is preferably defined in the central region of the base member 31. A through-hole 311 extending through the base member 31 along the central axis L is preferably defined in the holder portion 311. Although the base member 31 and the first housing member 211 are preferably defined as separate members in the present preferred embodiment, the base member 31 and the first housing member 211 may be seamlessly defined by a single member.

The stator core 32 is formed by, e.g., axially laminating electromagnetic steel plates in plural layers and, preferably, includes a core-back 321 and a plurality of tooth portions 322. The core-back 321 has a substantially annular shape and is fitted to the outer circumferential surface of the holder portion 312. The tooth portions 322 protrude radially outwards (in the direction perpendicular or substantially perpendicular to the central axis L, which definition holds true herein below) from the core-back 321.

The coils 33 are defined by a conductive wire wound around the respective tooth portions 322. The coils 33 are connected to an external power source device (not shown) via a connector 331. If a driving current is supplied from the power source device to the coils 33 through the connector 331, the magnetic flux generated from the tooth portions 322 interacts with the magnetic flux of a rotor magnet 42 to generate torque that rotates the rotor unit 4 about the central axis L.

The shaft 34 is a substantially columnar member and is fixed to the base member 31 with its lower end portion inserted into the through-hole 311.

The annular members 35 protrude radially outwards from the central axis L and are fixed to the upper and lower extensions of the shaft 34, respectively, in a symmetrical relationship with each other. The annular members 35 are preferably made of, e.g., a metallic material close in linear expansion coefficient to the rotating member 41 (such as an alloy mainly composed of aluminum or copper) or a resin material. Alternatively, the annular members 35 and the shaft 34 may be seamlessly defined by a single body.

The method of fixing the annular members 35 and the shaft 34 together is not particularly limited. It may be possible to fix a single annular member 35 to one of the upper and lower extensions of the shaft 34.

The present preferred embodiment will now be described with reference to the annular member 35 fixed to the upper extension of the shaft 34. In this preferred embodiment, the dynamic pressure bearing unit preferably has a conical structure as shown in FIG. 2. The annular member 35 preferably has a substantially conical shape. The upper portion of an outer circumferential surface of the annular member 35 is defined by an upper conical surface whose diameter gradually decreases is it moves upwards. The lower portion thereof is defined by a lower conical surface whose diameter gradually decreases downwards.

In the dynamic pressure bearing unit having a conical structure, the lower conical surface of the annular member 35 will be referred to as "lower surface 35a" and the upper conical surface of the annular member 35 will be referred to as "outer circumferential surface 35b" herein below.

As shown in FIG. 2, the rotor unit 4 preferably includes a rotating member 41, a rotor magnet 42 and a seal member 44.

The rotating member 41 is shaped to extend radially outwards around the central axis L. Preferably, the rotating member 41 has a first inner circumferential surface 41a (see FIG. 4) opposing the outer circumferential surface 34a of the shaft 34 through a minute gap, a body portion 411 extending radially outwards and a cylinder portion 412 extending downwardly from the outer peripheral edge of the body portion 411.

The body portion 411 has a radial inner end arranged between the annular members 35 lying one above the other along the axial direction. The radial inner end of body portion 411 is rotatably supported by the outer circumferential surface 34a of the shaft 34, the lower surface 35a of the upper one of the annular members 35 and the upper surface of the lower one of the annular members 35.

The body portion 411 has an outer circumferential surface 411a as a contact surface making contact with the inner circumferential portions (the inner circumferential surfaces or inner peripheral edges) of the disks 22. The cylinder portion 412 is provided with a radially outwardly protruding rest portion 413 having a flange surface 413a on which to support the disks 22.

The four disks 22 are arranged on and above the flange surface 413a in a horizontal posture and at an equal interval. Specifically, the lowermost one of disks 22 is placed on the flange surface 413a and the remaining three disks 22 are placed one by one above the lowermost disk 22, with spacers 221 interposed therebetween. The uppermost one of the disks 22 is pressed and fixed in place by a pressing member 414 attached to the body portion 411.

The inner circumferential portions of the disks 22 remain in contact with the outer circumferential surface 411a of the body portion 411, which restrains the disks 22 from making radial movement. As the rotor unit 4 rotates, the disks 22 are rotated together with the rotating member 41.

In this preferred embodiment, the disks 22 and the rotating member 41 are all primarily made of aluminum. Thus the disks 22 and the rotating member 41 have the same or similar linear expansion coefficient. Even when the temperature is changed, there is no possibility that an excessive stress is generated between the disks 22 and the rotating member 41. No particular limitation is imposed on the material of which the disks 22 and the rotating member 41 are made.

The rotor magnet 42 has a substantially annular shape and is attached to the lower surface of the body portion 411 through a yoke 421. The inner circumferential surface of the rotor magnet 42 serves as a magnetic pole surface and opposes the outer surfaces of the tooth portions 322.

Figure 3:
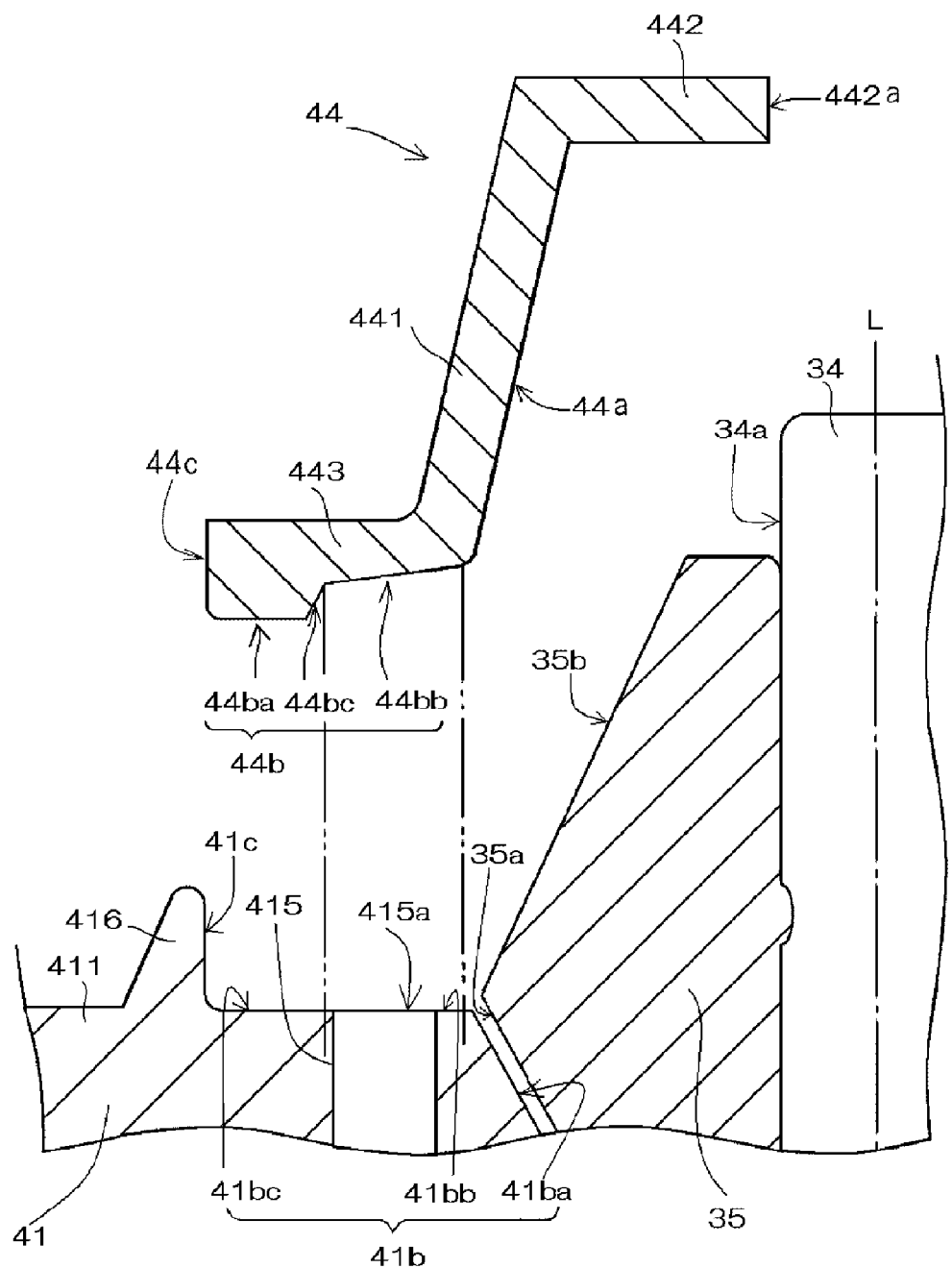
FIG. 3 is a partially exploded vertical section view showing an annular member and its vicinities.
Figure 4:
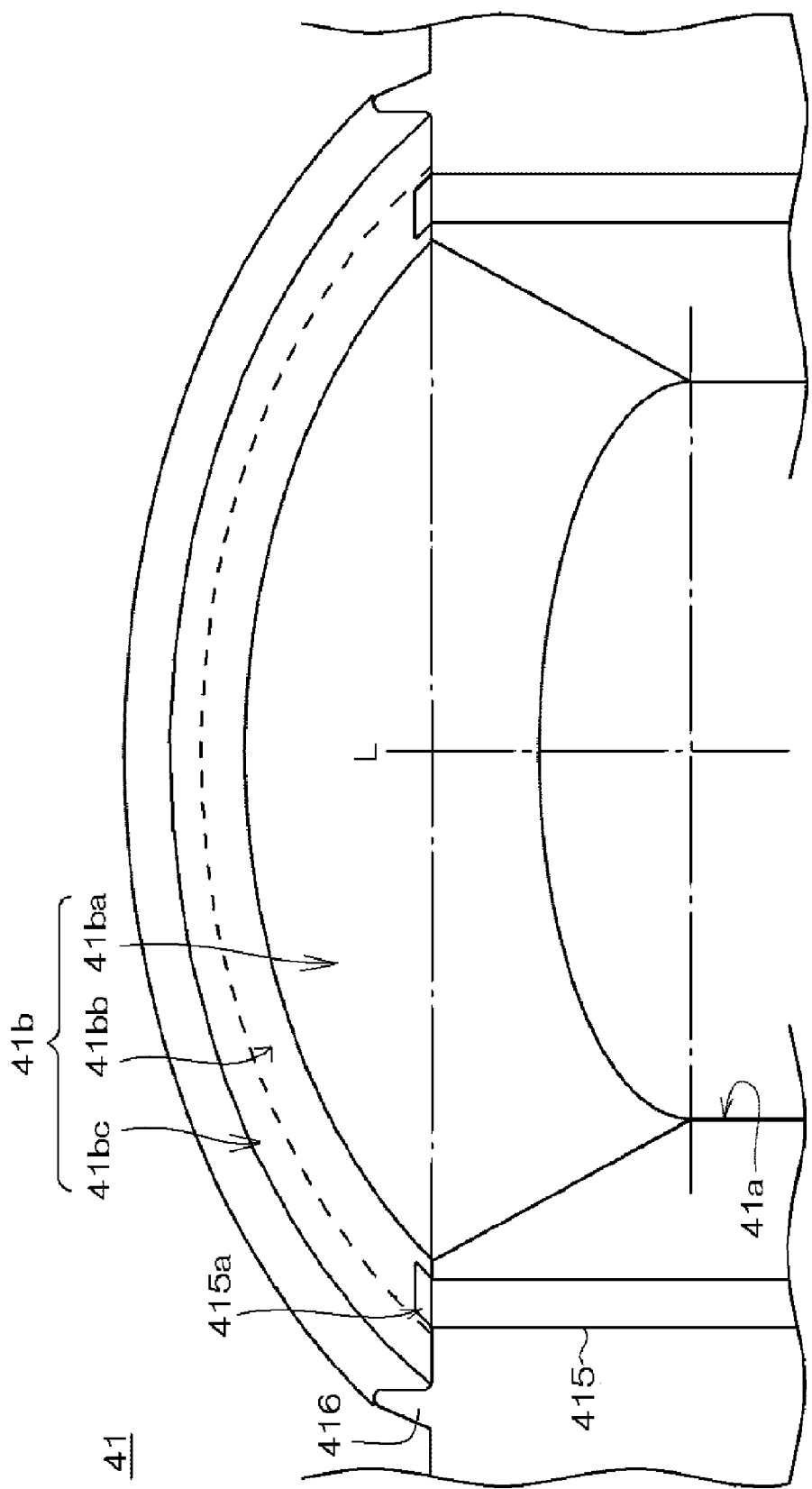
FIG. 4 is a perspective section view of a rotating member taken along line M-M in FIG. 2.
Figure 5:
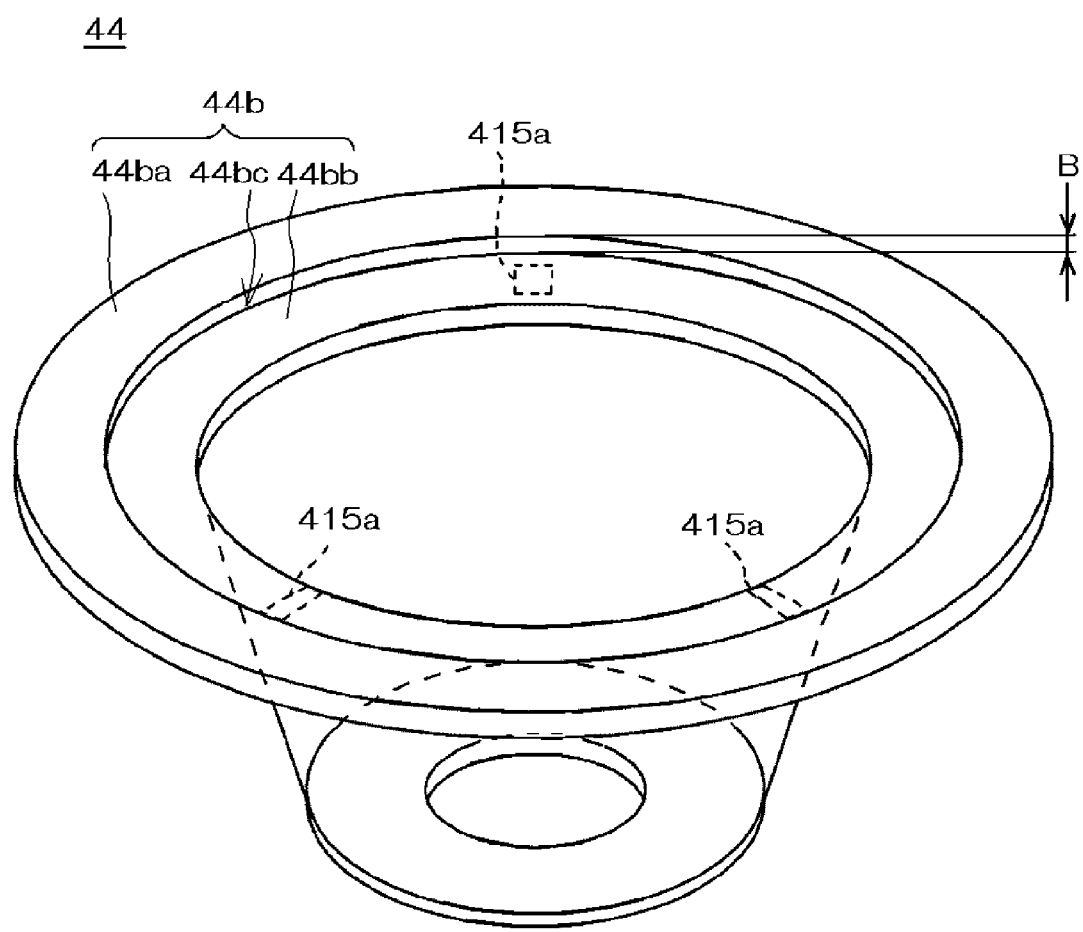
FIG. 5 is a rear perspective view showing a seal member in accordance with a preferred embodiment of the present invention.

FIG. 3 is an exploded vertical section view of the annular member 35 and elements adjacent thereto, showing the relationship between the rotating member 41 and the seal member 44. FIG. 4 is a perspective section view of the rotating member 41 taken along line M-M in FIG. 2. FIG. 5 is a perspective view of the seal member 44 as seen from the side of a fixed portion 443 thereof.

As shown in FIG. 2, the seal member 44 is attached to the upper surface of the body portion 411 and is used, e.g., to prevent a lubricating fluid 5 from being leaked out of the motor 1.

Figure 6:
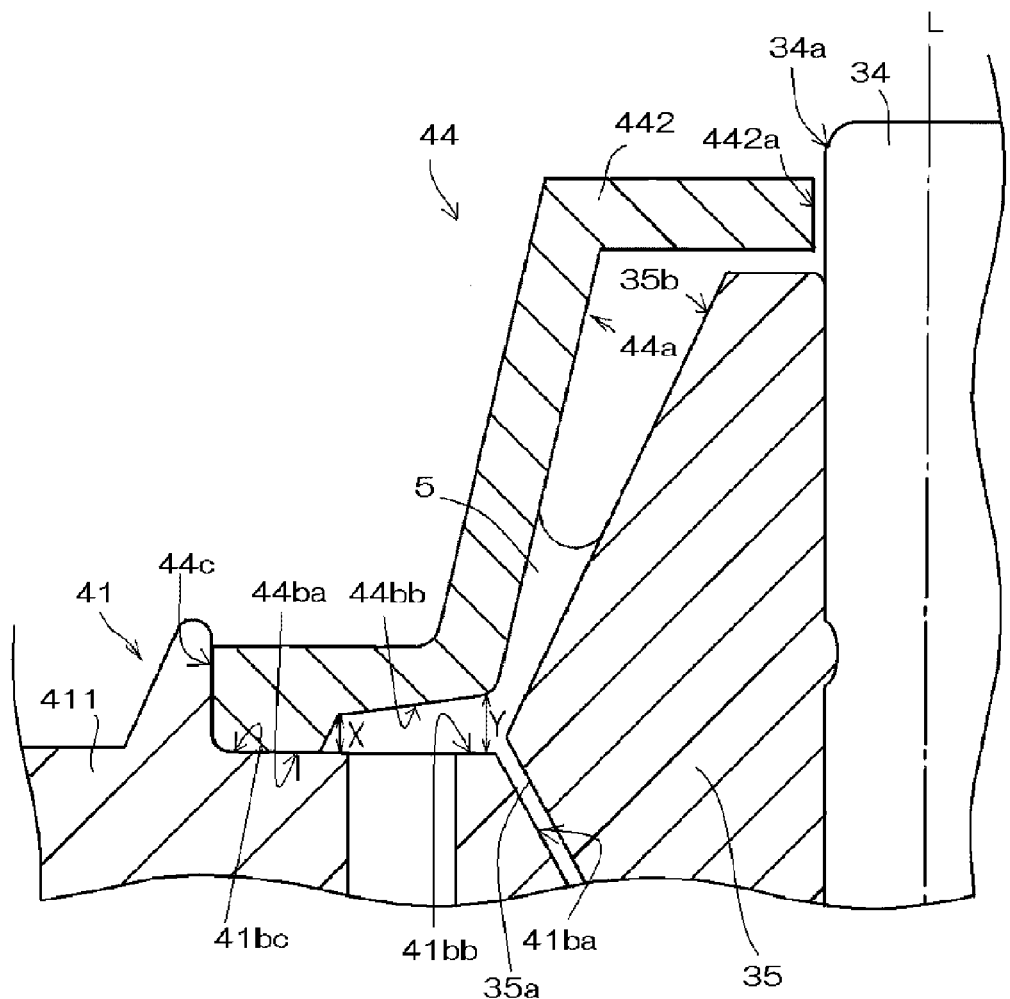
FIG. 6 is an enlarged vertical section view showing a seal member whose second end surface is defined by a slanting surface.

Referring to FIGS. 3, 4 and 6, the rotating member 41 includes an end surface portion 41b having a first end surface 41ba, a second end surface 41bb and a third end surface 41bc arranged from the radial inner side to the radial outer side.

The first end surface 41ba opposes the lower surface 35a of the annular member 35 in a spaced-apart relationship and defines a portion of the end surface portion 41b. As will be set forth later, a dynamic pressure bearing is defined between the first end surface 41ba and the lower surface 35a of the annular member 35.

As can be seen in FIG. 3, the second end surface 41bb is perpendicular or substantially perpendicular to the outer circumferential surface 34a of the shaft 34. The region of the end surface portion 41b lying radially between two axially-extending double-dotted chain lines is opposed to a second end surface 44bb of the seal member 44 in a spaced-apart relationship.

Referring to FIGS. 3 and 4, the third end surface 41bc is provided radially outwards of the second end surface 41bb in a region adjacent to the latter and is coplanar with the second end surface 41bb.

The rotating member 41 includes a protrusion 416 protruding axially upwards from the radial outer edge of the third end surface 41bc. The protrusion 416 has a second inner circumferential surface 41c.

The rotating member 41 has a plurality of (e.g., three) communication holes 415 axially extending from the upper end surface to the lower end surface thereof and arranged at an equal interval in the circumferential direction. Each of the communication holes 415 has an opening 415a adjoining to the second end surface 41bb and opposing the second end surface 44bb of the seal member 44. The number of the communication holes 415 is not particularly limited and may be one or more.

In case the dynamic pressure bearing unit has a conical structure, the first end surface 41ba is configured to slope from the inner edge of the second end surface 41bb toward the axial center of the shaft 34, as shown in FIGS. 3, 4 and 6.

The portion of the rotating member 41 surrounded by the first end surface 41ba and the first inner circumferential surface 41a preferably has a substantially trapezoidal cross-section. A conical dynamic pressure bearing unit is defined between the first end surface 41ba as a slanting surface and the lower surface 35a of each of the annular members 35 opposing the former.

As shown in FIGS. 3, 5 and 6, the seal member 44 preferably includes a wall portion 441, a cover portion 442 and a fixed portion 443.

The wall portion 441 opposes the outer circumferential surface 35*b* of the annular members 35 in a spaced-apart relationship. The side and top portions of the annular members 35 are covered by the wall portion 441 and the cover portion 442.

The cover portion 442 is a substantially annular portion having a shaft insertion hole defined at its central region. The cover portion 442 extends radially outwards from the upper end of the wall portion 441. The cover portion 442 has an inner circumferential surface 442*a* opposing the outer circumferential surface 34*a* of the shaft 34 in a spaced-apart relationship.

The seal member 44 may be attached to the lower surface of the body portion 411 of the rotating member 41 or both of the upper and lower surfaces of the body portion 411.

The gap between the outer circumferential surface 35*b* and the inner circumferential surface 44*a* gradually increases upwards. A lubricating fluid 5 is held in the gap by a capillary force, thereby forming a meniscus. A tapering seal portion forming a boundary surface of the lubricating fluid 5 is defined in the position where the surface tension of the lubricating fluid 5 and the atmospheric pressure are kept in equilibrium. In the tapering seal portion, the lubricating fluid 5 is pulled downwards.

In the event that the meniscus of the tapering seal portion is moved upwards by the volume expansion of the lubricating fluid 5 (attributable to, e.g., a centrifugal force or a temperature rise) or under other actions, the surface tension of the lubricating fluid 5 and the atmospheric pressure are kept in balance to thereby prevent the lubricating fluid 5 from being leaked out of the motor 1.

The annular member 35 and the seal member 44 arranged at the axial lower side have the same configuration as described above.

It is possible to use, e.g., oil mainly composed of ester such as polyol ester-based oil or diester-based oil as the lubricating fluid 5. The oil mainly composed of ester is superior in, e.g., wear resistance, thermal stability and flowability, and can be used as the lubricating fluid 5 of a fluid dynamic pressure bearing device.

Preferably, the fluid dynamic pressure bearing device includes at least the shaft 34, the annular members 35, the rotating member 41 and the seal member 44.

As can be seen in FIGS. 3, 5 and 6, the seal member 44 includes a lower surface portion 44*b* divided into a first end surface 44*ba*, a second end surface 44*bb* and a step surface 44*bc*. The step surface 44*bc* is positioned between the first end surface 44*ba* and the second end surface 44*bb*. The first end surface 44*ba* lies nearer to the end surface portion 41*b* of the rotating member 41 than the second end surface 44*bb* is.

If the seal member 44 is attached to the rotating member 41 as shown in FIG. 6, the first end surface 44*ba* makes contact with the third end surface 41*bc* of the rotating member 41 in the axial direction. The second end surface 44*bb* of the seal member 44 opposes the second end surface 41*bb* of the rotating member 41 in a spaced-apart relationship. The outer circumferential surface 44*c* of the seal member 44 makes contact with the second inner circumferential surface 41*c* of the rotating member 41 in the radial direction (see FIG. 3).

The step surface 44*bc* may have a sloping shape or an upright shape. No particular limitation is imposed on the shape of the step surface 44*bc*.

Referring again to FIGS. 3, 5 and 6, the second end surface 44*bb* of the seal member 44 is angled relative to a plane perpendicular or substantially perpendicular to the central axis L. The radial outer end portion of the second end surface 44*bb* of the seal member 44 is positioned nearest to the second end surface 41*bb* of the rotating member 41, which the radial inner end portion of the second end surface 44*bb* (the radial innermost region of the lower surface portion 44*b* of the seal member 44) is positioned farthest from the second end surface 41*bb* of the rotating member 41.

In other words, the minute gap between the second end surface 44*bb* of the seal member 44 and the second end surface 41*bb* of the rotating member 41 gradually increases from the radial outer side toward the radial inner side. The width Y between the radial inner end of the second end surface 44*bb* and the second end surface 41*bb* is greater than the width X between the radial outer end of the second end surface 44*bb* and the second end surface 41*bb* (see FIG. 6).

This prevents the radial inner end of the second end surface 41*bb* from making contact with the second end surface 44*bb* even when an axially acting impact is applied to the radial inner end of the second end surface 41*bb* by external factors.

A conical dynamic pressure groove array 50 having a herringbone shape (see FIGS. 7A and 7B) is defined on the lower surface 35*a* of the annular members 35. The conical dynamic pressure groove array 50 and the first end surface 41*ba* of the rotating member 41 cooperate with each other to define a conical dynamic pressure bearing unit that supports radial and axial loads.

The conical dynamic pressure groove array 50 may be defined on the first end surface 41*ba* or on both the first end surface 41*ba* and the lower surface 35*a*.

Figure 7A:
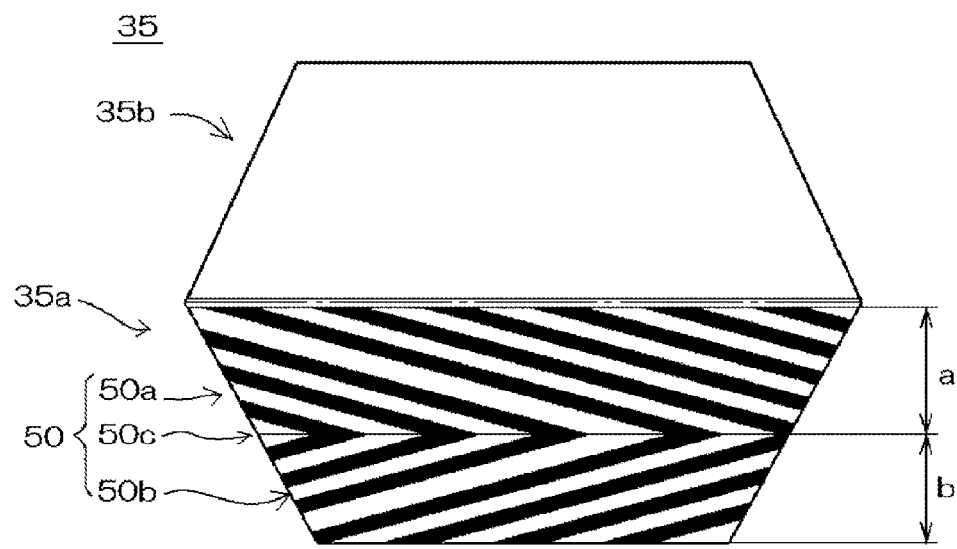
FIGS. 7A and 7B are views illustrating different kinds of conical dynamic pressure generating grooves in the annular member.
Figure 7B:
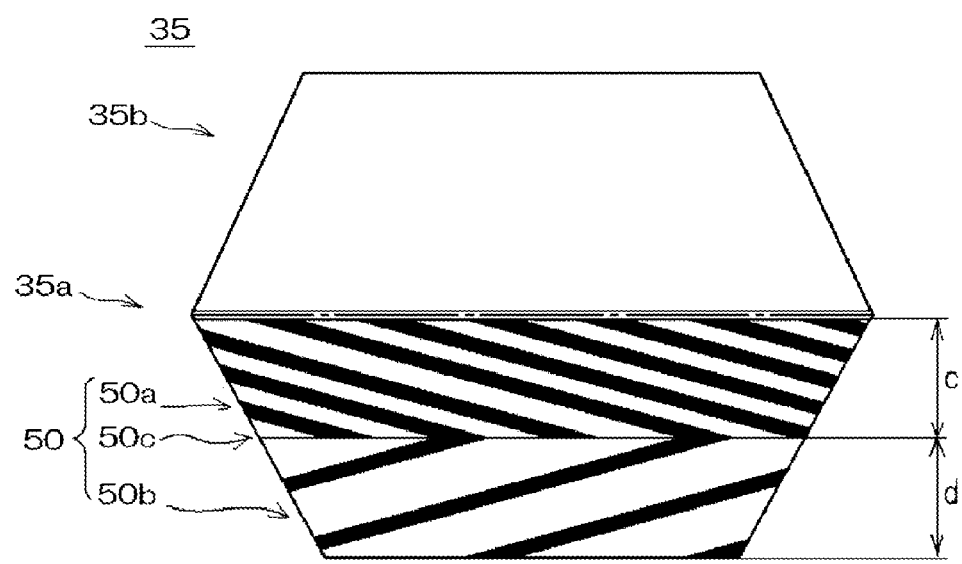

As shown in FIGS. 7A and 7B, the conical dynamic pressure groove array 50 includes first dynamic pressure generating grooves 50*a* and second dynamic pressure generating grooves 50*b*. The first dynamic pressure generating grooves 50*a* are arranged on the lower surface 35*a* in a spaced-apart relationship along the circumferential direction and are opposed to the second dynamic pressure generating grooves 50*b*. As the rotor unit 4 rotates, the conical dynamic pressure groove array 50 is capable of generating a fluid dynamic pressure in the lubricating fluid 5.

The lubricating fluid 5 pumped from the upper side toward the lower side by the first dynamic pressure generating grooves 50*a* and the lubricating fluid 5 pumped from the lower side toward the upper side by the second dynamic pressure generating grooves 50*b* impinge against each other in the boundary region 50*c*.

This results in local pressure increase in the vicinity of the boundary region 50*c*. Thus the rotating member 41 is radially and axially supported by the annular member 35 in a non-contact state. In other words, the rotating member 41 is rotatable relative to the annular member 35.

In case the number of the first dynamic pressure generating grooves 50*a* is the same as that of the second dynamic pressure generating grooves 50*b* as shown in FIG. 7A, it is preferred that the axial groove span a of the first dynamic pressure generating grooves 50*a* is set greater than the axial groove span b of the second dynamic pressure generating grooves 50*b*.

Alternatively, the number of the first dynamic pressure generating grooves 50*a* may be greater than that of the second dynamic pressure generating grooves 50*b*. In this case, the axial groove span c of the first dynamic pressure generating grooves 50*a* may be set equal to the axial groove span d of the second dynamic pressure generating grooves 50*b* as shown in FIG. 7B.

The conical dynamic pressure groove array 50 may have any shape or groove pattern insofar as it can work as a fluid dynamic pressure bearing. For example, the conical dynamic pressure groove array 50 may have a spiral shape or a tapering land shape.

Also, the annular member 35 arranged at the lower position of the rotating member 41 may be symmetrical to the aforementioned upper annular member 35 with respect to the axial center plane.

Figure 8:
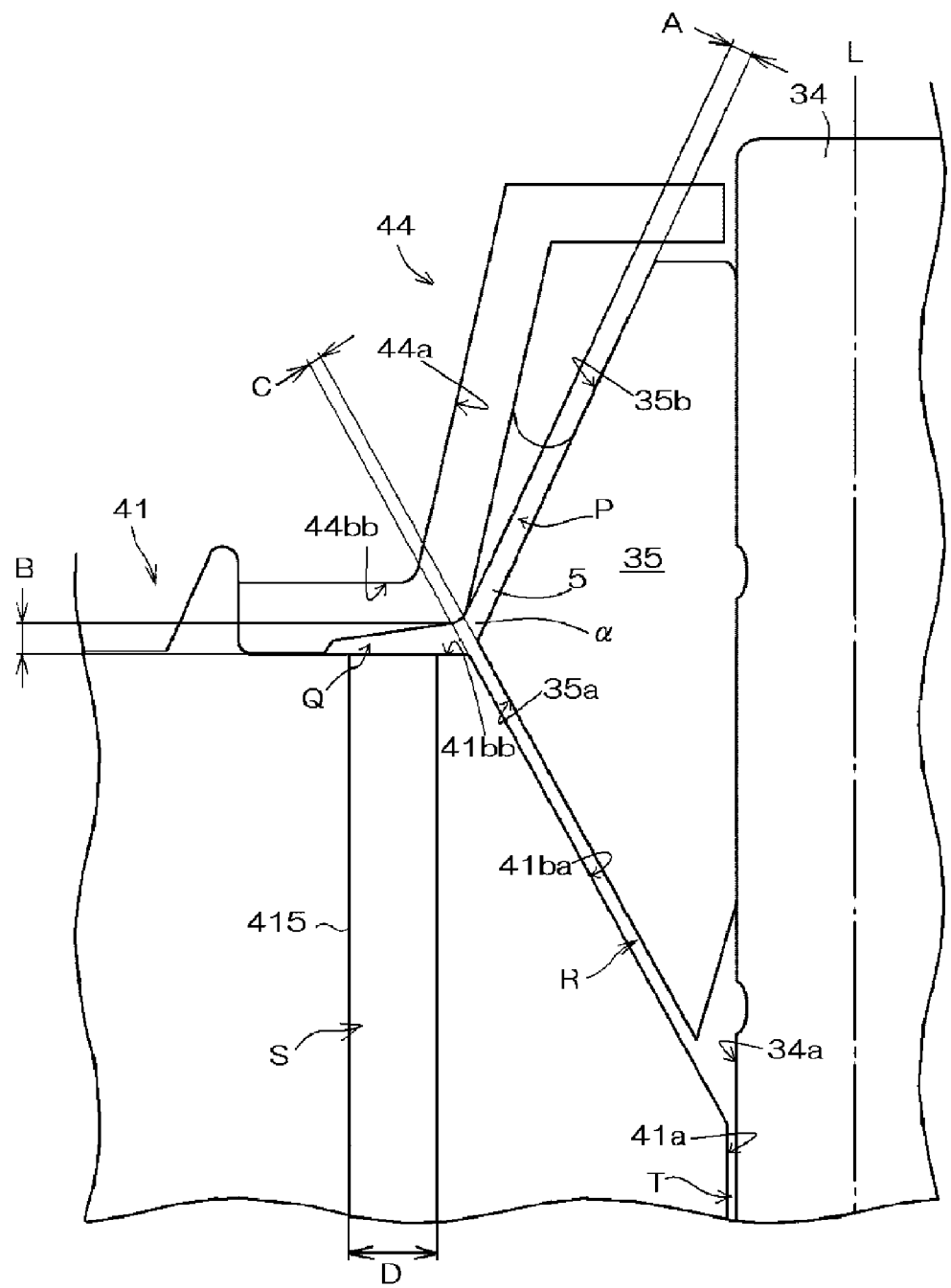
FIG. 8 is a view illustrating the size relationship between different minute gaps.

Referring to FIG. 8, a first minute gap P with a lower opening width A is defined between the outer circumferential surface 35b of the annular member 35 and the inner circumferential surface 44a of the seal member 44. The lower opening width A denotes the width between the radial outermost portion of the annular member 35 and the inner circumferential surface 44a of the seal member 44.

The first minute gap P preferably has a tapering shape. The lubricating fluid 5 is held within the first minute gap P, thereby defining a meniscus. In the position where the surface tension of the lubricating fluid 5 and the atmospheric pressure are kept in equilibrium, a boundary surface of the lubricating fluid 5 is defined.

A second minute gap Q with a width B is defined between the second end surfaces 44bb of the seal member 44 and the second end surfaces 41bb of the rotating member 41. In this regard, the width B refers to the width between the radial innermost region of the lower surface portion 44b (the second end surface 44bb in this preferred embodiment) and the end surface portion 41b (the second end surface 41bb in this preferred embodiment), i.e., the width of the radial inner opening of the second minute gap Q. In this preferred embodiment, the end surface of the seal member indicates the second end surface 44bb.

A third minute gap R with a width C is defined between the lower surface 35a of the annular member 35 and the first end surface 41ba of the rotating member 41.

The space within each of the communication holes 415 is defined as a fourth minute gap S with a width D.

A fifth minute gap T is defined between the outer circumferential surface 34a of the shaft 34 and the first inner circumferential surface 41a of the rotating member 41.

The first to fifth minute gaps P, Q, R, S and T provide mutually communicating spaces and hold the lubricating fluid 5 therein.

The second end surface 44bb of the seal member 44 opposes the opening 415a through the second minute gap Q. The lubricating fluid 5 axially flowing through each of the communication holes 415 passes the second minute gap Q and then flows into the third minute gap R.

The term "radial outermost portion of the annular member 35" used herein refers to the portion where the lower end of the outer circumferential surface 35b of the annular member 35 meets with the upper end of the lower surface 35a of the annular member 35.

In case when the second end surface 44bb is a slanting surface, the term "radial innermost portion of the second end surface 44bb of the seal member 44" refers to the radial inner end portion of the second end surface 44bb. As mentioned above, the second minute gap Q is gradually enlarged from the radial outer side toward the radial inner side. Thus the width B denotes the maximum width of the second minute gap Q (which is equivalent to the width Y in FIG. 6).

As can be seen in FIG. 8, the width B is preferably set smaller than the width D. The width A is set smaller than the width B but greater than the width C.

The width A is such that the tapering seal portion can serve as a fluid reservoir and the bubbles can go out through the first minute gap P.

Although no particular limitation is imposed on the size of the widths A, B, C and D, the width A may be, e.g., about 0.02 mm to about 0.2 mm. The width B may be, e.g., about 0.05 mm to about 0.5 mm. The width D may be, e.g., about 0.3 mm to about 1.2 mm. The width C of the third minute gap R may be, e.g., about 0.001 mm to about 0.005 mm if the dynamic pressure bearing unit has a conical structure.

By establishing the above relationship between the widths A, B, C and D, the lubricating fluid 5 is hardly leaked out from the motor 1 even when a strong impact is applied to the motor 1 from the outside.

Since the width A is greater than the width C as set forth above, the lubricating fluid 5 flowing out from the second minute gap Q flows toward the third minute gap R under the action of a capillary force at the branch point a (surrounded by the lower opening of the first minute gap P, the radial inner opening of the second minute gap Q and the radial outer opening of the third minute gap R).

Bubbles possibly contained in the lubricating fluid 5 pass the second minute gap Q and reach the branch point a together with the lubricating fluid 5. Owing to the fact that the width A is greater than the width C as set forth above, the bubbles flow toward the first minute gap P under the action of a capillary force.

In other words, the lubricating fluid 5 and the bubbles are separated from each other and are allowed to flow toward the third minute gap R and the first minute gap P, respectively.

Next, description will be made on a modified example of the first preferred embodiment. In the following description, the same components as those of the first preferred embodiment will be designated by like reference numerals with no detailed description made in that regard.

Figure 9:
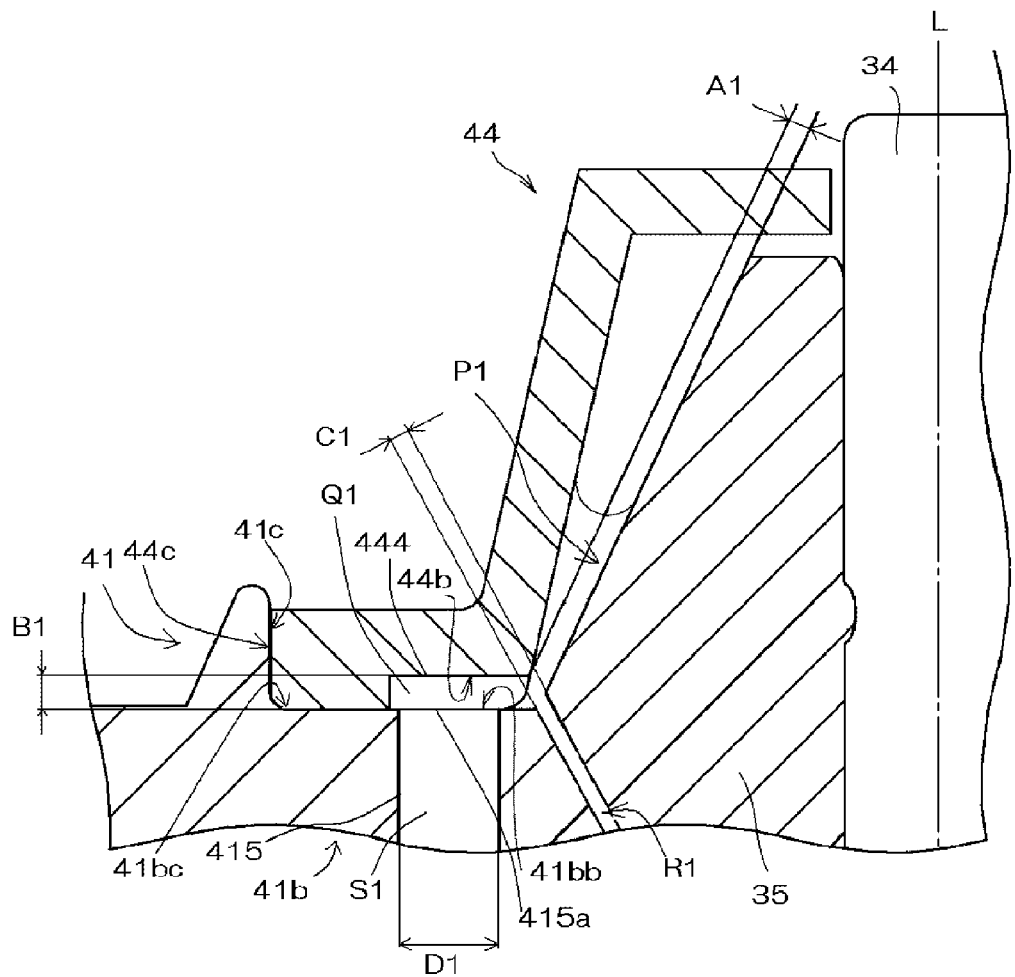
FIG. 9 is an enlarged section view illustrating the relationship between a rotating member and a seal member in accordance with a modified example of a preferred embodiment.
Figure 10:
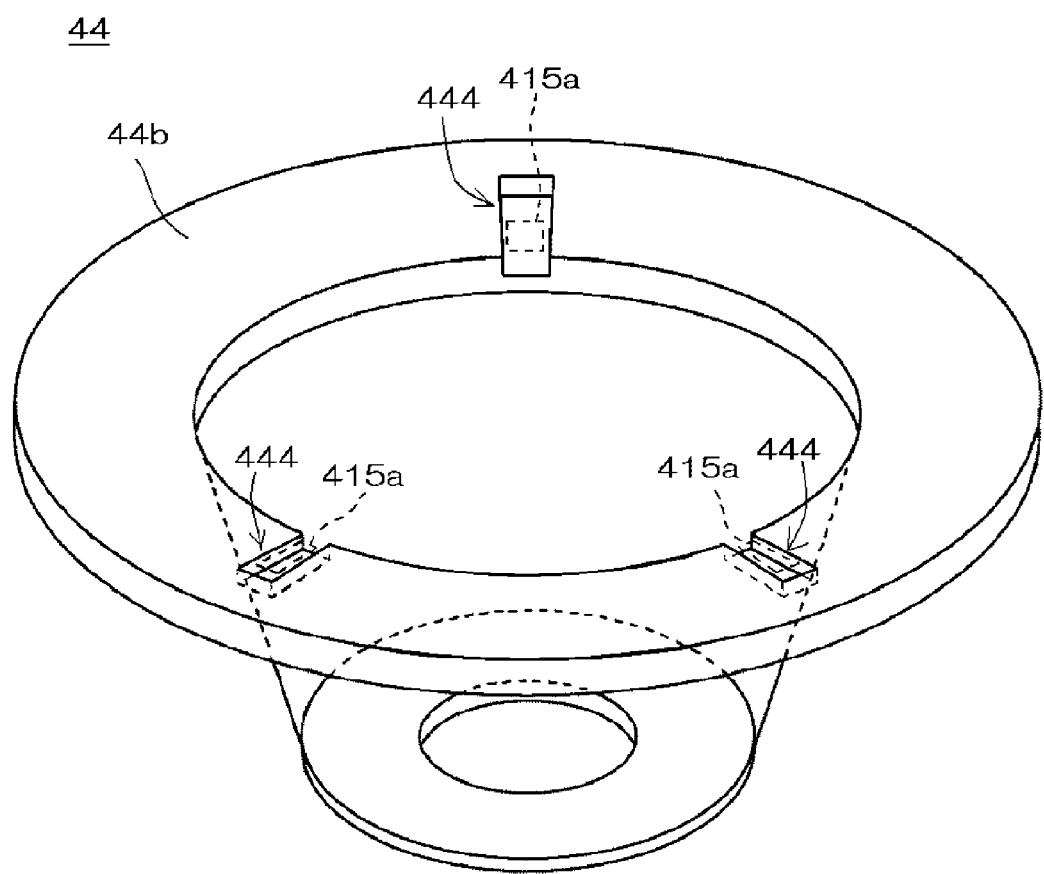
FIG. 10 is a rear perspective view showing the seal member in accordance with the modified example of a preferred embodiment.

Referring to FIGS. 9 and 10, the lower surface portion 44b of the seal member 44 is parallel or substantially parallel to the end surface portion 41b of the rotating member 41 and has a plurality of radial grooves 444 communicating with the communication holes 415. Each of the radial grooves 444 has a width corresponding to the radial width of the second end surface 41bb of the rotating member 41.

In each of the radial grooves 444 shown in FIG. 10, the region corresponding to the position of the opening 415a is indicated by a broken line.

In this modified example, the number of the radial grooves 444 and the number of the communication holes 415 are three, respectively. However, the number of them is not particularly limited and may be, e.g., one. It is preferred that the number of the radial grooves 444 is equal to the number of the communication holes 415.

As in the first preferred embodiment, first to fifth minute gaps P1, Q1, R1, S1 and T1 (not shown in FIG. 9) are defined by the rotating member 41, the shaft 34, the annular member 35 and the seal member 44. The first to fourth gaps P1, Q1, R1 and S1 have widths A1, B1, C1 and D1, respectively.

The size relationship between the widths A1, B1, C1 and D1 is the same as described in connection with the first preferred embodiment. The width B1 is preferably smaller than the width D1. The width A1 is smaller than the width B1 but greater than the width C1.

Thus the lubricating fluid 5 flowing from each of the communication holes 415 passes the second minute gap Q1 and bubbles contained in the lubricating fluid 5 can flow toward the first minute gap P1 and the lubricating fluid 5 can flow the third minute gap R1. This provides the same effects as attained in the first preferred embodiment.

The radial width of each of the radial grooves 444 is not limited to the one described above. For example, each of the radial grooves 444 may be arranged to extend from the radial inner end of the lower surface portion 44b to the radial outer end thereof. In this case, each of the radial grooves 444 is opened at the radial outer end of the lower surface portion 44b (i.e., the outer circumferential surface 44c of the seal member 44). When the seal member 44 is fixed to the rotating member 41, the outer circumferential surface 44c comes into contact with the second inner circumferential surface 41c, thereby closing the opening of each of the radial grooves 444.

Next, description will be made on a second preferred embodiment.

Figure 11:
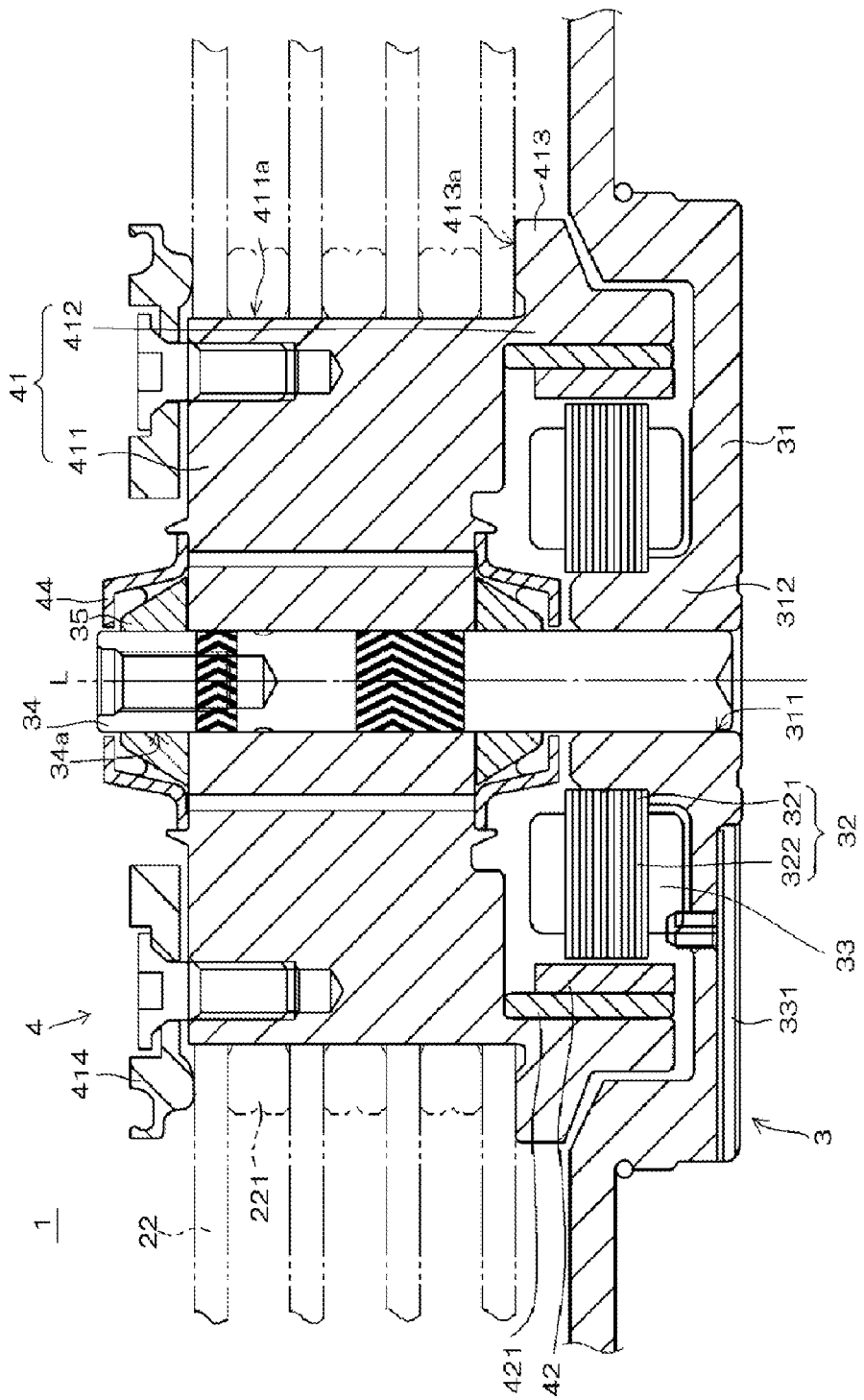
FIG. 11 is a vertical section view showing a spindle motor in accordance with a preferred embodiment of present invention.
Figure 12:
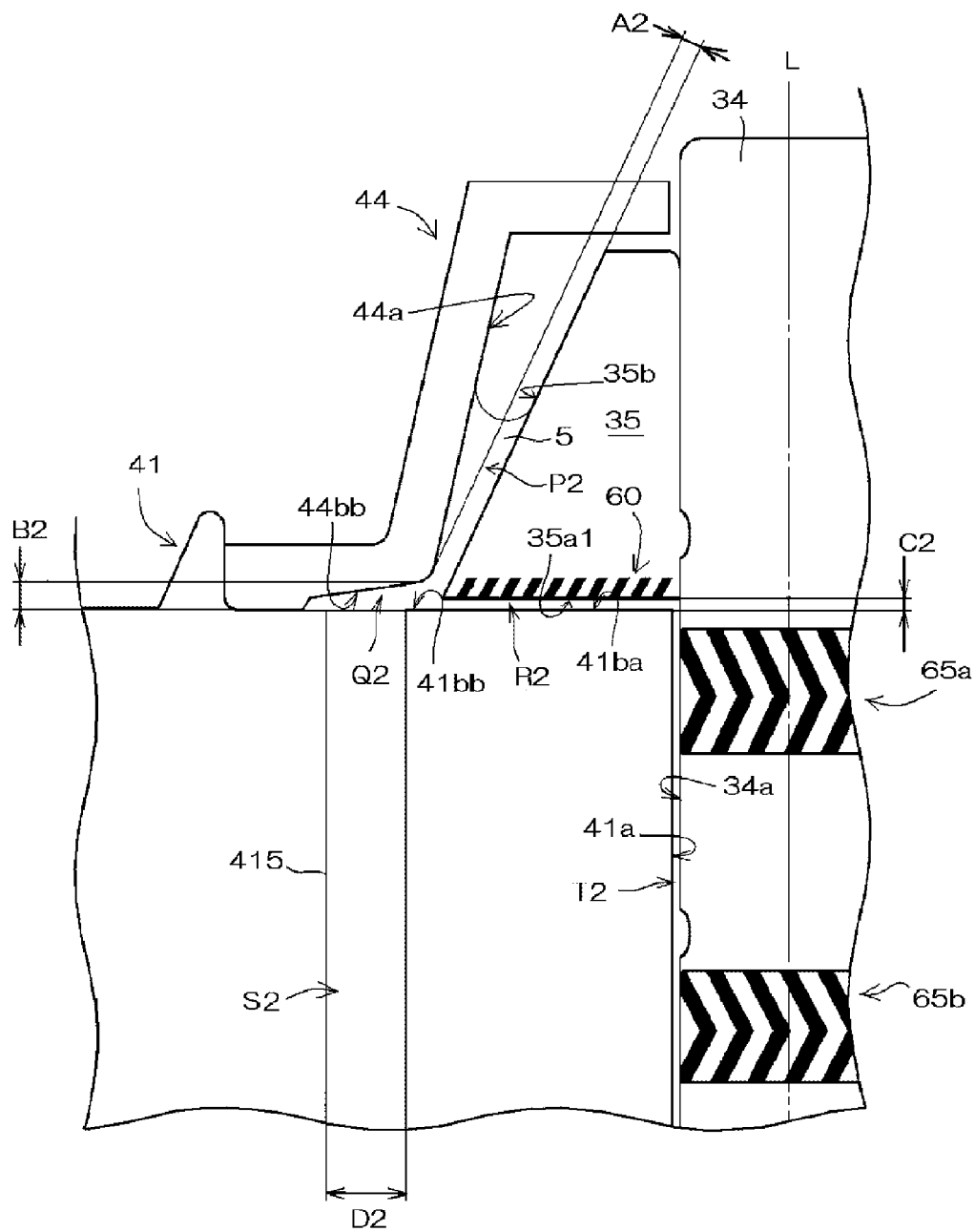
FIG. 12 is an enlarged section view illustrating the relationship between a rotating member and a seal member in accordance with a preferred embodiment.
Figure 13:
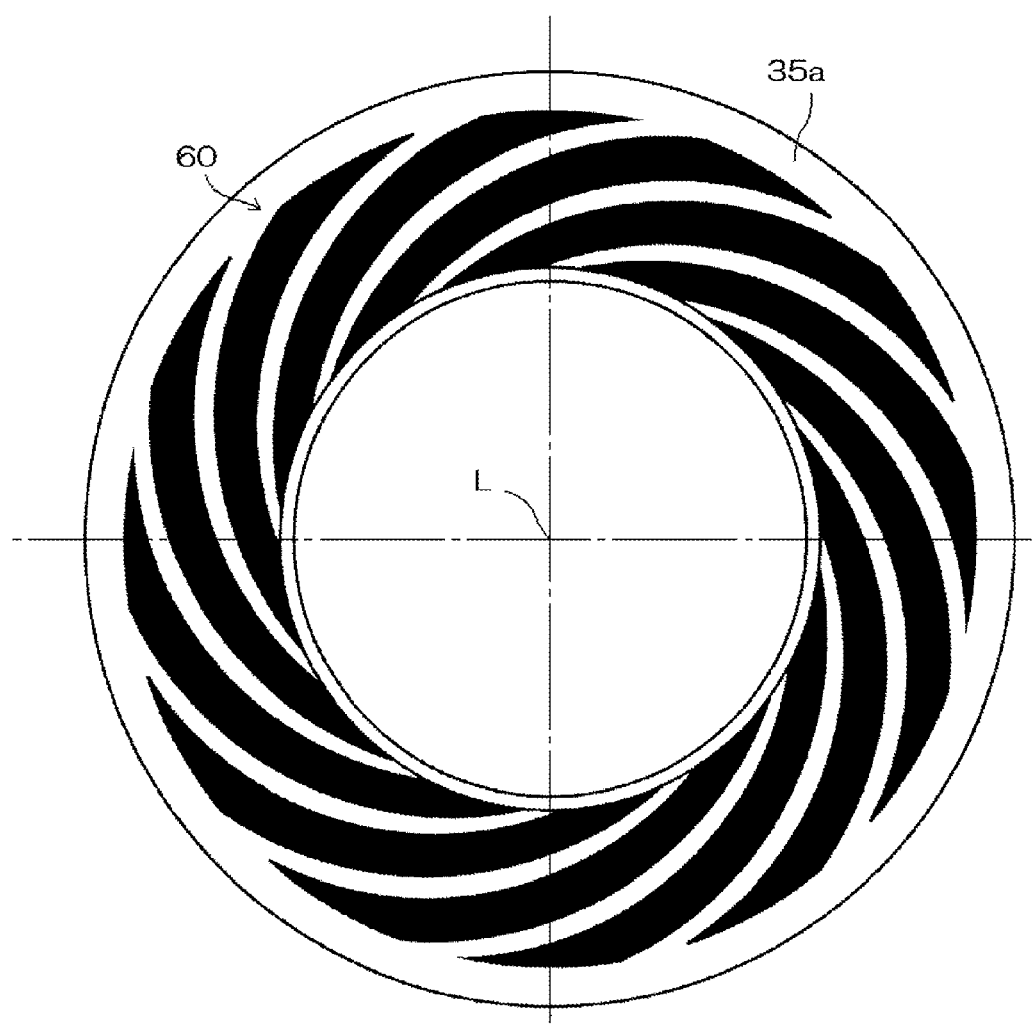
FIG. 13 is a bottom view showing an annular member in accordance with a preferred embodiment.

Referring to FIGS. 11, 12 and 13, the dynamic pressure bearing unit has a thrust structure in the second preferred embodiment. The dynamic pressure bearing includes a thrust dynamic pressure bearing unit arranged to generate an axial bearing force and a radial dynamic pressure bearing unit arranged to generate a radial bearing force.

As shown in FIG. 12, a third minute gap R2 with a width C2 is defined between a lower surface 35a1 of the annular member 35 and a first end surface 41ba of the rotating member 41 and is filled with the lubricating fluid 5.

The thrust dynamic pressure bearing unit is provided in the third minute gap R2. A thrust dynamic pressure groove array 60 is defined on the lower surface 35a1.

As shown in FIG. 13, the thrust dynamic pressure groove array 60 has spiral grooves extending radially outwards away from the central axis L in a substantially radial direction.

When the rotating member 41 makes rotation relative to the annular member 35, a fluid dynamic pressure is generated in the lubricating fluid 5 filled in the third minute gap R2 by the pumping action of the thrust dynamic pressure groove array 60. Thus the rotating member 41 is axially rotatably supported by the annular member 35 in a non-contact state.

The shape of the thrust dynamic pressure groove array 60 is not particularly limited and may be, e.g., a herringbone shape or a tapering land shape.

The thrust dynamic pressure groove array 60 may be defined on the first end surface 41ba or on both the first end surface 41ba and the lower surface 35a1.

A fifth minute gap T2 is defined between the first inner circumferential surface 41a of the rotating member 41 and the outer circumferential surface 34a of the shaft 34 and is filled with the lubricating fluid 5. A radial dynamic pressure groove array 65 is defined on the outer circumferential surface 34a. Thus the radial dynamic pressure bearing unit arranged to support a radial load is provided in the fifth minute gap T2.

The radial dynamic pressure groove array 65 includes upper and lower herringbone-shaped radial dynamic pressure groove arrays 65a and 65b arranged in an axially spaced-apart relationship.

When the rotating member 41 makes rotation relative to the shaft 34, a fluid dynamic pressure is generated in the lubricating fluid 5 filled in the fifth minute gap T2 by the pumping action of the upper and lower groove arrays 65a and 65b. Thus the rotating member 41 is radially rotatably supported by the shaft 34 in a non-contact state.

The shape of the radial dynamic pressure groove array 65 is not particularly limited and may be, e.g., a spiral shape or a tapering land shape. The radial dynamic pressure groove array 65 may have any groove pattern insofar as it can work as a fluid dynamic pressure bearing.

The radial dynamic pressure groove array 65 may be defined on the first inner circumferential surface 41a of the rotating member 41 or on both the first inner circumferential surface 41a of the rotating member 41 and the outer circumferential surface 34a of the shaft 34.

In the second preferred embodiment, first to fifth minute gaps P2, Q2, R2, S2 and T2 are defined by the shaft 34, the annular member 35, the rotating member 41 and the seal member 44. The first to fourth minute gaps P2, Q2, R2 and S2 has widths A2, B2, C2 and D2, respectively.

The widths A2, B2, C2 and D2 have the same size relationship as that of the widths of the first to fourth minute gaps employed in the afore-mentioned preferred embodiments. Specifically, the width B2 is smaller than the width D2. The width A2 is smaller than the width B2 but greater than the width C2.

Accordingly, the second preferred embodiment is capable of providing the same effects as offered by the first preferred embodiment and the modified example thereof.

The width of the fifth minute gap T2 can be suitably set depending on the widths of the first to fourth minute gaps P2, Q2, R2 and S2, the shape of the rotating member 41 and so forth.

Next, description will be made on a modified example of the second preferred embodiment. Just like the second preferred embodiment, the modified example thereof has a thrust type dynamic pressure bearing structure.

Figure 14:
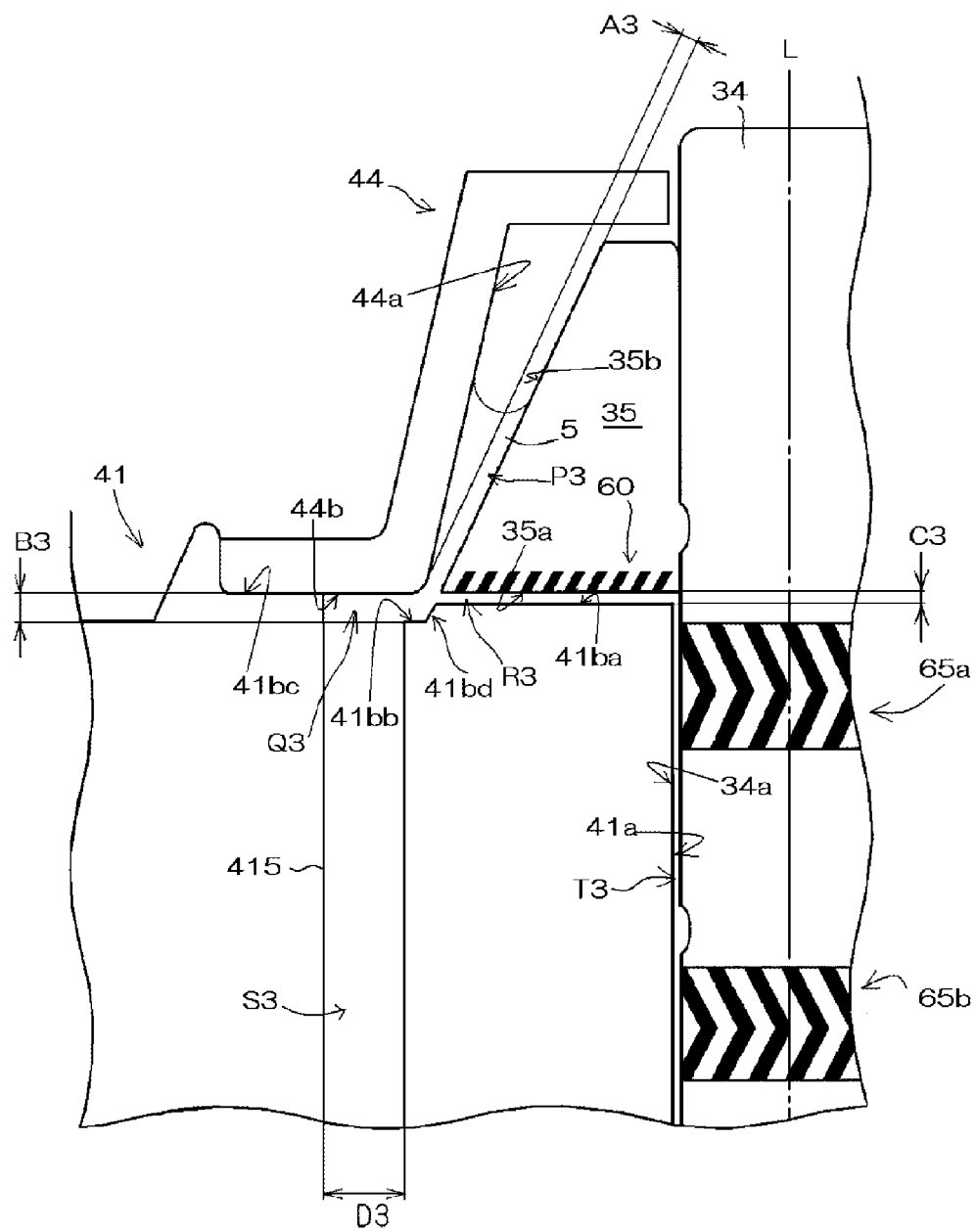
FIG. 14 is an enlarged section view illustrating the relationship between a rotating member and a seal member in accordance with a modified example of a preferred embodiment.

Referring to FIG. 14, a step surface 41bd is defined between the first end surface 41ba and the second end surface 41bb. The second end surface 41bb is axially downwardly depressed as compared to the first end surface 41ba and the third end surface 41bc.

The third end surface 41bc of the rotating member 41 and the lower surface portion 44b of the seal member 44 make contact with each other. The second end surface 41bb and the lower surface portion 44b are opposed to each other through a second minute gap Q3.

As in the preferred embodiments described above, first to fifth minute gaps P3, Q3, R3, S3 and T3 which communicate with each other are defined by the shaft 34, the annular member 35, the rotating member 41 and the seal member 44. The first to fourth minute gaps P3, Q3, R3 and S3 have widths A3, B3, C3 and D3, respectively.

The widths A3, B3, C3 and D3 have the same size relationship as that of the preceding preferred embodiments. In other words, the width B3 is preferably smaller than the width D3. The width A3 is preferably smaller than the width B3 but greater than the width C3.

Accordingly, the modified example of the second preferred embodiment is capable of providing the same effects as offered by the preceding preferred embodiments.

The width of the fifth minute gap T3 can be suitably set depending on the widths of the first to fourth minute gaps P3, Q3, R3 and S3 and the shape of the rotating member 41.

Next, description will be made on another modified example of the second preferred embodiment. In this modified example, the dynamic pressure bearing unit has a thrust structure. The third end surface 41bc of the rotating member 41 employed in the preceding preferred embodiments may be either provided or omitted in this modified example. The following description is directed to a case where the third end surface 41bc is absent.

Figure 15:
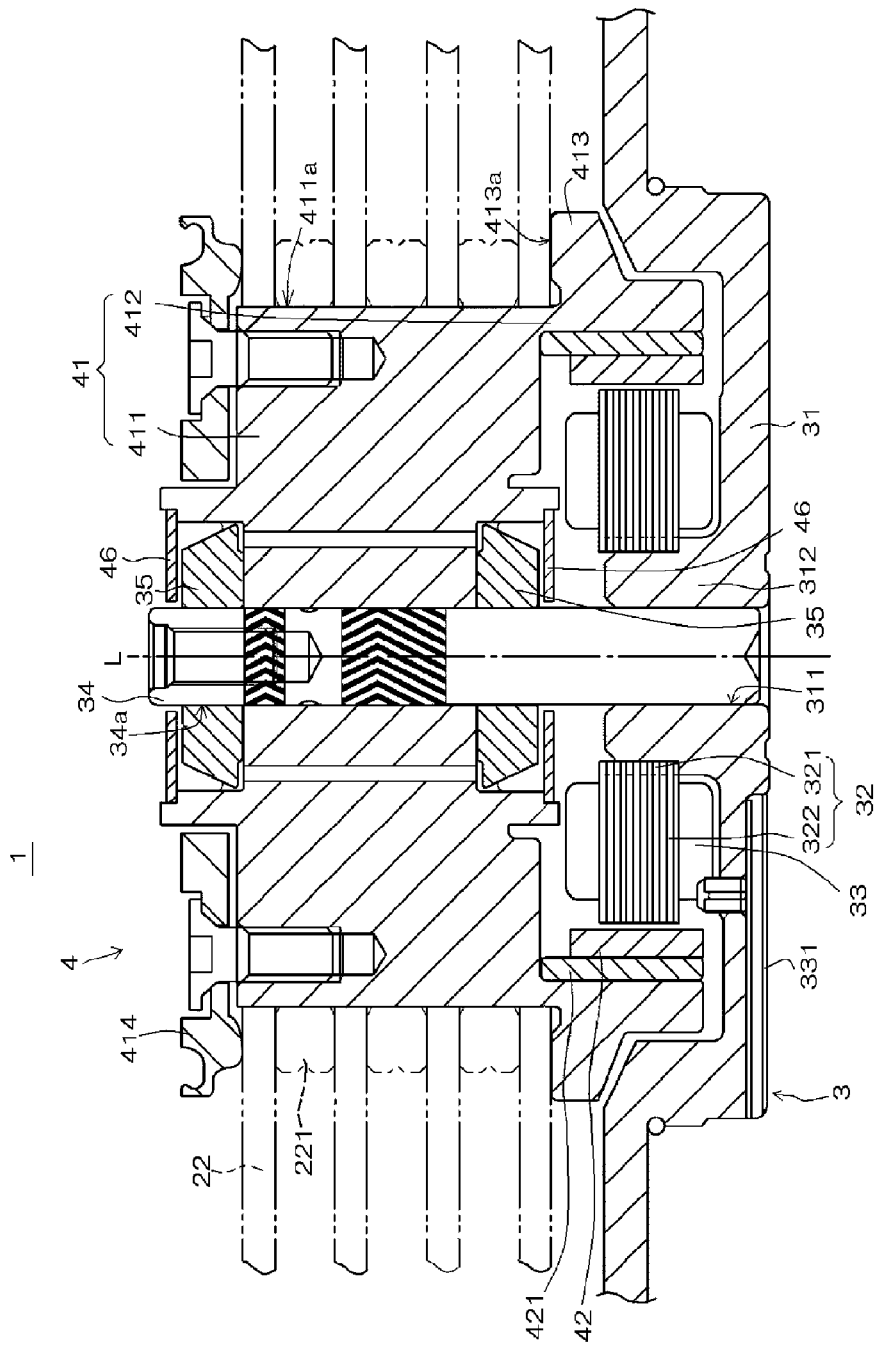
FIG. 15 is a vertical section view showing a spindle motor in accordance with another modified example of a preferred embodiment.
Figure 16:
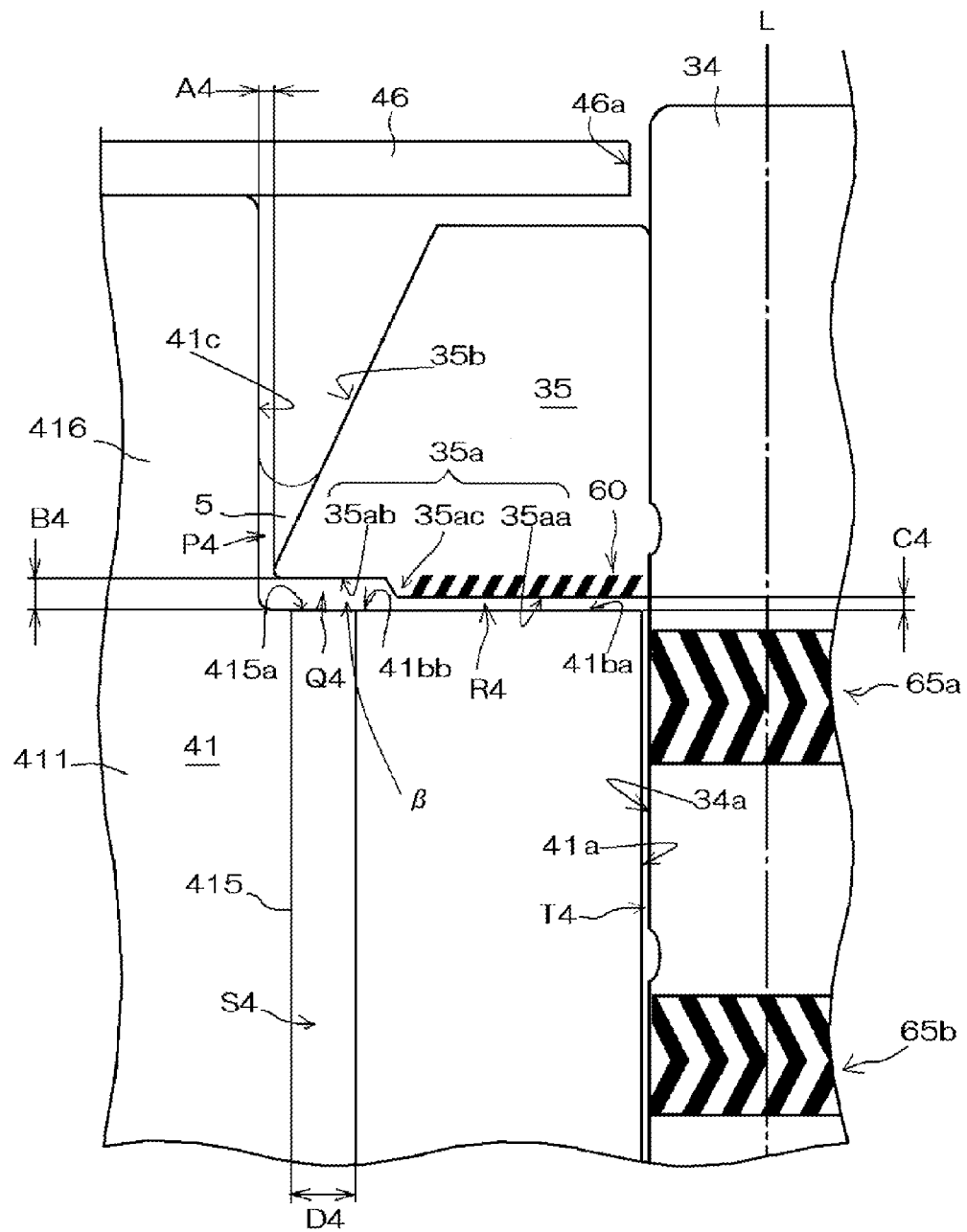
FIG. 16 is an enlarged section view illustrating the relationship between a rotating member and a seal member in accordance with the another modified example shown of the preferred embodiment in FIG. 15.

Referring to FIGS. 15 and 16, caps 46 arranged to cover the upper and lower sides of the annular members 35 are attached to the rotating member 41 by welding, bonding or the like, for example. The caps 46 are used, e.g., to prevent the lubricating fluid 5 from being leaked out from the motor 1.

Each of the caps 46 is preferably a substantially annular member having a shaft insertion hole defined in the central region thereof. Each of the caps 46 has an inner circumferential surface 46a opposing the outer circumferential surface 34a of the shaft 34 in a spaced-apart relationship.

Alternatively, a single cap 46 may be provided on one of the upper and lower sides of the annular members 35.

As can be seen in FIG. 16, the lower surface 35a of the annular member 35 has a first end surface 35aa, a second end surface 35ab and a step surface 35ac arranged between the first and second end surfaces 35*aa* and 35*ab*. The first end surface 35*aa* is positioned nearer to the end surface portion 41*b* of the rotating member 41 than the second end surface 35*ab*.

A third minute gap R4 with a width C4, which defines a thrust dynamic bearing unit, is defined between the first end surface 35*aa* of the annular member 35 and the first end surface 41*ba* of the rotating member 41.

The second end surface 35*ab* of the annular member 35 opposes the second end surface 41*bb* of the rotating member 41 through a second minute gap Q4 with a width B4.

The second minute gap Q4 communicates with the third minute gap R4. Thus the lubricating fluid 5 axially flowing through each of the communication holes 415 can flow toward the third minute gap R4 via the second minute gap Q4.

The step surface 35*ac* of the annular member 35 may have a sloping shape or an upright shape. However, no particular limitation is imposed on the shape of the step surface 35*ac* of the annular member 35.

As shown in FIG. 16, a first minute gap P4 with a width A4 is defined between the outer circumferential surface 35*b* of the annular member 35 and the second inner circumferential surface 41*c* of the rotating member 41. The width A4 refers to the width between the radial outermost portion of the annular member 35 in a cross-section containing the central axis L and the second inner circumferential surface 41*c* of the rotating member 41 (i.e., the width of a lower opening of the first minute gap P4).

Referring again to FIG. 16, the first minute gap P4 defined between the outer circumferential surface 35*b* and the second inner circumferential surface 41*c* grows wider from the lower side toward the upper side. The lubricating fluid 5 is held in the first minute gap P4 by a capillary force, while forming a meniscus. In the position where the surface tension of the lubricating fluid 5 and the atmospheric pressure are kept in equilibrium, a tapering seal portion defining a boundary surface of the lubricating fluid 5 is arranged.

Even if the lubricating fluid 5 is moved upwards by an external impact, it is pulled downwards again. This makes it possible to prevent the lubricating fluid 5 from being leaked upwards. As a result, the lubricating fluid 5 is prevented from being leaked out from the motor 1.

In the event that the meniscus of the tapering seal portion is moved upwards by the volume expansion of the lubricating fluid 5 (attributable to, e.g., a centrifugal force or a temperature rise) or under other actions, the surface tension of the lubricating fluid 5 and the atmospheric pressure are kept in balance to thereby prevent the lubricating fluid 5 from being leaked out of the motor 1.

The same structures as described above can be employed in the annular member 35 and the cap 46 which are positioned on the axial lower side.

The width B4 is preferably smaller than the width D4. The width A4 is preferably smaller than the width B4 but greater than the width C4. The width A4 is great enough to ensure that the bubbles can go out through the first minute gap P4 and the tapering seal portion can serve as a fluid reservoir.

The lubricating fluid 5 flowing out from the second minute gap Q4 reaches the branch point β (surrounded by the lower opening of the first minute gap P4, the radial inner opening of the second minute gap Q4 and the radial outer opening of the third minute gap R4).

Since the width C4 is smaller than the width A4 as set forth above, the lubricating fluid 5 flows into the third minute gap R4 under the action of a capillary force.

The bubbles contained in the lubricating fluid 5 flow into the second minute gap Q4 and reach the branch point 13.

Since the width A4 is greater than the width C4, the bubbles flow toward the first minute gap P4 under the action of a capillary force.

In other words, the lubricating fluid 5 and the bubbles are separated from each other and are allowed to flow toward the third minute gap R4 and the first minute gap P4, respectively.

There are also defined fourth and fifth minute gaps S4 and T4 which have substantially the same structures as those of the fourth and fifth minute gaps employed in the preceding preferred embodiments. The widths of the fourth and fifth minute gaps S4 and T4 can be suitably set depending on the size of the first to third minute gaps P4, Q4 and R4.

The structures described above can be applied to other dynamic bearing structures, e.g., conical dynamic bearing units, if they are configured to arbitrarily set the size relationship between the widths A4, B4, C4 and D4.

Next, description will be made on still another modified example of the second preferred embodiment. In this modified example, the dynamic pressure bearing unit has a thrust structure as in the aforementioned modified examples of the second preferred embodiment.

Figure 17:
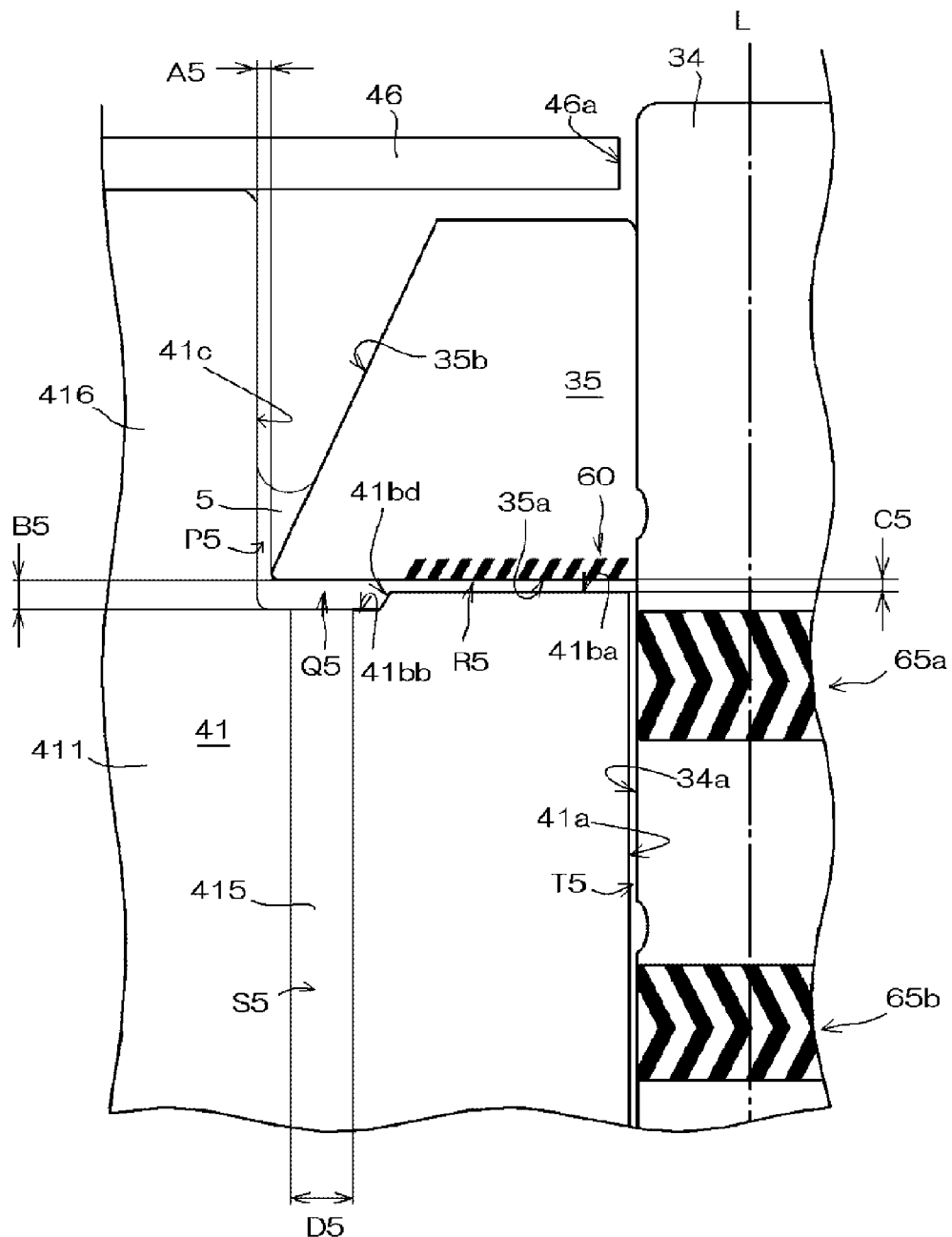
FIG. 17 is an enlarged section view illustrating the relationship between a rotating member and a seal member in accordance with still another modified example of a preferred embodiment.

Referring to FIG. 17, the body portion 411 of the rotating member 41 has a first end surface 41*ba*, a second end surface 41*bb* and a step surface 41*bd* defined between the first and second end surfaces 41*ba* and 41*bb*. The second end surface 41*bb* is arranged farther from the lower surface 35*a* than the first end surface 41*ba* is.

As in the second preferred embodiment, first to fifth minute gaps P5, Q5, R5, S5 and T5 are defined by the shaft 34, the annular member 35, the rotating member 41 and the cap 46. The first to fourth minute gaps P5, Q5, R5 and S5 have widths A5, B5, C5 and D5, respectively.

The widths A5, B5, C5 and D5 have the same size relationship as that of the second preferred embodiment. In other words, the width A5 is preferably smaller than the width B5 but greater than the width C5. The width B5 is preferably smaller than the width D5.

With this configuration, it is possible to provide the same effects as offered by the second preferred embodiment.

The width of the fifth minute gap T5 can be suitably set depending on the widths of the first to fourth minute gaps P5, Q5, R5 and S5, the shape of the rotating member 41 and so forth.

In the aforementioned preferred embodiments, the protrusion 416 may be omitted and the lower surface portion 44*b* of the seal member 44 may be axially brought into contact with and fixed to the end surface portion 41*b* of the rotating member 41. In this case, it is preferable to provide a member arranged to fix the outer circumferential surface 44*c* of the seal member 44 in place.

Figure 18:
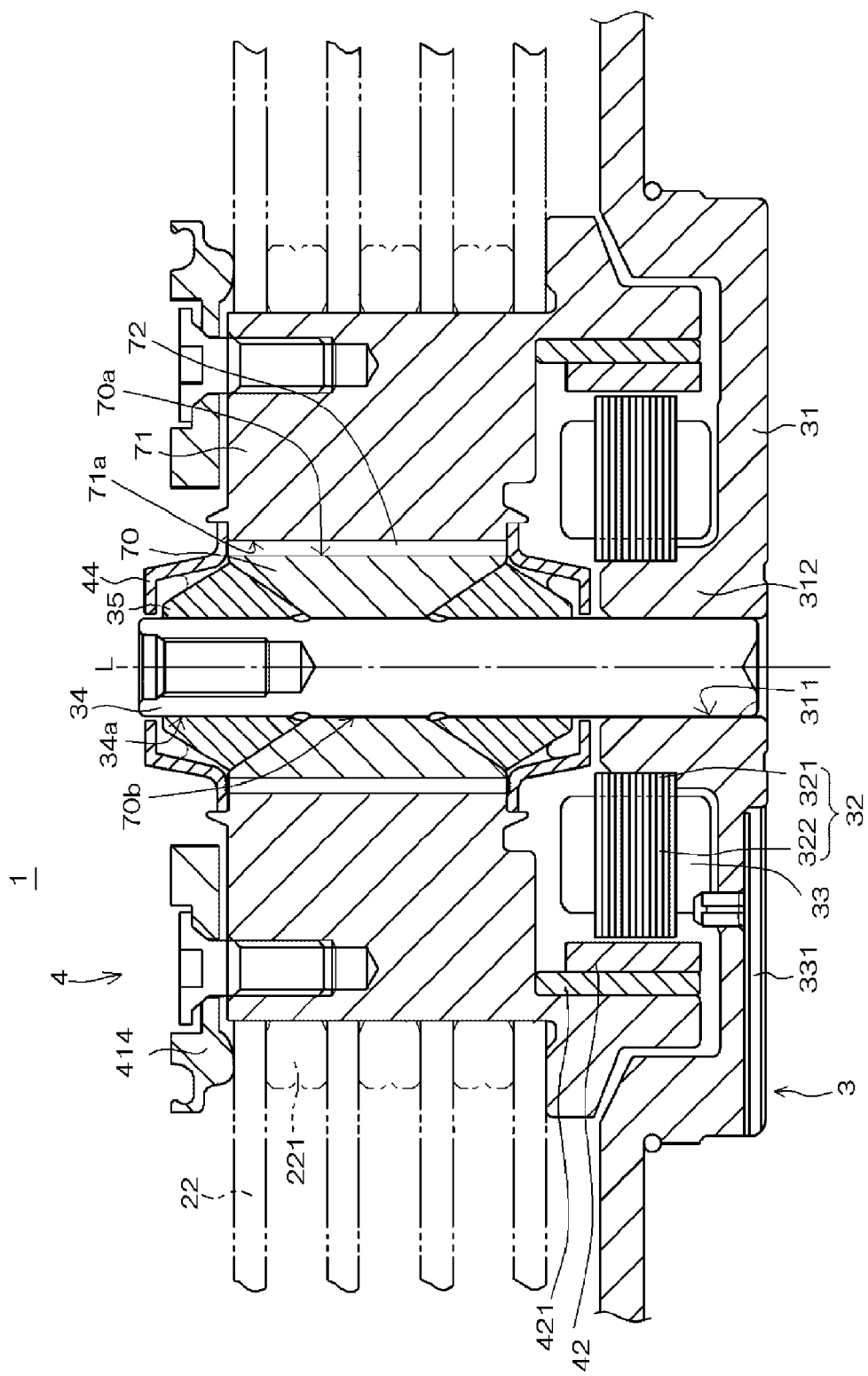
FIG. 18 is a vertical section view showing a spindle motor whose rotating member includes a sleeve and a hub.

Referring to FIG. 18, the rotating member 41 may be configured to have a sleeve 70 and a hub 71. The sleeve 70 is a substantially cylindrical member arranged on the outer circumference side of the shaft 34. The sleeve 70 is arranged so that the end surface thereof can oppose the lower surface 35*a* of the annular member 35. The sleeve 70 has an inner circumferential surface 70*b* opposing the outer circumferential surface 34*a* of the shaft 34 and rotatably supporting the shaft 34 and the annular members 35.

The hub 71 is shaped to extend radially outwards away from the central axis L and is fixed to or seamlessly defined with the sleeve 70 for rotation with the latter.

On the outer circumferential surface 70*a* of the sleeve 70, there is formed one or more axial grooves 72 axially extending from the upper end surface to the lower end surface of the sleeve 70. Each of the axial grooves 72 cooperates with the inner circumferential surface 71a of the hub 71 to define an axially-extending communication hole.

Regions corresponding to the first end surface 41ba, the second end surface 41bb and the third end surface 41bc of the first preferred embodiment can be suitably defined on the end surface portions of the sleeve 70 and the hub 71.

Figure 19:
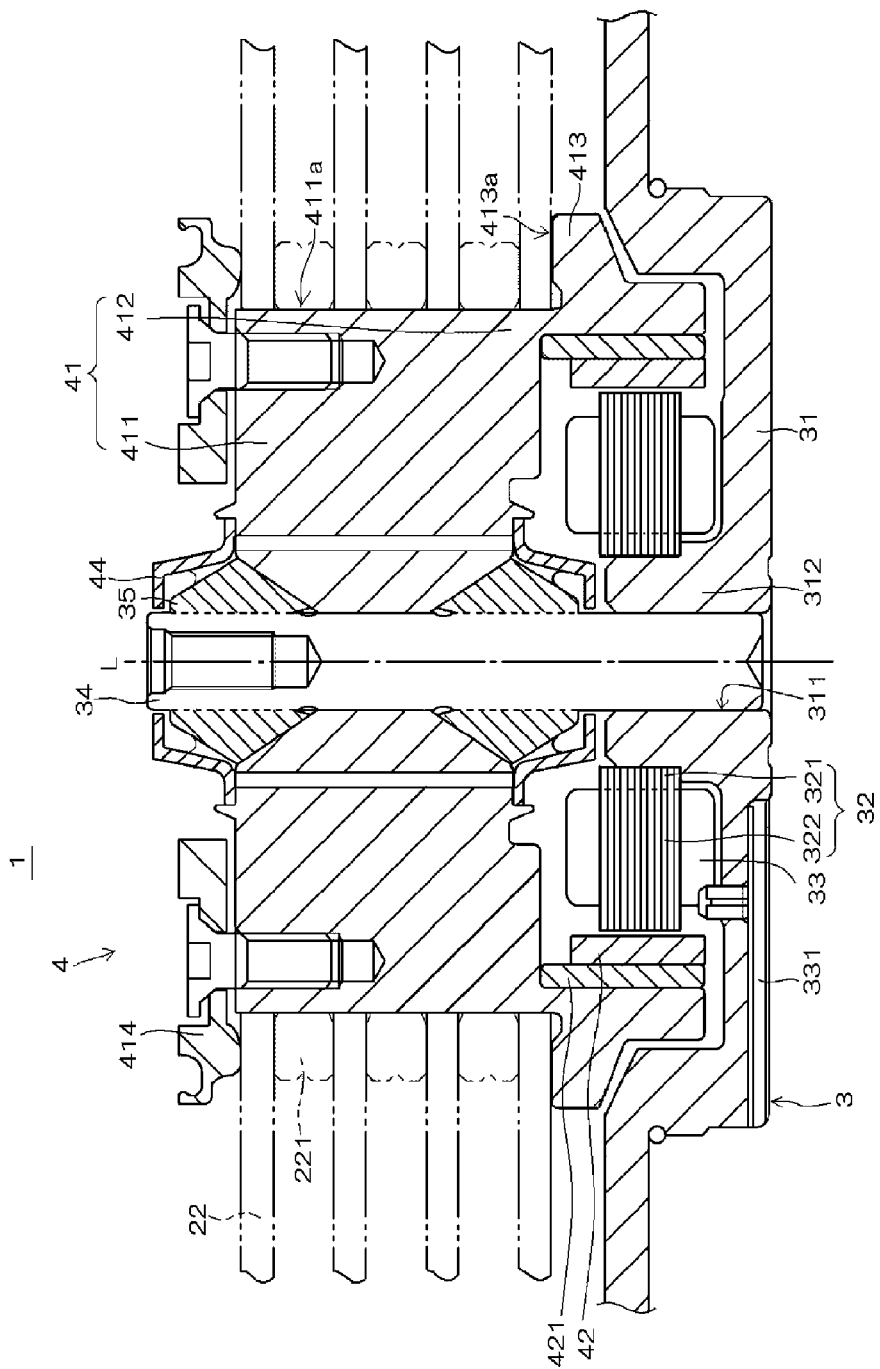
FIG. 19 is a vertical section view showing a spindle motor in which a shaft and an annular member are seamlessly formed into a single piece.

In the preferred embodiments and the modified examples thereof described above, the annular member 35 and the shaft 34 may be defined by a single member as shown in FIG. 19. In this case, other configurations than the annular member 35 and the shaft 34 can be the same as employed in the preceding preferred embodiments and the modified examples thereof.

The preferred embodiments described above can be applied to shaft-fixed outer rotor type spindle motors, shaft-rotating motors and inner rotor type spindle motors.

Some of the shaft-rotating motors have a configuration in which a sleeve housing is interposed between the sleeve 70 and the hub 71. In this case, the sleeve, the hub and the sleeve housing may be defined by a single member or may be produced independently of one another and then fixed together or formed into a single member.

The structures employed in the foregoing preferred embodiments can be applied to the configuration of the rotating member and the annular member positioned on the axial lower side as well as those arranged on the axial upper side.

Figure 20:
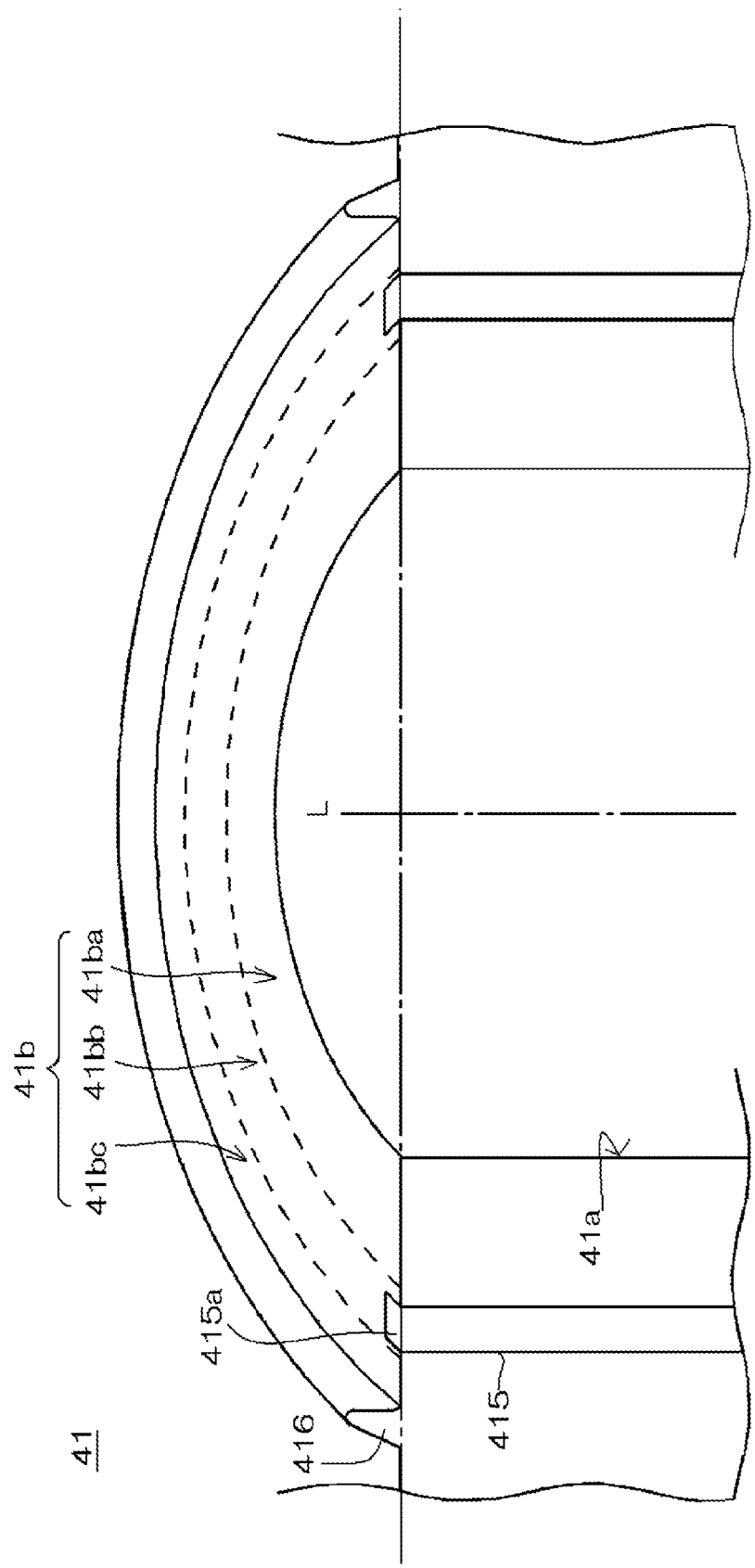
FIG. 20 is a view showing a modified example of the rotating member shown in FIG. 4 (a modified example of the thrust dynamic pressure bearing unit).

In case the dynamic pressure bearing unit has a thrust structure, the rotating member 41 can have the shape illustrated in FIG. 20. The rotating member 41 having this shape may be applied to the conical dynamic bearing described above. In this case, the widths A, B, C and D can have the same size as set forth above. For example, the width C can be set equal to about 0.010 mm to about 0.020 mm.

Figure 21:
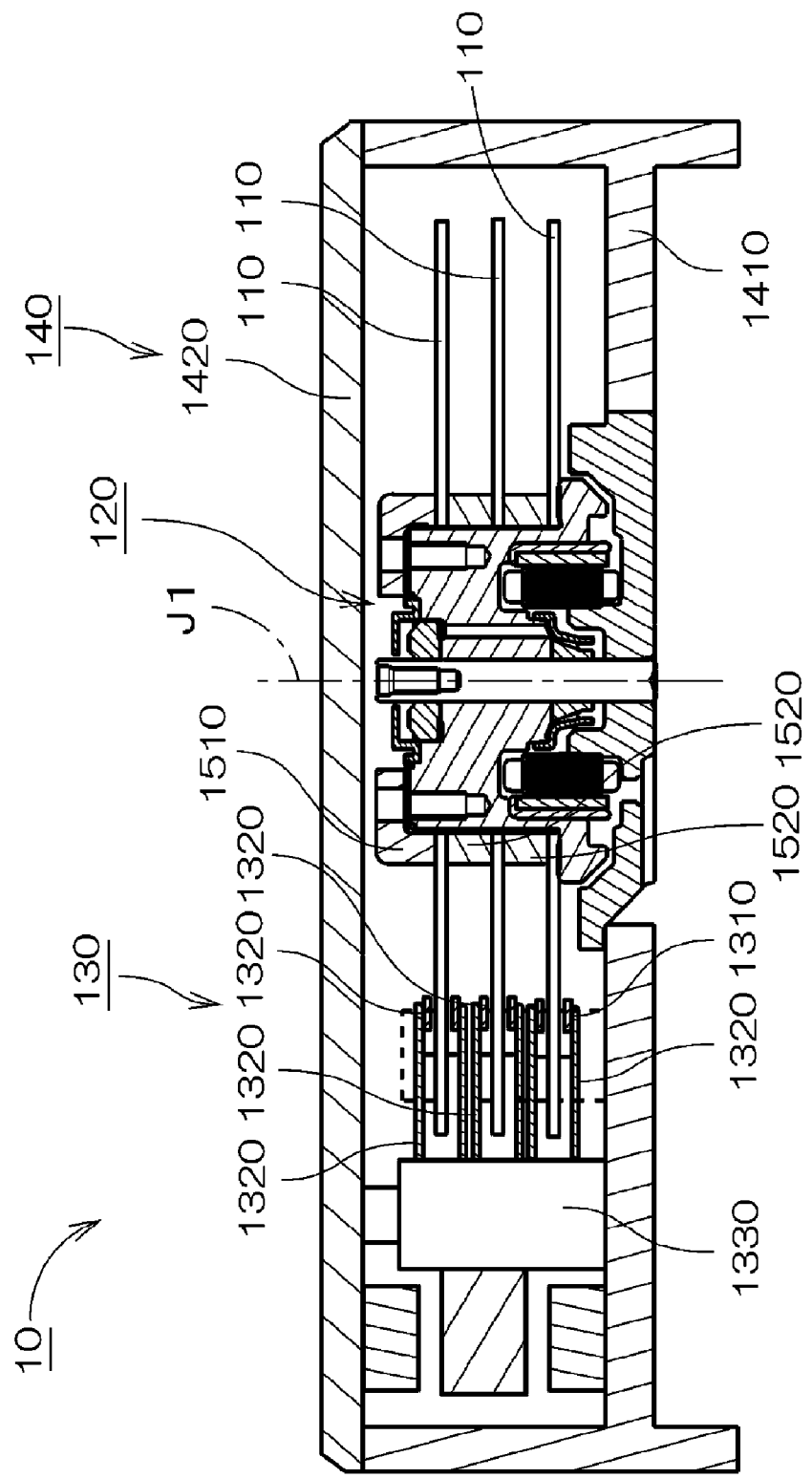
FIG. 21 is a cross-sectional view of a disk drive apparatus according to a preferred embodiment of the present invention.

FIG. 21 is a vertical cross-sectional view of a disk drive apparatus 10 including a spindle motor 120 according to an exemplary preferred embodiment of the present invention. The spindle motor 120 will be hereinafter referred to simply as a "motor".

The disk drive apparatus 10 shown in FIG. 21 is a so-called hard disk drive apparatus. The disk drive apparatus 10 preferably includes three disc-shaped disks 110 used to record information, the motor 120, an access portion 130, and a housing 140, for example. The motor 120 is arranged to rotate while supporting the disks 110. The access portion 130 is arranged to read and/or write information from or to the disks 110. Note that the number of disks 110 is not limited to three and any desirable number of disks 110 could be used.

The housing 140 includes a substantially cup-shaped first housing member 1410, and a flat second housing member 1420. The motor 120 and the access portion 130 are contained inside the first housing member 1410. In the disk drive apparatus 10, the second housing member 1420 is joined to the first housing member 1410 to define the housing 140. An interior space of the disk drive apparatus 10 is clean, substantially free of dust and debris.

A clamper 1510 and spacers 1520 are arranged to fix the three disks 110 to a rotor hub 310 of the motor 120 such that the disks 110 are equally spaced from each other in a direction along a central axis J1. The access portion 130 includes six heads 1310, six arms 1320 arranged to support the heads 1310, and a head actuator mechanism 1330. Note that the access portion 130 is not limited to six heads 1310 and six arms 1320 and any desirable number of heads 1310 and arms 1320 could be used. Each head 1310 is placed close to a corresponding one of the disks 110 to magnetically read and/or write information from or to the disk 110. The head actuator mechanism 1330 is arranged to actuate each arm 1320 to move an associated one of the heads 1310 relative to a corresponding one of the disks 110. According to the above-described structure, each head 1310 is arranged to access a desired location on a corresponding one of the rotating disks 110 while being held close to the disk 110, to read and/or write information from or to the disk 110.

Figure 22:
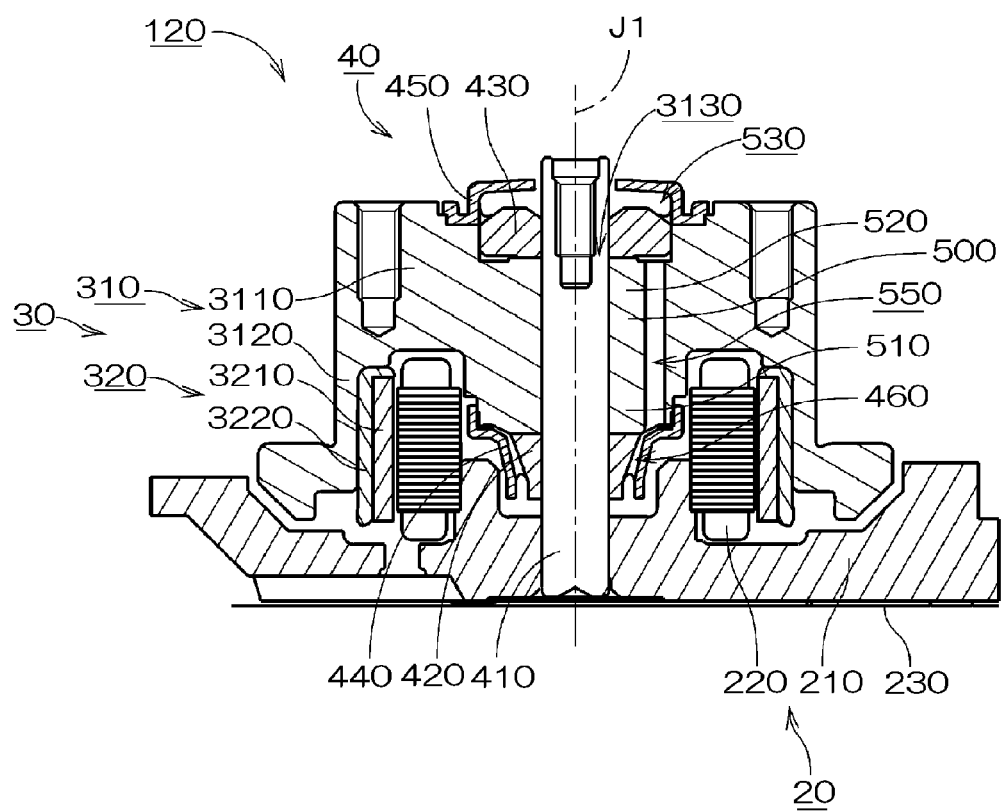
FIG. 22 is a cross-sectional view of a motor according to a preferred embodiment of the present invention.

FIG. 22 is a vertical cross-sectional view of the motor 120. The motor 120 is a motor of an outer rotor type. The motor 120 includes a stationary portion 20, a rotating portion 30, and a fluid dynamic bearing mechanism 40. The fluid dynamic bearing mechanism 40 will be hereinafter referred to simply as the "bearing mechanism" 40. The rotating portion 30 is supported via the bearing mechanism 40 such that the rotating portion 30 is rotatable about the central axis J1 of the motor 120 with respect to the stationary portion 20.

The stationary portion 20 includes a base bracket 210 and an annular stator 220. The base bracket 210 is attached to the first housing member 1410 as illustrated in FIG. 21. The stator 220 is fixed to a circumference of a cylindrical holder provided in the base bracket 210. A hole portion is preferably defined inside the holder, and a lower end portion of a shaft 410 of the bearing mechanism 40 is fixed in the hole portion. A lower end opening of the hole portion is covered by a plate 230.

The rotating portion 30 includes the rotor hub 310 and a field magnet member 320. The rotor hub 310 preferably includes a hub body 3110 and a cylindrical back iron portion 3120. The cylindrical back iron portion 3120 is arranged to protrude downward from an outer edge portion of the hub body 3110. The field magnet member 320 includes a substantially cylindrical rotor magnet 3210 and a back iron 3220. The rotor magnet 3210 is fixed to an inside of the cylindrical back iron portion 3120 through the back iron 3220. The rotor magnet 3210 is arranged opposite to the stator 220 in a radial direction centered on the central axis J1 (hereinafter referred to simply as the "radial direction", "radially", etc.) in order to produce a torque between the stator 220 and the rotor magnet 3210.

The hub body 3110 includes a center bore portion 3130 extending in a direction parallel or substantially parallel to the central axis J1 defined in the center thereof. In the following description, a portion in the vicinity of the central axis J1 including the center bore portion 3130 will be referred to as a "sleeve portion 500". A portion 510 of the sleeve portion 500 which defines a lower portion of the sleeve portion 500 and is positioned in the vicinity of the center protrudes downward. This portion 510 will be hereinafter referred to simply as the "lower portion 510". The hub body 3110 has a recessed portion 530 defined in an upper central portion thereof. A bottom of the recessed portion 530 defines an upper surface of the sleeve portion 500. The recessed portion 530 includes a shoulder portion which is slightly recessed downward and arranged along a circumference thereof. The shaft 410 is inserted in the center bore portion 3130 of the sleeve portion 500. The sleeve portion 500 includes a communicating channel 550 defined therein that extends upward from a bottom thereof in a direction parallel or substantially parallel to the central axis J1. The communicating channel 550 preferably has a circular or substantially circular shape in a cross-section perpendicular or substantially perpendicular to the central axis J1. Note that the shape of the communicating channel 550 in the cross-section is not limited to circular or substantially circular and could be any other desirable shape.

The bearing mechanism 40 preferably includes the shaft 410, a first thrust portion 420, a second thrust portion 430, a first cover portion 440, a second cover portion 450, and a lubricating oil 460. The shaft 410 is secured to the base bracket 210, so that the shaft 410 is fixed, extending in a vertical direction along the central axis J1. The first and second thrust portions 420 and 430 have mutually different shapes, and are each preferably made of phosphor bronze or the like, for example. The rotor hub 310 is preferably made of a stainless steel, aluminum with nickel plating, or the like, for example. Both the first and second thrust portions 420 and 430 preferably have a hardness lower than that of the sleeve portion 500 of the rotor hub 310. The first thrust portion 420 is fixed to the shaft 410 below the sleeve portion 500, whereas the second thrust portion 430 is fixed to the shaft 410 above the sleeve portion 500. The first and second cover portions 440 and 450 have mutually different shapes. The first cover portion 440 is attached to the lower portion 510 of the sleeve portion 500, and arranged opposite to an outside surface of the first thrust portion 420. On the other hand, the second cover portion 450 is fixed to the shoulder portion arranged along the circumference of the recessed portion 530, so as to cover the second thrust portion 430 from above.

In the motor 120, the sleeve portion 500 defines a portion of the bearing mechanism 40, as a portion supported by the shaft 410. That is, the sleeve portion 500 functions as both a portion of the rotating portion 30 and a portion of the bearing mechanism 40. The motor 120 is structured such that the rotating portion 30 is fixed to the sleeve portion 500 of the bearing mechanism 40.

Figure 23:
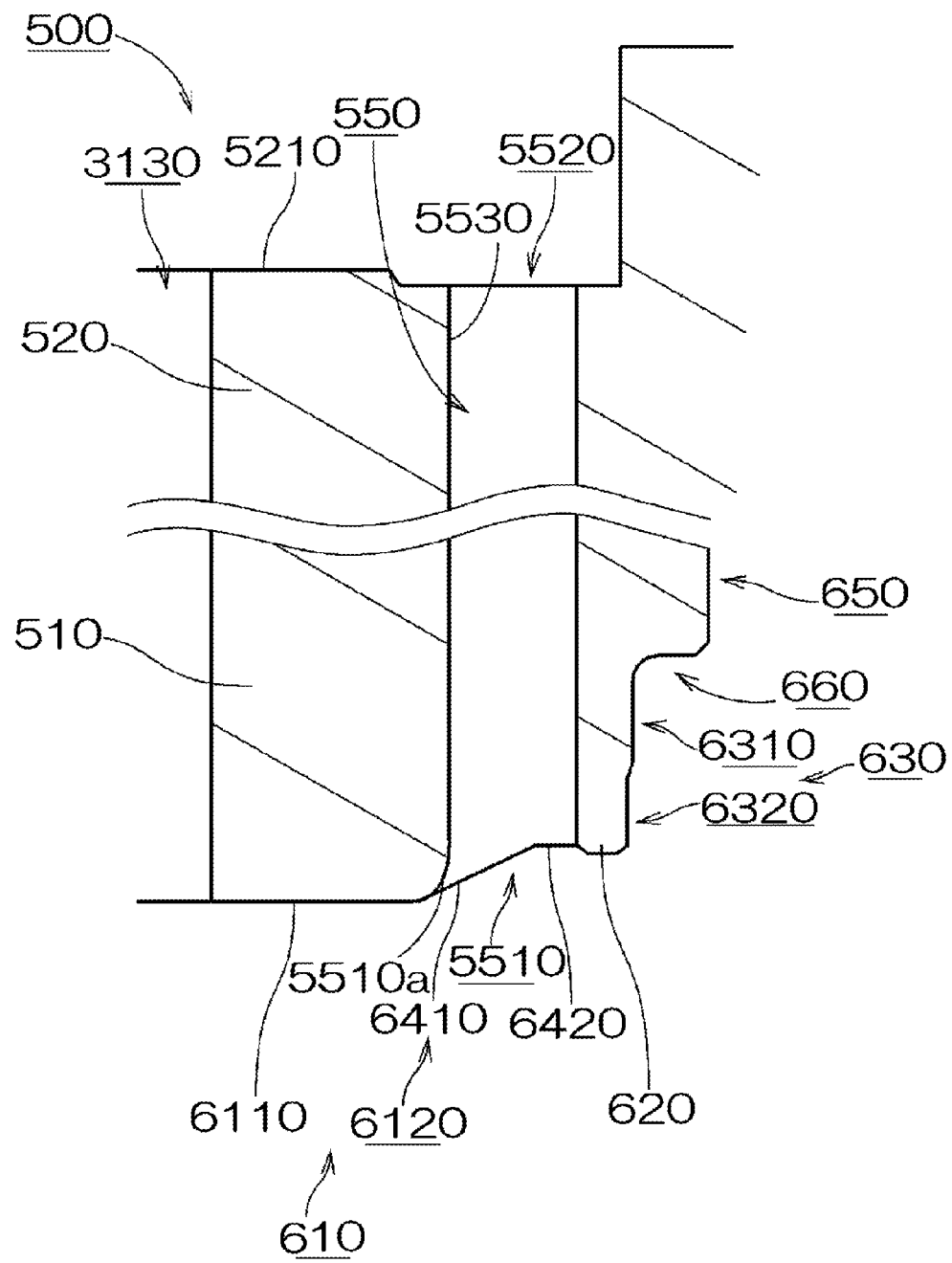
FIG. 23 is a cross-sectional view of a sleeve portion according to a preferred embodiment of the present invention.

FIG. 23 is a half cross-sectional view of the sleeve portion 500, illustrating only the lower portion 510 and an upper portion 520 thereof. The lower portion 510 of the sleeve portion 500 includes a lower surface 610, a protruding portion 620 which protrudes downward, a cover attachment portion 630, an increased diameter portion 650, and a shoulder portion 660. The lower surface 610 preferably includes a lower end surface 6110 and an outer circumferential portion 6120. The lower end surface 6110 is annular in shape and arranged perpendicular or substantially perpendicular to the central axis J1. The outer circumferential portion 6120 is positioned radially outward of the lower end surface 6110. The lower end surface 6110 is positioned at a level lower than that of a lower end (hereinafter referred to as a "lower end opening") 5510 of the communicating channel 550, with respect to a direction parallel or substantially parallel to the central axis J1.

The outer circumferential portion 6120 includes an annular inclined surface 6410 and an outer annular surface 6420. The outer annular surface 6420 is perpendicular or substantially perpendicular to the central axis J1. The annular inclined surface 6410 extends gradually upward with increasing radial distance from the lower end surface 6110. The outer annular surface 6420 is positioned radially outward of the annular inclined surface 6410. The lower end opening 5510 is arranged to extend over both the annular inclined surface 6410 and the outer annular surface 6420. The protruding portion 620 is positioned radially outward of the lower end opening 5510, that is, radially outward of the outer annular surface 6420. The cover attachment portion 630 is defined at a lower end of an outside surface of the lower portion 510. The cover attachment portion 630 has a reduced diameter as compared to the diameter of the other portions of the outside surface of the lower portion 510. The cover attachment portion 630 preferably includes a first reduced diameter portion 6310 and a second reduced diameter portion 6320. The second reduced diameter portion 6320 is positioned below the first reduced diameter portion 6310 and radially inward of the first reduced diameter portion 6310. The diameter of the first reduced diameter portion 6310 preferably is approximately 10.5 mm, for example. The increased diameter portion 650, with a diameter greater than that of the first reduced diameter portion 6310, is defined above the first reduced diameter portion 6310. The shoulder portion 660 is defined between the first reduced diameter portion 6310 and the increased diameter portion 650.

Figure 24:
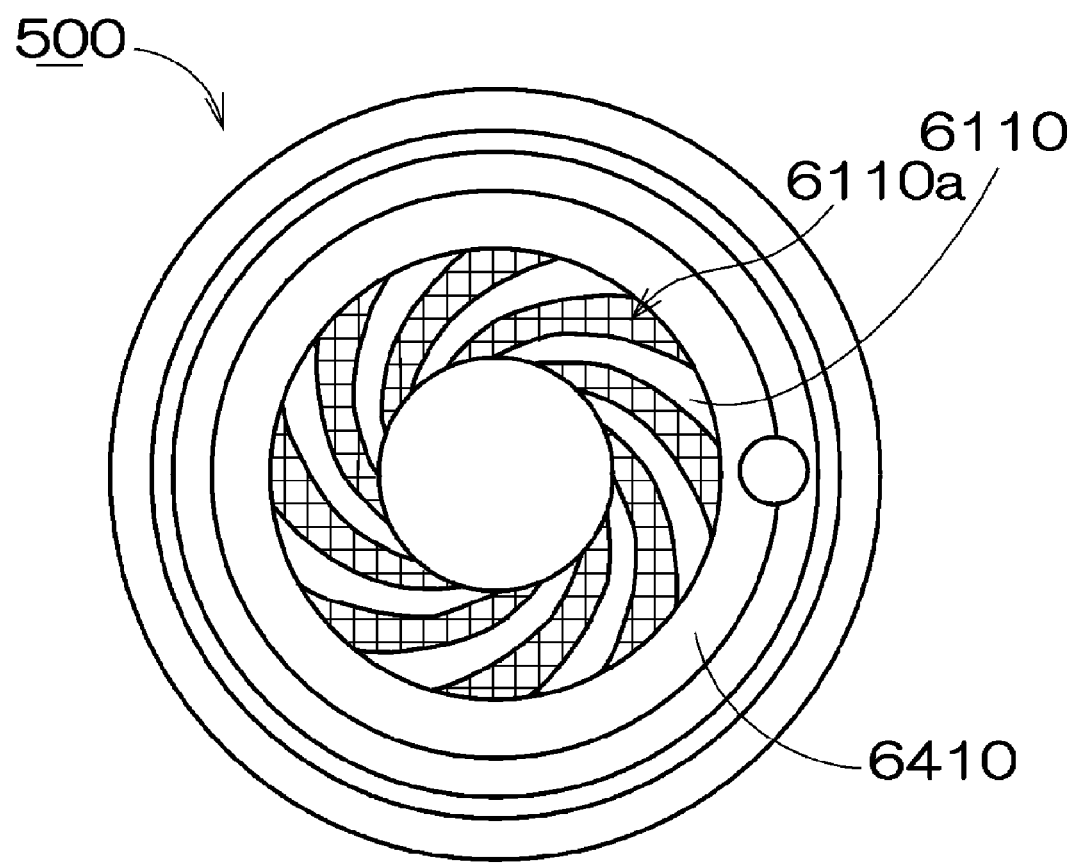
FIG. 24 is a bottom view of the sleeve portion according to a preferred embodiment of the present invention.

A chamfered portion 5510a extending from the outer circumferential portion 6120 into the communicating channel 550 is preferably defined at the lower end opening 5510. A cylindrical surface area stretching above the chamfered portion 5510a, that is, a surface that defines the periphery of the communicating channel 550 and which is circular in plan view, will be hereinafter referred to as a "wall surface 5530" of the communicating channel 550. The distance of a boundary between the chamfered portion 5510a and the lower end surface 6110 from the central axis J1 is substantially equal to the radius of the lower end surface 6110, and the outside diameter of the lower end surface 6110 preferably is in the range of approximately 7 mm to approximately 8 mm, for example. The size of the lower end surface 6110 of the sleeve portion 500 is small, and therefore, in manufacturing the sleeve portion 500, it is possible to machine the center bore portion 3130 at the center and the lower end surface 6110 at once by using cutting tools FIG. 24 is a bottom view illustrating the lower end surface 6110 of the sleeve portion 500 and its vicinity in an enlarged form. The lower end surface 6110 has defined therein dynamic pressure grooves 6110a in a spiral pattern. The dynamic pressure grooves 6110a are arranged to spread up to an inner circumference of the annular inclined surface 6410 as illustrated in FIGS. 23 and 24. During the drive of the motor 120, the dynamic pressure grooves 6110a are arranged to rotate to induce (i.e., pump) the lubricating oil 460 to travel inward in the dynamic pressure grooves 6110a, resulting in a sufficient dynamic pressure to drive the motor 120. This configuration contributes to preventing the generation of air bubbles due to a reduced internal pressure of the lubricating oil 460.

Referring to FIG. 23, the upper portion 520 of the sleeve portion 500 includes an upper end surface 5210 which is annular in shape and perpendicular or substantially perpendicular to the central axis J1. The upper end surface 5210 has defined therein dynamic pressure grooves in substantially the same arrangement as that of the dynamic pressure grooves 6110a as illustrated in FIG. 24. More specifically, the dynamic pressure grooves in the upper end surface 5210 are arranged, in plan view, in reverse orientation with respect to a circumferential direction about the central axis J1, as compared to the dynamic pressure grooves 6110a. An upper end 5520 of the communicating channel 550 is positioned radially outward of the upper end surface 5210. The upper end 5520 of the communicating channel 550 will be hereinafter referred to as an "upper end opening 5520".

Figure 25A:
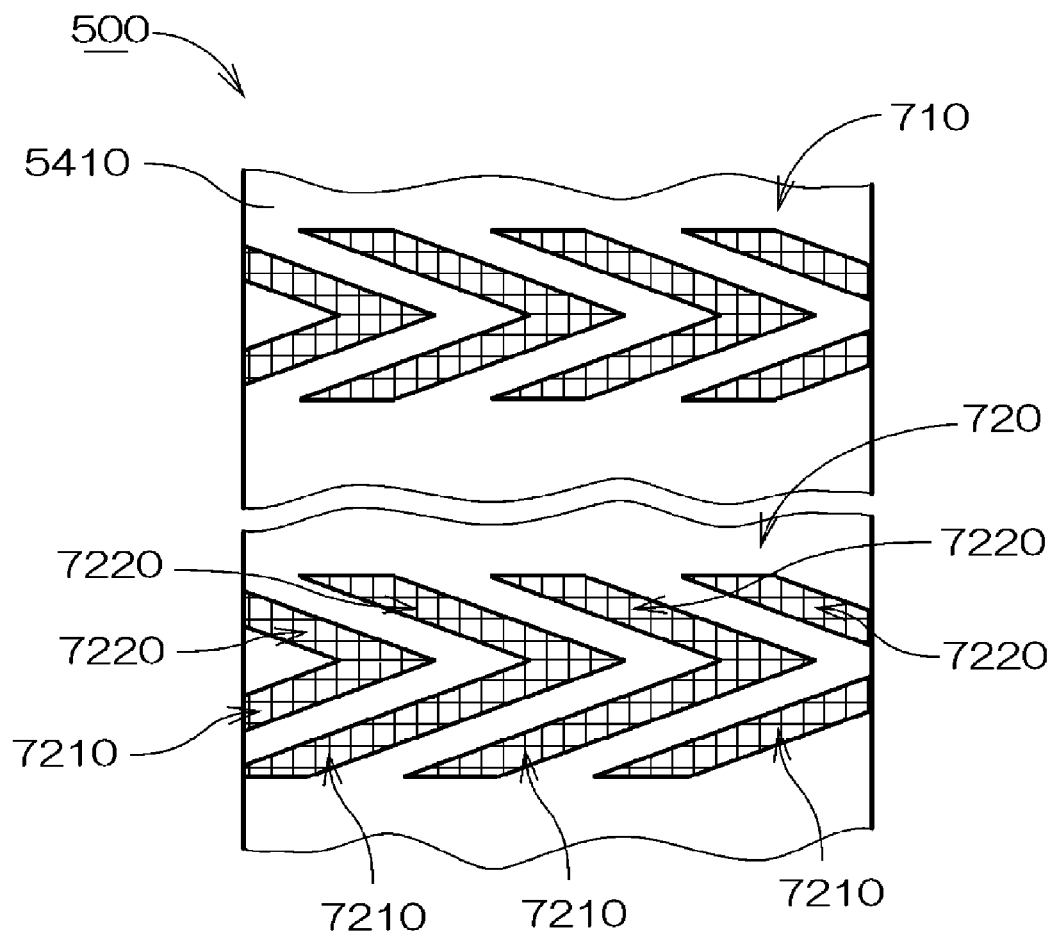
FIG. 25A is a diagram illustrating an inside surface of the sleeve portion according to a preferred embodiment of the present invention.

Referring to FIG. 25A, an inside surface 5410 of the sleeve portion 500 preferably includes dynamic pressure grooves 710 and 720 in a herringbone pattern defined thereon, at an upper portion and a lower portion thereof, respectively. More specifically, the dynamic pressure grooves 710 and 720 are arranged in the circumferential direction on the inside surface 5410, such that each one of the dynamic pressure grooves 710 and 720 assumes the shape of the letter "V" turned sideways. Each one of the lower dynamic pressure grooves 720 preferably includes a lower groove portion 7210 longer than an upper groove portion 7220 thereof. This arrangement of the dynamic pressure grooves 720 contributes to producing a pressure that acts to cause the lubricating oil 460 to flow upward in a radial gap described below, so that the lubricating oil 460 will then travel through the communicating channel 550 as illustrated in FIG. 23 to complete circulation.

Figure 25B:
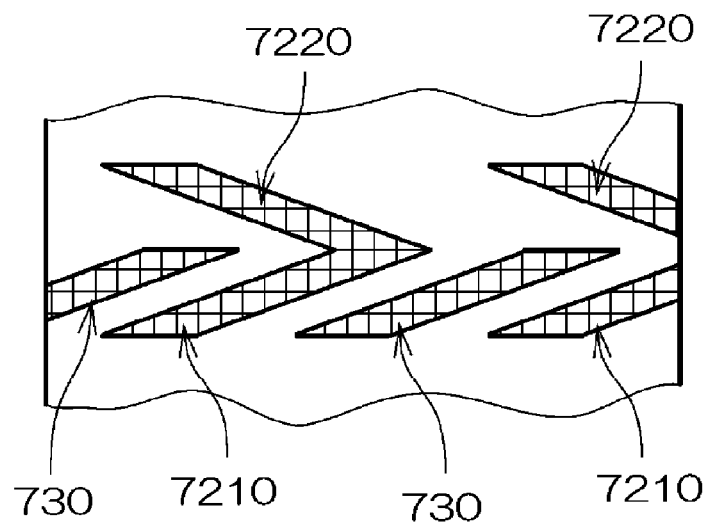
FIGS. 25B and 25C are diagrams illustrating an inside surface of a sleeve portion according to other preferred embodiments of the present invention.
Figure 25C:
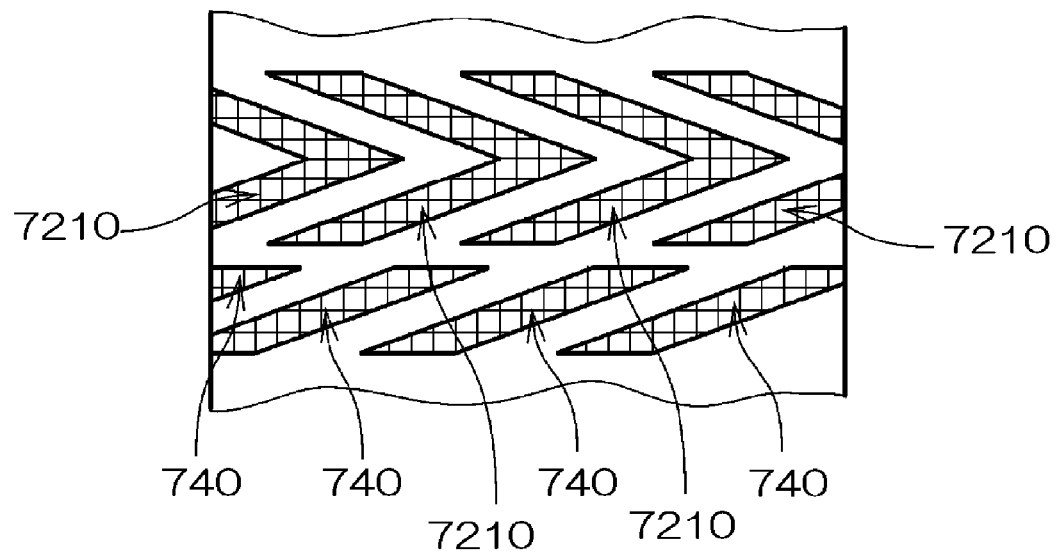

Referring to FIG. 25B, regarding the lower dynamic pressure grooves 720, the length of the lower groove portion 7210 may be substantially equal to that of the upper groove portion 7220 in a modification of the present preferred embodiment. In this case, an inclined groove 730 extending in parallel or substantially in parallel with the lower groove portions 7210 may be arranged between each pair of adjacent lower groove portions 7210. Also, referring to FIG. 25C, an inclined groove 740 extending in parallel or substantially in parallel with the lower groove portions 7210 may be arranged below each one of the lower groove portions 7210, in a modification of the present preferred embodiment.

In the bearing mechanism 40, a slight gap is defined between the inside surface 5410 of the sleeve portion 500 illustrated in FIG. 25A and an outside surface of the shaft 410 illustrated in FIG. 22. This gap will be hereinafter referred to as the "radial gap". During the drive of the motor 120, the dynamic pressure grooves 710 and 720 in the herringbone pattern serve to produce a radial dynamic pressure on the lubricating oil 460 in the radial gap, resulting in formation of a radial bearing portion which supports the sleeve portion 500 in directions perpendicular or substantially perpendicular to the central axis J1 in relation to the shaft 410. Hereinafter, the radial gap and the radial bearing portion will be denoted by reference numerals 870 and 8710, respectively.

Figure 26:
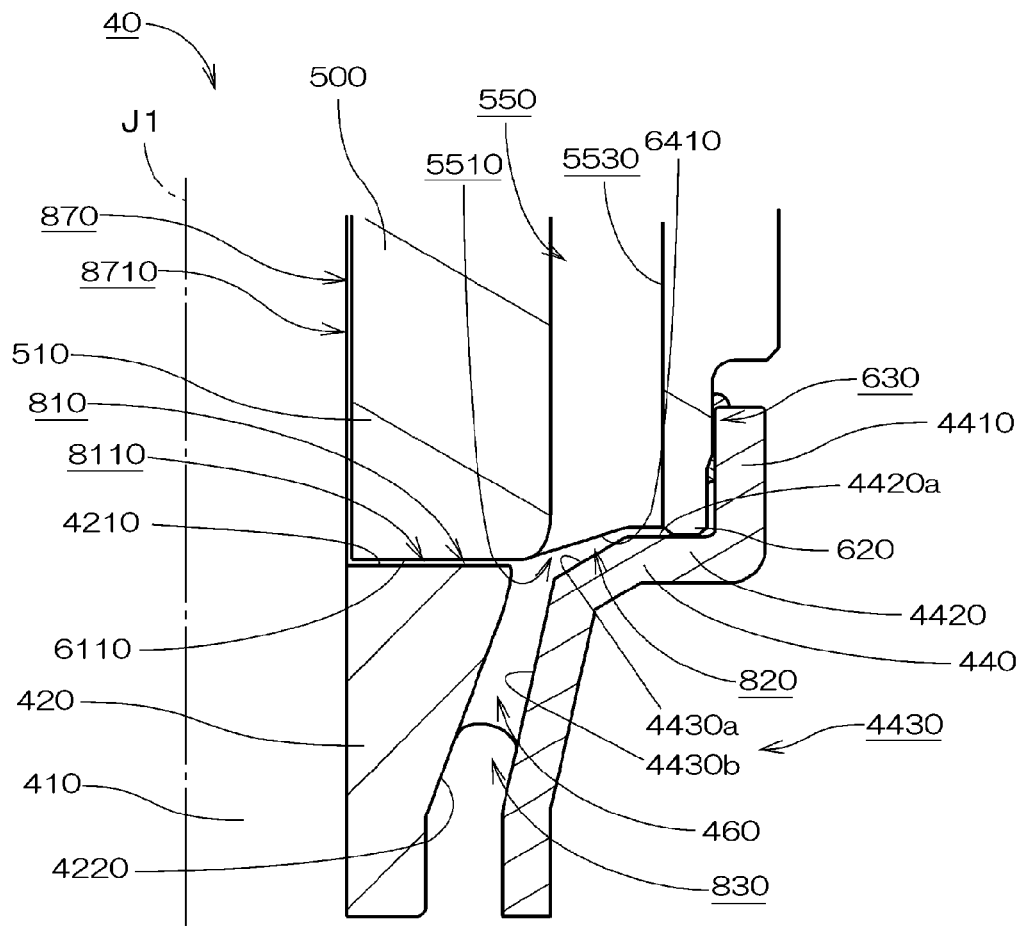
FIGS. 26 and 27 are enlarged views of a lower portion of a bearing mechanism according to a preferred embodiment of the present invention.

FIG. 26 is a half cross-sectional view illustrating a lower portion of the bearing mechanism 40 in an enlarged form. The first thrust portion 420 is arranged to spread radially outward from the shaft 410 to assume the shape of a ring. The first thrust portion 420 has an upper surface 4210 which is perpendicular or substantially perpendicular to the central axis J1, and a conical surface 4220 which is substantially in the shape of a cone and which defines the outside surface of the first thrust portion 420. The conical surface 4220 is so shaped as to gradually decrease in distance from the central axis J1 in a downward direction. The upper surface 4210 is arranged opposite to the lower end surface 6110 of the sleeve portion 500 to define a slight gap between the upper surface 4210 and the lower end surface 6110. This gap will be hereinafter referred to as a "first thrust gap 810". During the drive of the motor 120, a first thrust bearing portion 8110 is formed in the first thrust gap 810 to produce a thrust dynamic pressure on the lubricating oil 460 between the first thrust portion 420 and the sleeve portion 500 through the dynamic pressure grooves 6110a in the spiral pattern as illustrated in FIG. 24.

As illustrated in FIG. 26, the first cover portion 440 includes a cylindrical portion 4410 extending upward in a direction parallel or substantially parallel to the central axis J1, an annular portion 4420 centered on the central axis J1, and an inclined portion 4430 adjacent to the annular portion 4420. The cylindrical portion 4410 is arranged in contact with the cover attachment portion 630 of the sleeve portion 500 along a direction perpendicular or substantially perpendicular to the central axis J1.

Figure 27:
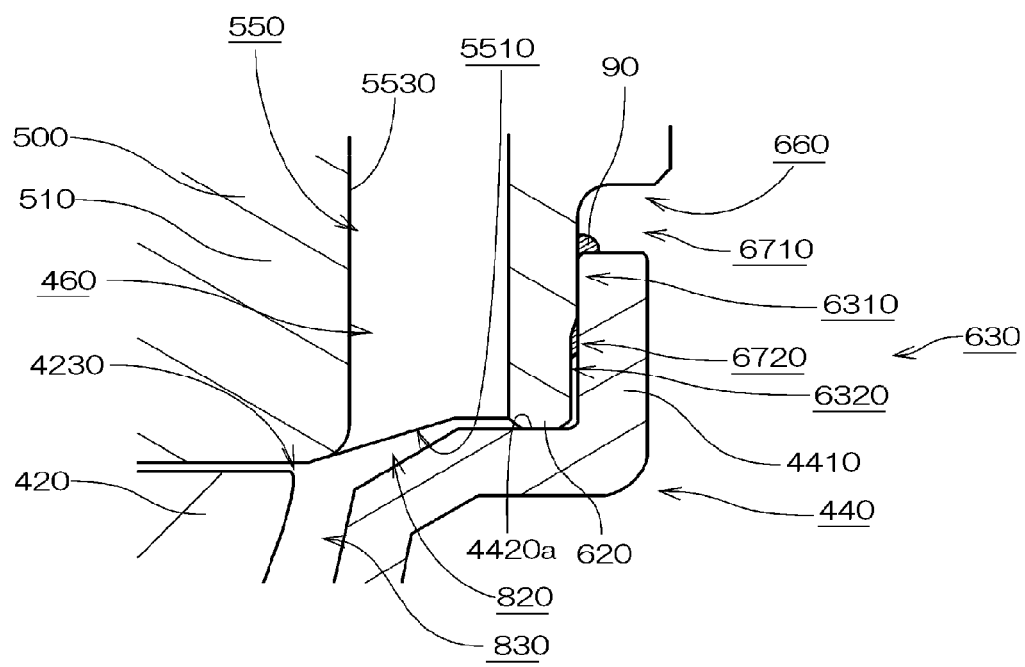

FIG. 27 is a diagram illustrating the lower end opening 5510 and its vicinity as illustrated in FIG. 26 in an enlarged form. The shoulder portion 660, which is adjacent to an upper end of the first reduced diameter portion 6310, and an upper end of the cylindrical portion 4410 together define a gap 6710 therebetween along a direction parallel or substantially parallel to the central axis J1. The width of the gap 6710 along the direction parallel or substantially parallel to the central axis J1 is preferably in the range of approximately 0.3 mm to approximately 0.6 mm, for example. The cylindrical portion 4410 is press fitted to an outside surface of the first reduced diameter portion 6310, and at the same time secured thereto through an adhesive 90. Since the width of the gap 6710 falls within the aforementioned range, occurrence of a production error in the first cover portion 440 or the like would not result in a contact of the cylindrical portion 4410 with the shoulder portion 660.

As illustrated in FIG. 26, an upper surface 4420a of the annular portion 4420 is annular in shape and perpendicular or substantially perpendicular to the central axis J1. The upper surface 4420a is arranged opposite to a portion of the lower end opening 5510 of the communicating channel 550 along a direction parallel or substantially parallel to the central axis J1, and at the same time arranged in contact with the protruding portion 620 of the sleeve portion 500 along a direction parallel or substantially parallel to the central axis J1. This arrangement prevents the first cover portion 440 from closing the lower end opening 5510. The upper surface 4420a will be hereinafter referred to as an "annular contact surface 4420a".

The inclined portion 4430 includes a first annular inclined surface 4430a and a second annular inclined surface 4430b. The first annular inclined surface 4430a is annular in shape and arranged radially inward of and adjacent to the annular contact surface 4420a. The second annular inclined surface 4430b is annular in shape and arranged radially inward of and adjacent to the first annular inclined surface 4430a. The first annular inclined surface 4430a is arranged to extend gradually upward with increasing radial distance from the lower end surface 6110 of the sleeve portion 500 and the upper surface 4210 of the first thrust portion 420. The second annular inclined surface 4430b is angled radially outward in an upward direction, at an angle to the central axis J1 that is less than the angle at which the first annular inclined surface 4430a is angled relative to the central axis J1.

The first annular inclined surface 4430a is arranged opposite to the annular inclined surface 6410 of the sleeve portion 500, such that the first annular inclined surface 4430a and the annular inclined surface 6410 together define a slight gap 820 therebetween. During the drive of the motor 120, this gap 820 serves to direct the lubricating oil 460 from the lower end opening 5510 of the communicating channel 550 toward the first thrust gap 810. The gap 820 will be hereinafter referred to as a "guide gap 820". The guide gap 820 gradually increases in width in the downward direction and with decreasing distance from the central axis J1. The maximum width of the guide gap 820 is preferably about 0.2 mm or greater in order to reduce channel resistance in the guide gap 820, and is preferably about 0.4 mm or less in order to reduce the amount of the lubricating oil 460, for example. Note that the width of the gap refers to the width thereof on a plane that intersects with the surfaces on both sides defining the gap at the same angle.

The second annular inclined surface 4430b and the conical surface 4220 of the first thrust portion 420 together define a gap 830 therebetween. The gap 830 has an interface of the lubricating oil 460 therewithin. The gap 830 is positioned closer to the central axis J1 than a radially outermost point of the wall surface 5530 of the communicating channel 550. The gap 830 is arranged to gradually increase in width in the downward direction. The gap 830 will be hereinafter referred to as a "first tapered gap 830".

The minimum width of the first tapered gap 830 is greater than the maximum width of the guide gap 820. In addition, both the minimum width of the first tapered gap 830 and the maximum width of the guide gap 820 are smaller than the width of the communicating channel 550. In the bearing mechanism 40, the guide gap 820 and the first tapered gap 830 together form a channel that gradually increases in width in the downward direction. The first thrust gap 810 spreading from the central axis J1 is arranged in the vicinity of a boundary between the guide gap 820 and the first tapered gap 830. The width of the first thrust gap 810 along a direction parallel or substantially parallel to the central axis J1 is smaller than the minimum width of the guide gap 820.

Figure 28:
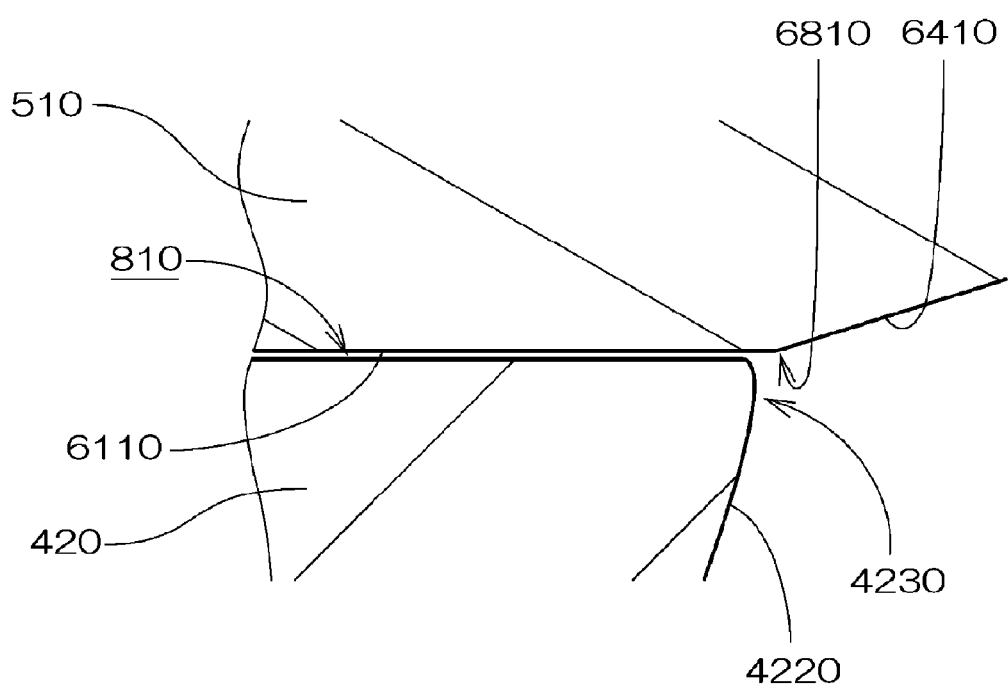
FIG. 28 is an enlarged view of a first thrust gap according to a preferred embodiment of the present invention.

FIG. 28 is a cross-sectional view illustrating the first thrust gap 810 and its vicinity in an enlarged form. More specifically, FIG. 28 illustrates cross-sections of portions of the lower portion 510 of the sleeve portion 500 and the first thrust portion 420 taken where the communicating channel 550 illustrated in FIG. 26 is not provided. The outside diameter of the first thrust portion 420, i.e., the radial dimension of a portion 4230 of the first thrust portion 420 which is positioned at an outermost periphery of the conical surface 4220 in plan view, is smaller than the diameter of the lower end surface 6110 of the sleeve portion 500, i.e., the diameter of an edge 6810 at a boundary between the lower end surface 6110 and the annular inclined surface 6410. The portion 4230 will be hereinafter referred to as a "radially outermost portion 4230" of the first thrust portion 420. Moreover, as illustrated in FIG. 27, the radially outermost portion 4230 is, in plan view, positioned closer to the central axis J1 than the wall surface 5530 of the communicating channel 550.

Figure 29:
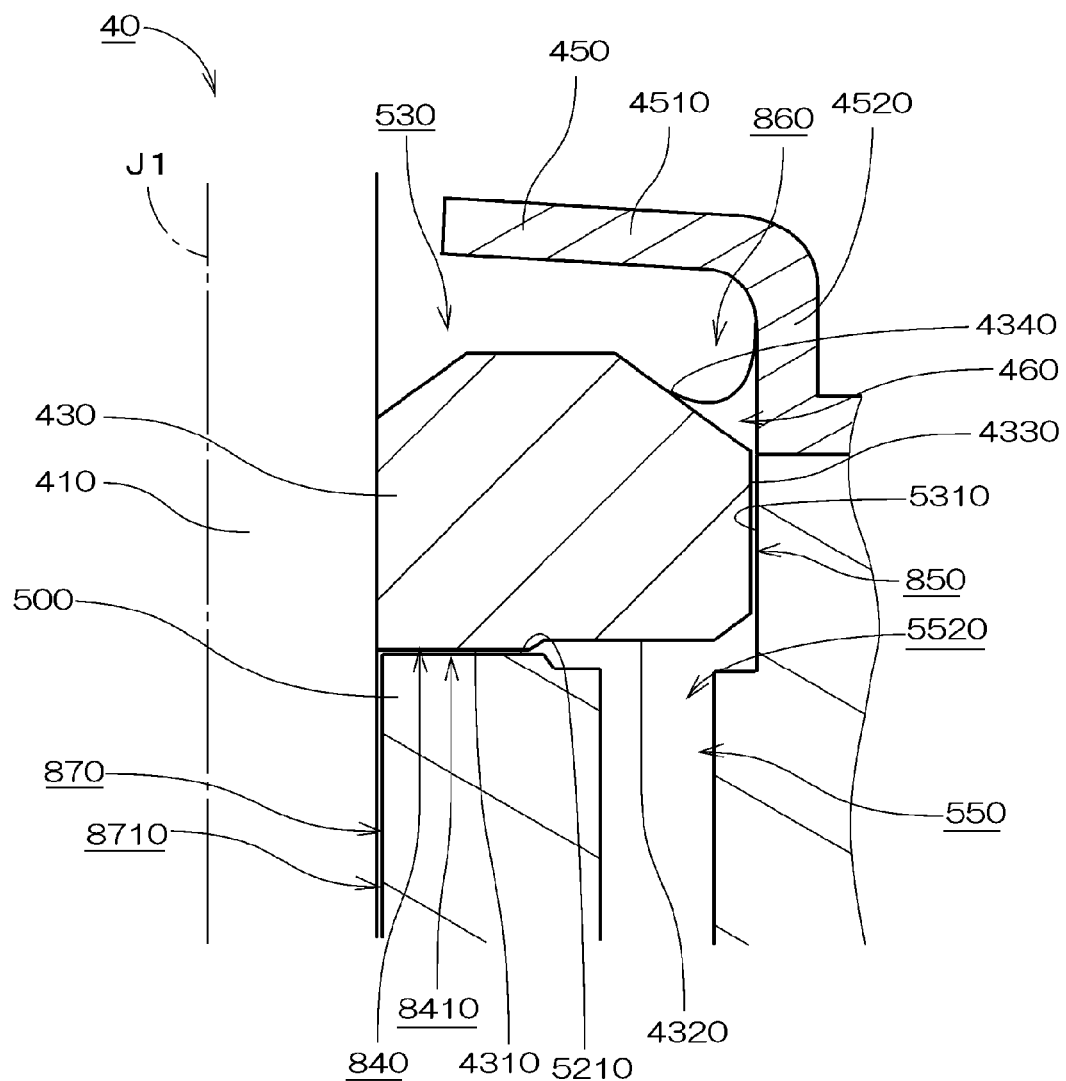
FIG. 29 is an enlarged view of an upper portion of the bearing mechanism.

FIG. 29 is a cross-sectional view illustrating an upper portion of the bearing mechanism 40 in an enlarged form. The second thrust portion 430, which is arranged opposite to the upper end surface 5210 of the sleeve portion 500, is arranged to spread radially outward from the shaft 410 to substantially assume the shape of a ring, and is arranged in the recessed portion 530 of the hub body 3110.

The second thrust portion 430 has a lower surface 4310 which is annular in shape, an outer annular surface 4320, an outside surface 4330 which is parallel or substantially parallel to the central axis J1, and an inclined surface 4340. The lower surface 4310 is arranged to protrude slightly downward. The outer annular surface 4320 is positioned radially outward of the lower surface 4310. The inclined surface 4340 extends upward from an upper end of the outside surface 4330 while becoming progressively closer to the central axis J1. The outer annular surface 4320 of the second thrust portion 430 is arranged opposite to the communicating channel 550 along a direction parallel or substantially parallel to the central axis J1.

In an area between an upper portion of the radial gap 870 and the upper end opening 5520 of the communicating channel 550, the lower surface 4310 of the second thrust portion 430 is arranged opposite to the upper end surface 5210 of the sleeve portion 500 to define a slight gap 840 between the upper end surface 5210 and the lower surface 4310. This gap 840 will be hereinafter referred to as a "second thrust gap 840".

Figure 30:
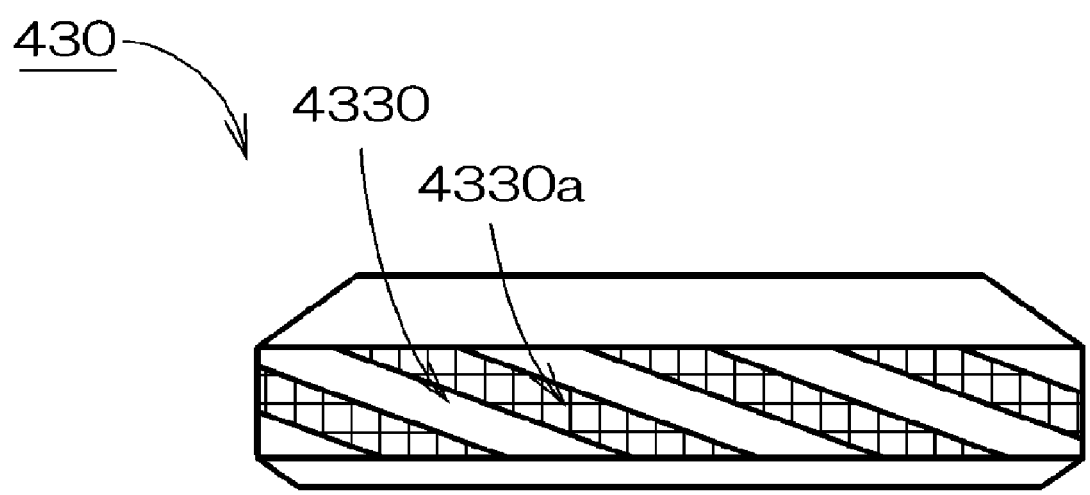
FIG. 30 is a front view of a second thrust portion according to a preferred embodiment of the present invention.

In the bearing mechanism 40, the communicating channel 550 and the upper portion of the radial gap 870 are in indirect communication with each other through the second thrust gap 840. The outside surface 4330 of the second thrust portion 430 is arranged opposite to a side wall 5310 of the recessed portion 530 with a gap 850 defined therebetween. This gap 850 will be hereinafter referred to as a "side gap 850". As illustrated in FIG. 30, the outside surface 4330 has defined therein a plurality of dynamic pressure grooves 4330a which are all angled in such a manner that they are oriented in a single direction.

During the drive of the motor 120, a second thrust bearing portion 8410 is formed in the second thrust gap 840 illustrated in FIG. 29 to produce a thrust dynamic pressure on the lubricating oil 460 through the dynamic pressure grooves in the spiral pattern. In the side gap 850, the dynamic pressure grooves 4330a serve to produce a dynamic pressure to cause the lubricating oil 460 to flow downward. This dynamic pressure contributes to preventing the lubricating oil 460 from leaking through a second tapered gap 860 described below.

Figure 31:
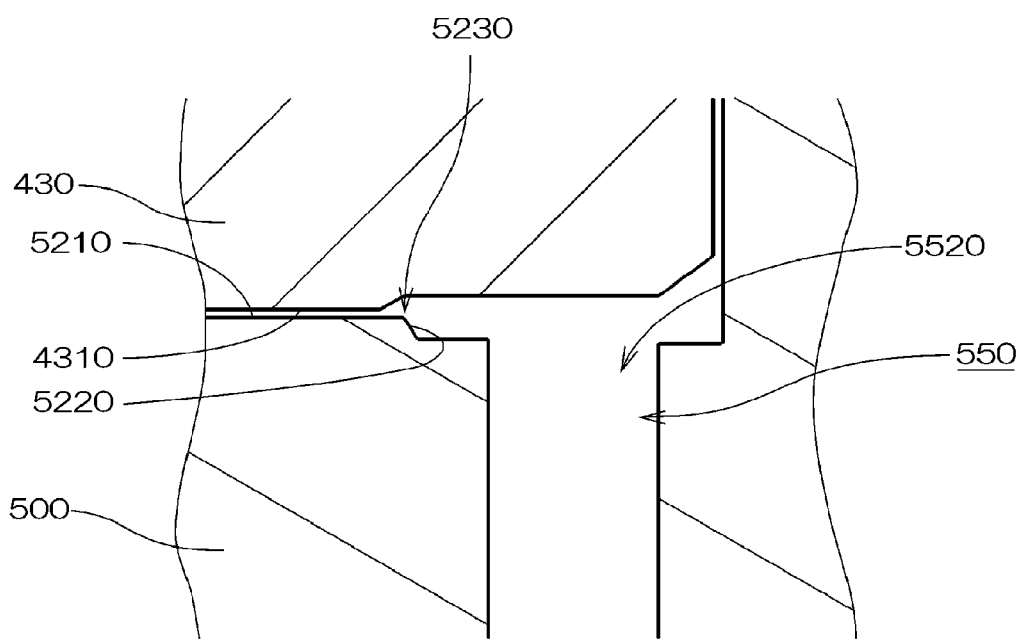
FIG. 31 is an enlarged view of the upper portion of the bearing mechanism.

FIG. 31 is a diagram illustrating the upper end opening 5520 of the communicating channel 550 illustrated in FIG. 29 and its vicinity in an enlarged form. The upper end opening 5520 is positioned at a level lower than that of the upper end surface 5210. The sleeve portion 500 has defined thereon an inclined surface 5220 extending obliquely from an outer circumference of the upper end surface 5210 toward the upper end opening 5520. The diameter of the lower surface 4310 of the second thrust portion 430 is smaller than the diameter of the upper end surface 5210 of the sleeve portion 500, i.e., the diameter of an edge 5230 at a boundary between the upper end surface 5210 and the inclined surface 5220.

Referring to FIG. 29, the second cover portion 450 includes a disk portion 4510 and a side portion 4520. The disk portion 4510 is angled slightly downward in a radially outward direction. The side portion 4520 extends downward from a radially outer end of the disk portion 4510. The side portion 4520 and the inclined surface 4340 of the second thrust portion 430 together define the second tapered gap 860 therebetween, such that the second tapered gap 860 gradually increases in width in the upward direction. The second tapered gap 860 has an interface of the lubricating oil 460 therewithin.

Referring to FIGS. 26 and 29, the lubricating oil 460 is arranged to fill, continuously without interruption, the guide gap 820, the first tapered gap 830, the first thrust gap 810, the radial gap 870, the second thrust gap 840, the side gap 850, the second tapered gap 860, and the communicating channel 550.

Regarding the motor 120, during rotation of the sleeve portion 500 about the central axis J1 with respect to the shaft 410, the sleeve portion 500 is supported by the first and second thrust bearing portions 811 and 841 in the direction along the central axis J1, and supported by the radial bearing portion 871 in a direction perpendicular or substantially perpendicular to the central axis J1.

At this time, the lubricating oil 460 is caused to flow downward through the communicating channel 550, and the guide gap 820 illustrated in FIG. 26 serves to direct the lubricating oil 460 from the lower end opening 5510 of the communicating channel 550 in the direction of the first tapered gap 830 and toward the first thrust gap 810. When the lubricating oil 460 contains any air bubble, the air bubble is caused to travel through the guide gap 820 and the first tapered gap 830 to be discharged to an outside through the interface of the lubricating oil 460. In addition, the lubricating oil 460 is caused to flow through the first thrust gap 810 to a bottom of the radial gap 870, flow through the radial gap 870 to a top thereof, and flow through the second thrust gap 840 illustrated in FIG. 29 back again into the communicating channel 550. That is, the guide gap 820 is defined between the outer circumferential portion 6120 of the sleeve portion 500 and the first cover portion 440 to direct the lubricating oil 460 from the lower end opening 5510 in the direction of the first tapered gap 830 and toward the first thrust gap 810. In other words, in the space between the outer circumferential portion 6120 of the sleeve portion 500 and the first cover portion 440, the guide gap 820 serves to cause the lubricating oil 460 to flow from the lower end opening 5510 in the direction of the first tapered gap 830 and toward the first thrust gap 810.

In the bearing mechanism 40, the sleeve portion 500 is supported without contact with the shaft 410. Therefore, the rotating portion 30 illustrated in FIG. 22 is able to rotate with respect to the stationary portion 20 with high precision and limited noise.

As described above, since in the bearing mechanism 40 the outside diameter of the first thrust portion 420 is smaller than the diameter of the lower end surface 6110 of the sleeve portion 500, the lubricating oil 460 is sent from the lower end opening 5510 of the communicating channel 550 into the first thrust gap 810. In the bearing mechanism 40, the lower end opening 5510 of the communicating channel 550 is positioned at a level higher than that of the first thrust gap 810, while at the same time the guide gap 820 is arranged opposite to the lower end opening 5510 to be angled with respect to the annular inclined surface 6410. This arrangement contributes to smoothening the flow of the lubricating oil 460 from the lower end opening 5510 to the first thrust gap 810, thereby preventing generation of a swirl, and contributes to a smooth supply of the lubricating oil 460 into the first thrust gap 810.

Moreover, in the lower portion of the bearing mechanism 40, any air bubble in the lubricating oil 460 is discharged through the first tapered gap 830, while the lubricating oil 460 is supplied into the first thrust gap 810. The channel formed by the combination of the guide gap 820 and the first tapered gap 830 gradually increases in width in the downward direction, to facilitate the discharge of the air bubble to the outside. A centrifugal force produced in the guide gap 820 by the rotation of the rotor hub 310 causes the pressure on the lubricating oil 460 to become lower at locations closer to the central axis J1 than at locations farther from the central axis J1. This pressure difference facilitates travel of any air bubble, with a lower specific gravity than that of the lubricating oil 460, in the direction of the central axis J1, resulting in easy discharge of the air bubble into the first tapered gap 830.

Since the guide gap 820 is arranged to gradually increase in width in the downward direction, occurrence of a production error would not cause an excessive local narrowing of the guide gap 820, which ensures unrestricted travel of any air bubble through the guide gap 820.

In the bearing mechanism 40, the diameter of the upper surface 4210 of the first thrust portion 420 is smaller than the diameter of the lower end surface 6110 of the sleeve portion 500, and this contributes to preventing the edge 6810 at the boundary between the annular inclined surface 6410 and the lower end surface 6110 of the sleeve portion 500 from coming into contact with the upper surface 4210 of the first thrust portion 420. Accordingly, even if the hardness of the first thrust portion 420 is lower than that of the sleeve portion 500, generation of abrasion particles in the first thrust gap 810 is limited. Similarly, the diameter of the lower surface 4310 of the second thrust portion 430 is smaller than the diameter of the upper end surface 5210 of the sleeve portion 500, and this contributes to preventing the edge 5230 of the upper end surface 5210 of the sleeve portion 500 from coming into contact with the lower surface 4310 of the second thrust portion 430. Accordingly, generation of abrasion particles in the second thrust gap 840 is limited. This leads to a prolonged life of the bearing mechanism 40.

As described above, regarding the bearing mechanism 40, even if the first and second thrust portions 420 and 430 are not made of a high wear-resistant material or subjected to surface coating or the like, abrasion of the first and second thrust portions 420 and 430 is limited. Needless to say, the first and second thrust portions 420 and 430 may be made of a high wear-resistant material or subjected to surface coating or the like.

The above-described techniques for limiting the generation of abrasion particles in the thrust gaps are also applicable to other fluid dynamic bearing mechanisms than the bearing mechanism 40. That is, in the case where a thrust gap is defined by two members with different hardness, the generation of abrasion particles in the thrust gap can be limited by making the diameter of a thrust surface of the member with the lower hardness smaller than the diameter of a thrust surface of the other member with the higher hardness. The same is true of the radial gap. That is, the generation of abrasion particles in the radial gap can be limited by making the width of a radial surface of a member with lower hardness smaller than the width of a radial surface of a member with higher hardness.

Now, regarding the assemblage of the bearing mechanism 40, when the first cover portion 440 illustrated in FIG. 27 is attached to the sleeve portion 500, the sleeve portion 500 is placed upside down, and in this situation, the first cover portion 440 is moved toward the lower portion 510 from above the sleeve portion 500 so that the cylindrical portion 4410 of the first cover portion 440 is press fitted to the lower portion 510. The adhesive 90 is applied to the second reduced diameter portion 6320 beforehand. Therefore, the movement of the cylindrical portion 4410 involves spreading the adhesive 90 to expand the adhesive 90 over the first reduced diameter portion 6310. In this manner, the first cover portion 440 is press fitted to the cover attachment portion 630 and secured thereto through the adhesive 90. The annular contact surface 4420a of the first cover portion 440 is brought into contact with the protruding portion 620, so that the position of the first cover portion 440 relative to the sleeve portion 500 in a direction parallel or substantially parallel to the central axis J1 is easily determined.

Because the first cover portion 440 is secured to the sleeve portion 500 by press fitting, the deformation of the first cover portion 440 is more effectively prevented than if the first cover portion 440 were secured to the sleeve portion 500 by a swage or the like, which improves the precision with which the guide gap 820 and the first tapered gap 830 are defined. The inclusion of the second reduced diameter portion 6320 in the cover attachment portion 630 facilitates the fitting of the first cover portion 440 to the lower portion 510 of the sleeve portion 500. Moreover, the second reduced diameter portion 6320 also serves as a sign to facilitate proper application of the adhesive 90 to the desired location.

In the case of a motor in which an annular cover portion is secured to an outside surface of a lower portion of a sleeve portion through an adhesive, the adhesive may be forced out of a space between the cover portion and the sleeve portion to intrude into a bearing mechanism, or become attached to another member near the bearing mechanism. Referring to FIG. 27, in the case of the motor 120, however, the gap 6710 is arranged between the upper end of the cylindrical portion 4410 and the shoulder portion 660 of the sleeve portion 500, and the gap 6710 retains a portion of the adhesive 90 which is forced out of the space between the cylindrical portion 4410 and the cover attachment portion 630. The adhesive 90 is thus prevented from coming into contact with other members, such as the stator 22, etc.

Moreover, the adhesive 90 is prevented from flowing radially inward, because a slight gap 6720 defined between the second reduced diameter portion 6320 and the cylindrical portion 4410 retains the adhesive 90. The width of the gap 6720 measured in a direction perpendicular or substantially perpendicular to the central axis J1 preferably is approximately 50 μm, for example. Furthermore, the contact of the protruding portion 620 with the annular contact surface 4420a further ensures the prevention of the radially inward flow of the adhesive 90.

In the bearing mechanism 40, the gap 6720 is sealed by the adhesive 90 across its entire circumference, so that the lubricating oil 460 is prevented from leaking through the space between the cover attachment portion 630 and the cylindrical portion 4410. Therefore, in a procedure for testing the bearing mechanism 40, it is possible to omit a leak test of testing the bearing mechanism 40 for a leak of gas through the space between the cover attachment portion 630 and the cylindrical portion 4410, by introducing gas, such as air or helium, into the bearing mechanism 40.

Figure 32:
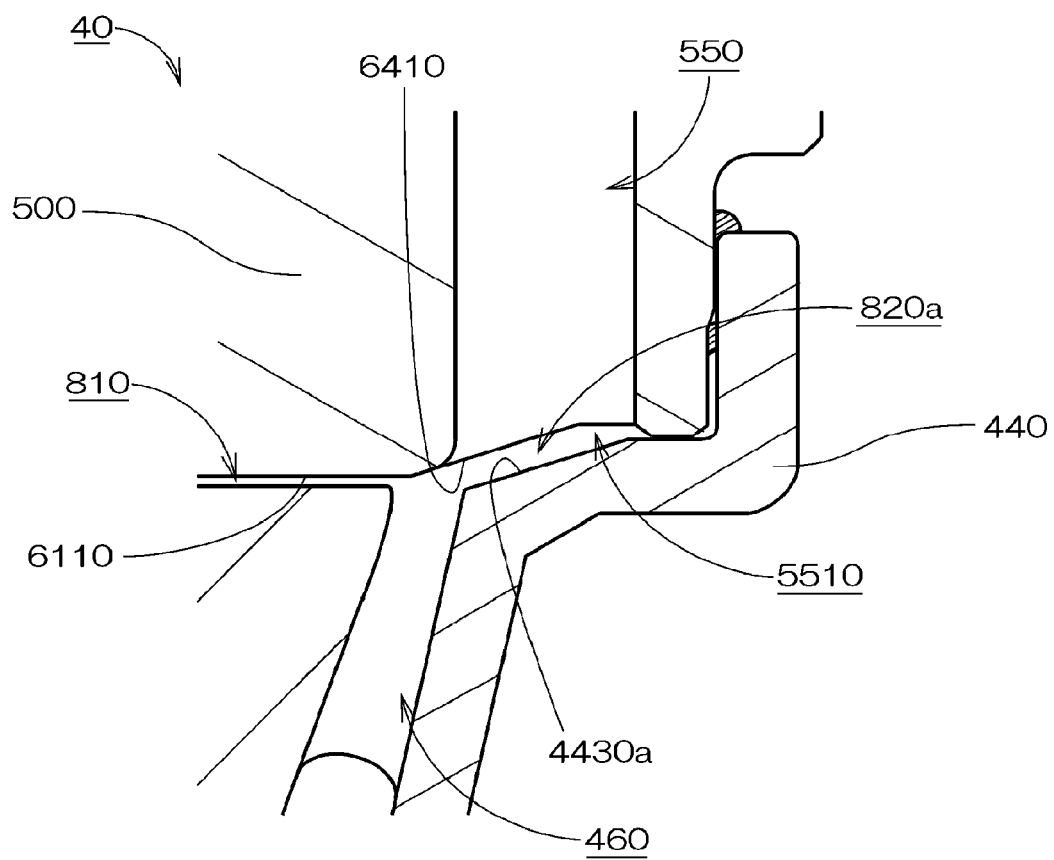
FIG. 32 is an enlarged view of a lower portion of a bearing mechanism according to another preferred embodiment of the present invention.

FIG. 32 is a diagram illustrating the bearing mechanism 40 according to an example modification of the present preferred embodiment. In this bearing mechanism 40, the annular inclined surface 6410 of the sleeve portion 500 and the first annular inclined surface 4430a of the first cover portion 440 are parallel or substantially parallel to each other, and a guide gap 820a defined between the annular inclined surface 6410 and the first annular inclined surface 4430a has a substantially constant width. The other structural features of the bearing mechanism 40 are the same as illustrated in FIG. 26. Also in the bearing mechanism 40 according to this example modification, the guide gap 820a is angled downward to smooth the flow of the lubricating oil 460 from the lower end opening 5510 of the communicating channel 550 to the first thrust gap 810, to thereby preventing any generation of a swirl. As with the sleeve portion 500 illustrated in FIG. 26, the size of the lower end surface 6110 of the sleeve portion 500 according to this example modification is so small that in manufacturing the sleeve portion 500, it is possible to machine the center bore portion 3130 and the lower end surface 6110 as illustrated in FIG. 23 at once by using the cutting tools.

Figure 33:
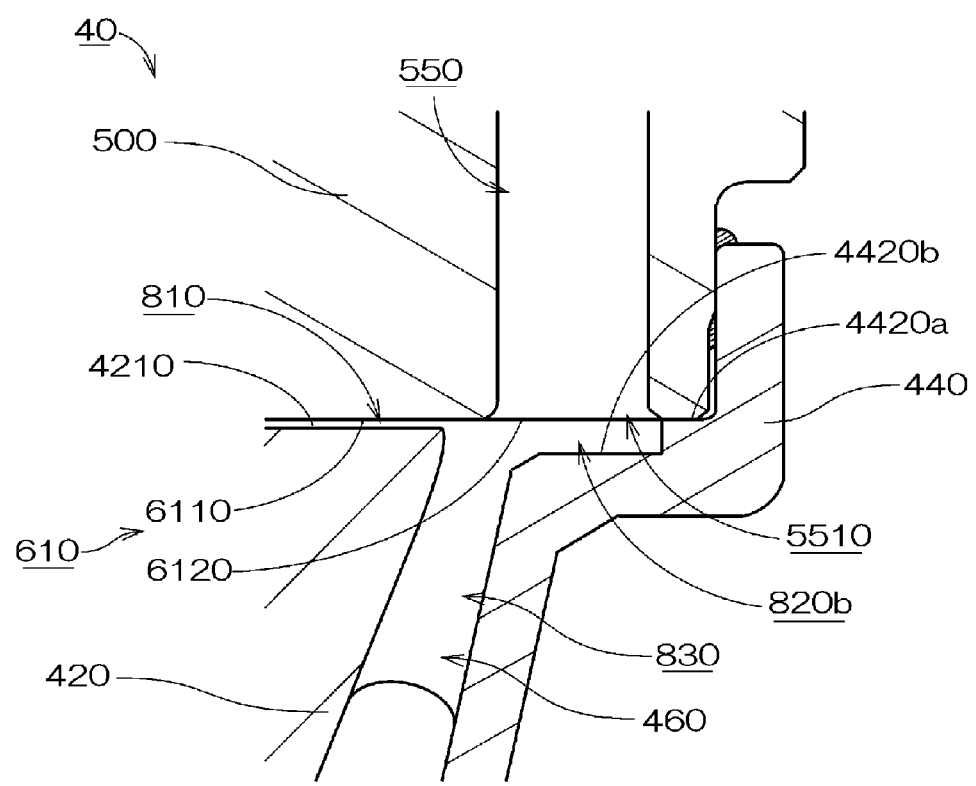
FIG. 33 is an enlarged view of a lower portion of a bearing mechanism according to yet another preferred embodiment of the present invention.

FIG. 33 is a diagram illustrating a guide gap 820b according to another example modification of the present preferred embodiment. In the first cover portion 440 according to this example modification, an annular surface 4420b perpendicular or substantially perpendicular to the central axis J1 is arranged radially inward of the annular contact surface 4420a, in place of the first annular inclined surface 4430a illustrated in FIG. 26. The annular surface 4420b is positioned at a level lower than that of the annular contact surface 4420a. In addition, the lower surface 6100 of the sleeve portion 500 is perpendicular or substantially perpendicular to the central axis J1. A portion 6110 of the lower surface 6100 which is close to the central axis J1 has defined therein the dynamic pressure grooves 6110a, as with the lower end surface 6110 illustrated in FIG. 24. The portion 6110 is arranged opposite to the upper surface 4210 of the first thrust portion 420 along a direction parallel or substantially parallel to the central axis J1, to define the first thrust gap 810 between the portion 6110 and the upper surface 4210. The lower end opening 5510 of the communicating channel 550 is positioned at the outer circumferential portion 6120 of the lower surface 610 radially outward of the first thrust gap 810. The other structural features of the bearing mechanism 40 according to this example modification are the same as those of the bearing mechanism 40 illustrated in FIG. 26.

In the bearing mechanism 40 according to this example modification, that portion of the sleeve portion 500 which is radially outward of the lower end opening 5510 is arranged in contact with the annular contact surface 4420a, so that the guide gap 820b extending perpendicularly or substantially perpendicularly to the central axis J1 is defined between the outer circumferential portion 6120 and the annular surface 4420b. A centrifugal force produced in the guide gap 820b during the drive of the motor 120 causes the pressure on the lubricating oil 460 to become lower at locations closer to the central axis J1 than at locations farther from the central axis J1. This pressure difference facilitates travel of any air bubbles toward the central axis J1, resulting in easy discharge of the air bubbles into the first tapered gap 830.

Figure 34:
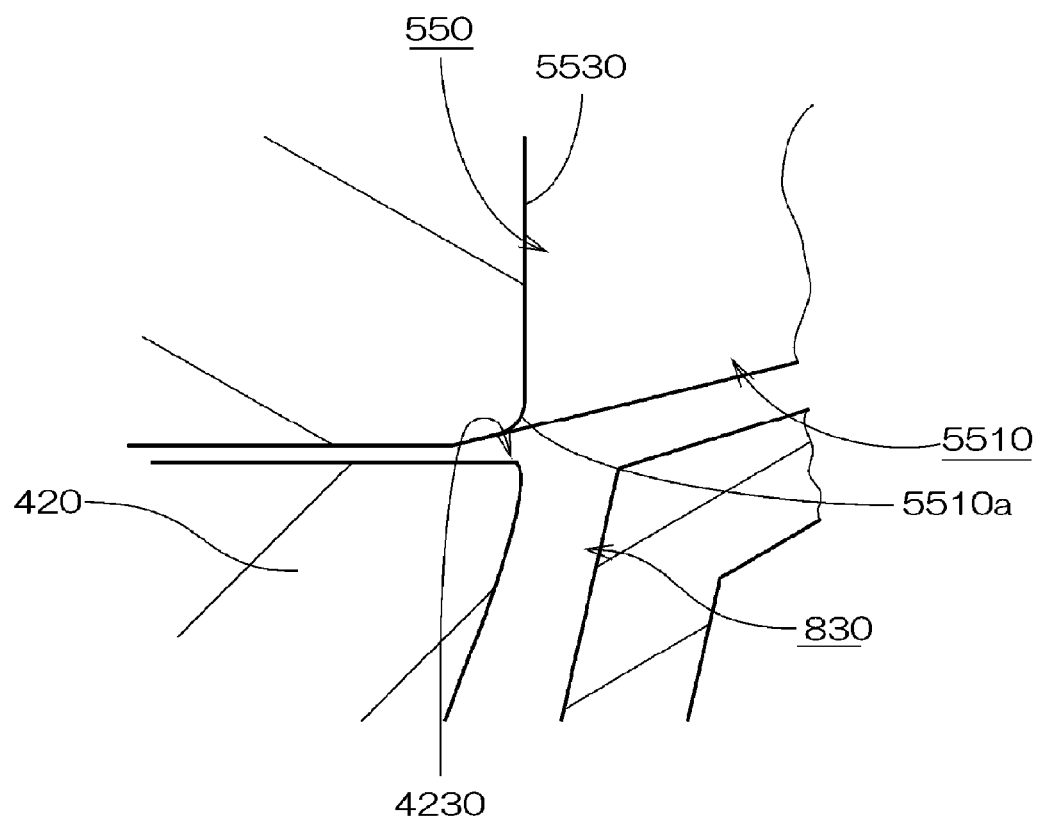
FIG. 34 is a diagram illustrating a first thrust portion according to a preferred embodiment of the present invention.

FIG. 34 is a diagram illustrating the first thrust portion 420 according to an example modification of the present preferred embodiment. The radially outermost portion 4230 of the first thrust portion 420 overlaps, in a direction parallel or substantially parallel to the central axis J1, with a radially inner portion of the chamfered portion 5510a of the lower end opening 5510. In addition, in plan view, the radially outermost portion 4230 is tangent to the wall surface 5530 of the communicating channel 550. In this case also, any air bubble traveling downward from the communicating channel 550 is allowed to travel into the first tapered gap 830 without interference of the first thrust portion 420. Note that, in plan view, the radially outermost portion 4230 may be positioned radially inward of the wall surface 5530 while overlapping with the chamfered portion 5510a.

Figure 35:
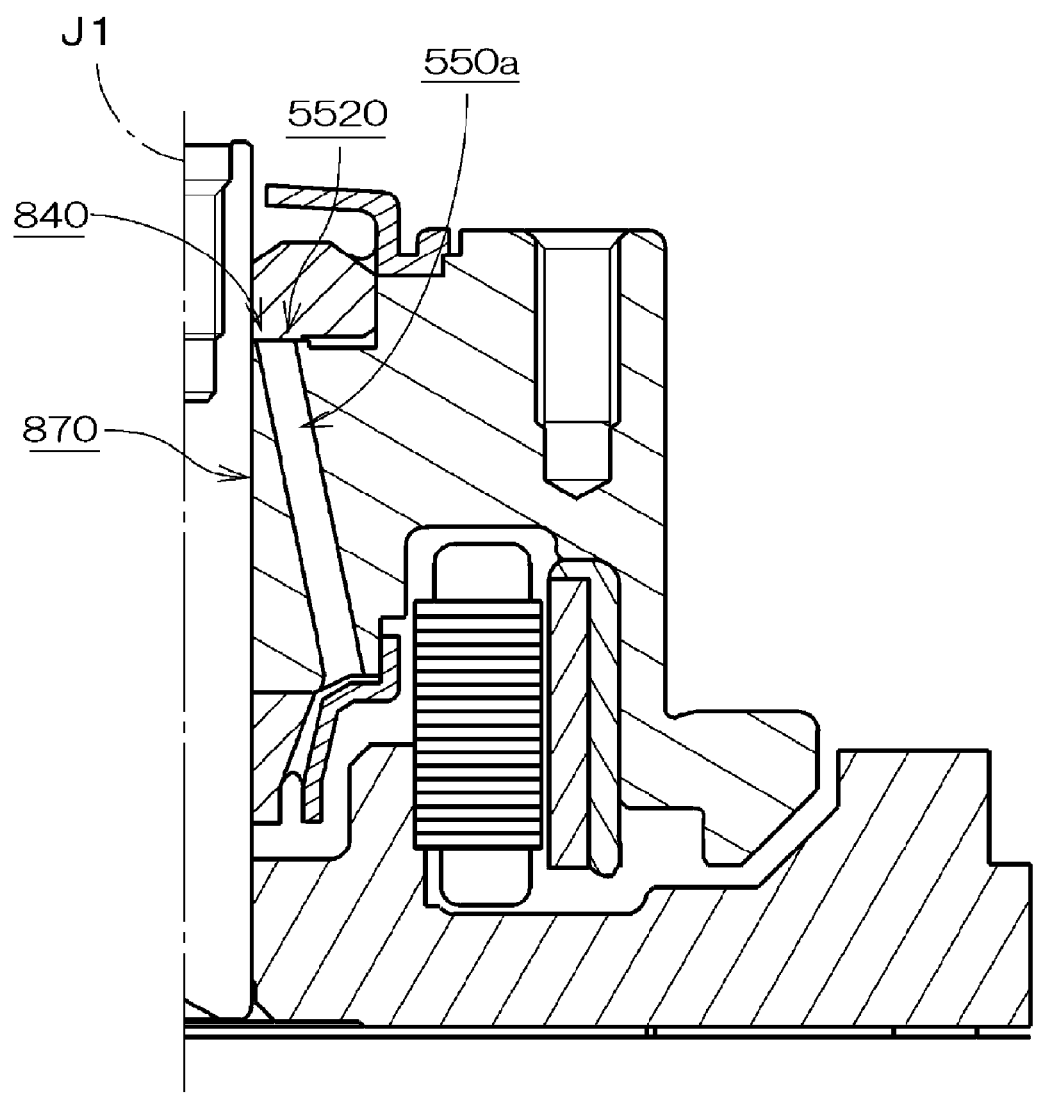
FIG. 35 is a diagram illustrating a communicating channel according to a preferred embodiment of the present invention.

FIG. 35 is a diagram illustrating a communicating channel 550a according to an example modification of the present preferred embodiment. As illustrated in FIG. 35, the communicating channel 550a gradually decreases in distance from the central axis J1 in the upward direction. An upper end opening 5520 of the communicating channel 550a is positioned in the second thrust gap 840, and the communicating channel 550a is in direct communication with the upper portion of the radial gap 870. Note that the upper end opening 5520 of the communicating channel 550 may be positioned in the radial gap 870, in other modifications of the present preferred embodiment.

While one exemplary preferred embodiment of the present invention has been described above, it is to be understood that the present invention is not limited to the above-described preferred embodiments, but that various other modifications are also possible. For example, the outside surface of the first thrust portion 420 may be a substantially cylindrical surface parallel or substantially parallel to the central axis J1, in other preferred embodiments. In this case also, when the outside diameter of the first thrust portion 420 is arranged to be smaller than the diameter of the lower end surface 6110 of the sleeve portion 500, the lubricating oil 460 is allowed to flow smoothly from the lower end opening 5510 of the communicating channel 550 into the first thrust gap 810.

In the above-described preferred embodiment, regarding the first thrust gap 810, the dynamic pressure grooves are defined on the lower end surface 6110 of the sleeve portion 500, which defines a first thrust surface. Note, however, that the dynamic pressure grooves may be defined on the upper surface 4210 of the first thrust portion 420, which defines a second thrust surface, in other preferred embodiments. Also note that the dynamic pressure grooves may be defined on both the lower end surface 6110 of the sleeve portion 500 and the upper surface 4210 of the first thrust portion 420, in other preferred embodiments. Similarly, in the above-described preferred embodiment, regarding the second thrust gap 840, the dynamic pressure grooves are defined on the upper end surface 5210 of the sleeve portion 500, which defines a third thrust surface. Note, however, that the dynamic pressure grooves may be defined on the lower surface 4310 of the second thrust portion 430, which defines a fourth thrust surface, in other preferred embodiments. Also note that the dynamic pressure grooves may be defined on both the upper end surface 5210 of the sleeve portion 500 and the lower surface 4310 of the second thrust portion 430, in other preferred embodiments.

In other preferred embodiments, the sleeve portion 500 may have defined therein an additional communicating channel extending radially from a middle portion of the inside surface 5410 thereof to the communicating channel 550, to allow the lubricating oil to flow through the first thrust gap 810, the lower portion of the radial gap 870, the additional communicating channel, and the communicating channel 550 to complete the circulation. In the bearing mechanism 40 illustrated in FIGS. 26 and 27, the lower end opening 5510 of the communicating channel 550 is arranged to extend over both the annular inclined surface 6410 and the outer annular surface 6420. Note, however, that the lower end opening 5510 may be arranged to extend over only either the annular inclined surface 6410 or the outer annular surface 6420, in other preferred embodiments. The same is true of the bearing mechanism 40 illustrated in FIG. 32. The sleeve portion 500 may have, in place of the annular inclined surface 6410, a cylindrical surface extending upward from the edge 6810 at an outer circumference of the lower end surface 6110, resulting in a shoulder portion, in other preferred embodiments. In this case also, the lubricating oil 460 is allowed to flow smoothly from the lower end opening 5510 of the communicating channel 550 into the first thrust gap 810.

Note that the sleeve portion 500 and the rotor hub 310 may be defined by separate members, in other preferred embodiments. In this case, the shape of the communicating channel 550 in a cross-section is not generally circular. Also note that the motor 120 may be mounted in an optical disk drive apparatus or other types of disk drive apparatuses, in other preferred embodiments.

Also note that the first thrust portion and/or the second thrust portion may be an integral portion of the shaft, in other preferred embodiments.

The present invention is preferably applicable to bearing mechanisms using fluid dynamic pressure. Motors including a bearing mechanism according to an embodiment of the present invention can be used as a motor for a disk drive apparatus, and also as a motor for other types of apparatuses.

While the invention has been shown and described with respect to the preferred embodiments, it will be understood by those skilled in the art that various changes and modification may be made without departing from the scope of the invention as defined in the following claims.

Figure 36:
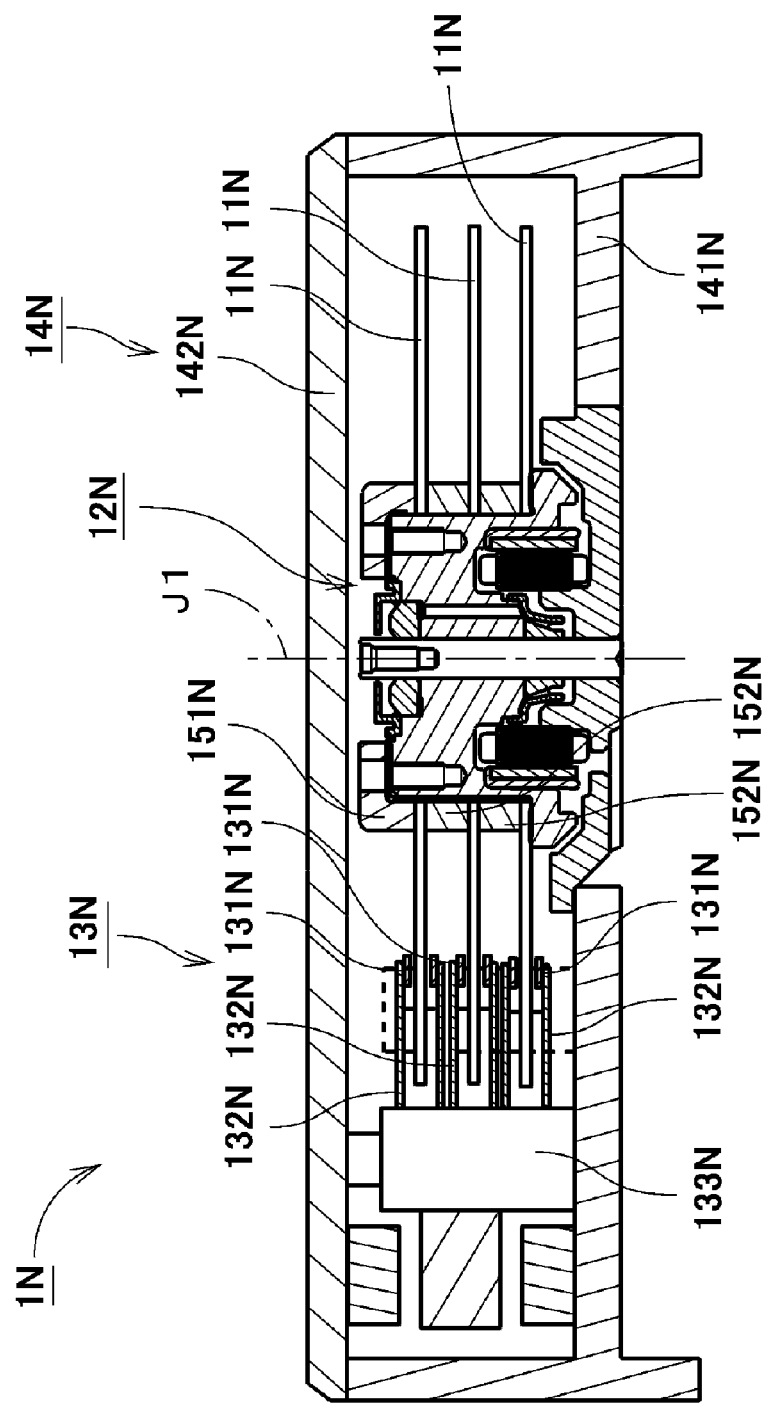
FIG. 36 is a cross-sectional view of a disk drive apparatus according to a third preferred embodiment of the present invention.

It is assumed herein with respect to the following description that a vertical direction is defined as a direction in which a central axis J1 of a spindle motor 12N extends in FIG. 36, and that an upper side and a lower side along the vertical direction are referred to simply as an "upper side" and a "lower side", respectively. It should be noted, however, that the term "vertical direction" as used herein does not necessarily refer to a vertical direction when the motor 12N has been actually installed in a device. It is also assumed herein that a circumferential direction about the central axis J1 is referred to by the terms "circumferential direction", "circumferentially", "circumferential", etc., and that a direction centered on the central axis J1 is referred to by the terms "radial direction", "radially", "radial", etc.

FIG. 36 is a vertical cross-sectional view of a disk drive apparatus 1N including the spindle motor (hereinafter refer to simply as the "motor") 12N according to a third preferred embodiment of the present invention. The disk drive apparatus 1N is a so-called hard disk drive apparatus. The disk drive apparatus 1N preferably includes three disks 11N, the motor 12N, an access portion 13N, and a housing 14N, for example. Each of the disks 11N is a flat disc-shaped member, and is arranged to have information stored therein. The motor 12N is arranged to rotate while holding the disks 11N. The access portion 13N is arranged to read and/or write information from or to the disks 11N. Note that the number of disks 11N may be greater or smaller than three if so desired.

The housing 14N preferably includes a first housing member 141N and a second housing member 142N. The second housing member 142N is substantially in the shape of a flat plate member. The motor 12N and the access portion 13N are arranged to be housed inside the first housing member 141N. In the disk drive apparatus 1N, the second housing member 142N is joined to the first housing member 141N through, for example, welding, or by some other desirable connecting method to thereby define the housing 14N. An interior space of the housing 14N is preferably hermetically sealed, and completely or substantially free from dust and debris. In addition, the interior space of the housing 14N is also preferably filled with a gas, for example, a helium gas.

The three disks 11N are arranged at substantially regular intervals in the axial direction through spacers 152N, and are clamped through a clamper 151N and the motor 12N. The access portion 13N preferably includes six heads 131N, six arms 132N, and a head actuator mechanism 133N. Each of the six arms 132N is arranged to support one of the six heads 131N. Each of the heads 131N is arranged in close proximity to an associated one of the disks 11N to magnetically read and/or write information from or to the disk 11N. The head actuator mechanism 133N is arranged to actuate each arm 132N to thereby move an associated one of the heads 131N relative to a corresponding one of the disks 11N. According to the above-described structure, each head 131N is arranged to access a desired location on a corresponding one of the rotating disks 11N while being held close to the disk 11N, to read and/or write information from or to the disk 11N.

Figure 37:
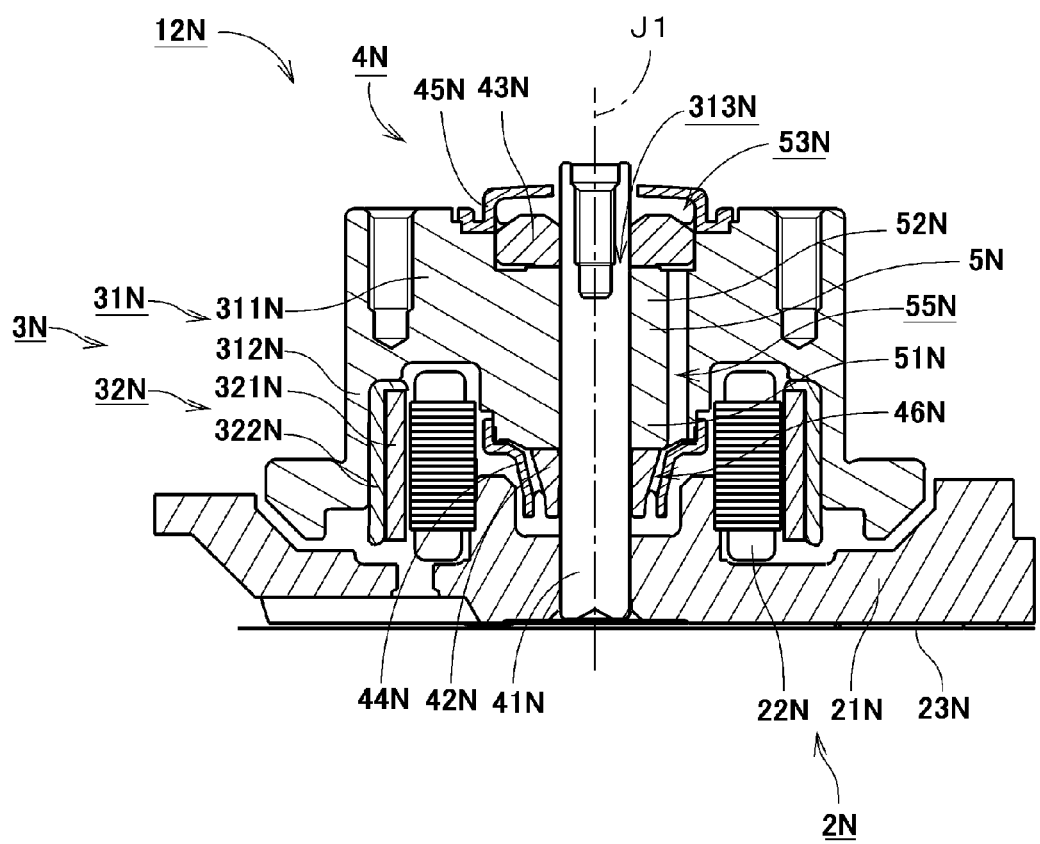
FIG. 37 is a cross-sectional view of a motor according to the third preferred embodiment of the present invention.

FIG. 37 is a vertical cross-sectional view of the motor 12N. The motor 12N is preferably an outer-rotor motor. The motor 12N includes a stationary portion 2N, a rotating portion 3N, and a fluid dynamic bearing mechanism 4N (hereinafter referred to as a "bearing mechanism 4N"). The rotating portion 3N is supported through the bearing mechanism 4N such that the rotating portion 3N is rotatable about the central axis J1 of the motor 12N with respect to the stationary portion 2N. The central axis J1 of the motor 12N is also a central axis of each of the stationary portion 2N, the rotating portion 3N, and the bearing mechanism 4N.

The stationary portion 2N includes a base bracket 21N and an annular stator 22N. The base bracket 21N is attached to the first housing member 141N illustrated in FIG. 36. The stator 22N is fixed to a circumference of a substantially cylindrical holder of the base bracket 21N. A hole portion is defined inside the holder, and a lower end portion of a shaft 41N of the bearing mechanism 4N is fixed to the hole portion. A lower end opening of the hole portion is closed by a plate 23N.

The rotating portion 3N includes a rotor hub 31N and a rotor magnet 32N. The rotor hub 31N includes a hub portion 311N and a cylindrical portion 312N. The cylindrical portion 312N is arranged to project axially downward from an outer edge portion of the hub portion 311N. The rotor magnet 32N preferably includes a substantially cylindrical rotor magnet 321N and a back iron 322N. The rotor magnet 321N is fixed to an inside of the cylindrical portion 312N with the back iron 322N therebetween. The rotor magnet 321N is arranged radially opposite the stator 22N to generate a torque between the stator 22N and the rotor magnet 321N.

A hole portion 313N extending in parallel or substantially in parallel with the central axis J1 is defined in a central portion of the hub portion 311N. Hereinafter, a portion 5N of the hub portion 311N which is close to the central axis J1 and which includes the hole portion 313N will be referred to as a "sleeve portion 5N". A portion 51N of the sleeve portion 5N which is close to a center of the sleeve portion 5N and which includes a lower end surface of the sleeve portion 5N is arranged to project downward. Hereinafter, the portion 51N will be referred to as a "bottom portion 51N". A recessed portion 53N is defined in a center of a top portion of the hub portion 311N. A bottom portion of the recessed portion 53N corresponds to a top portion 52N of the sleeve portion 5N. A shoulder portion recessed slightly downward is arranged around the recessed portion 53N. The shaft 41N is inserted into the hole portion 313N of the sleeve portion 5N. A communicating channel 55N extending through the sleeve portion 5N in the vertical direction or substantially in the vertical direction, i.e., in parallel or substantially in parallel with the central axis J1, is arranged radially outward of the hole portion 313N. A cross section of the communicating channel 55N perpendicular or substantially perpendicular to the central axis J1 preferably has the shape of a circle. Note that the shape of the cross section of the communicating channel 55N is not limited to the circle and could instead be any desirable shape.

The bearing mechanism 4N includes the shaft 41N, a first thrust portion 42N, a second thrust portion 43N, a first cover portion 44N, a second cover portion 45N, and a lubricating oil 46N. The shaft 41N is fixed to the base bracket 21N, so that the shaft 41N remains stationary while being oriented in the vertical direction along the central axis J1. The first thrust portion 42N and the second thrust portion 43N are preferably defined by substantially tubular members of mutually different shapes. Each of the first thrust portion 42N and the second thrust portion 43N is preferably made of phosphor bronze or the like, for example. The rotor hub 31N is preferably made of stainless steel or made of aluminum with a nickel plating, for example. The hardness of each of the first thrust portion 42N and the second thrust portion 43N is lower than that of the sleeve portion 5N of the rotor hub 31N.

The first thrust portion 42N is preferably press fitted, for example, and thereby fixed to the shaft 41N on a lower side of the sleeve portion 5N. The second thrust portion 43N is preferably press fitted, for example, and thereby fixed to the shaft 41N on an upper side of the sleeve portion 5N. The first cover portion 44N and the second cover portion 45N are preferably arranged to have mutually different shapes. The first cover portion 44N is attached to the bottom portion 51N of the sleeve portion 5N, and arranged opposite to an outside surface of the first thrust portion 42N. Meanwhile, the second cover portion 45N is fixed to the shoulder portion around the recessed portion 53N, and arranged to cover an upper portion of the second thrust portion 43N. In the motor 12N, the lubricating oil 46N is arranged in a gap defined between the shaft 41N and the sleeve portion 5N, a gap defined between the axially lower end surface of the sleeve portion 5N and an axially upper end surface of the first thrust portion 42N, a gap defined between an axially upper end surface of the sleeve portion 5N and an axially lower end surface of the second thrust portion 43N, a gap defined between the first thrust portion 42N and the first cover portion 44N, and a gap defined between the second thrust portion 43N and the second cover portion 45N. Moreover, the lubricating oil 46N is also provided in the communicating channel 55N.

In the motor 12N, the sleeve portion 5N defines a portion of the bearing mechanism 4N as a portion supported by the shaft 41N. That is, the sleeve portion 5N serves as both a portion of the rotating portion 3N and a portion of the bearing mechanism 4N.

Figure 38:
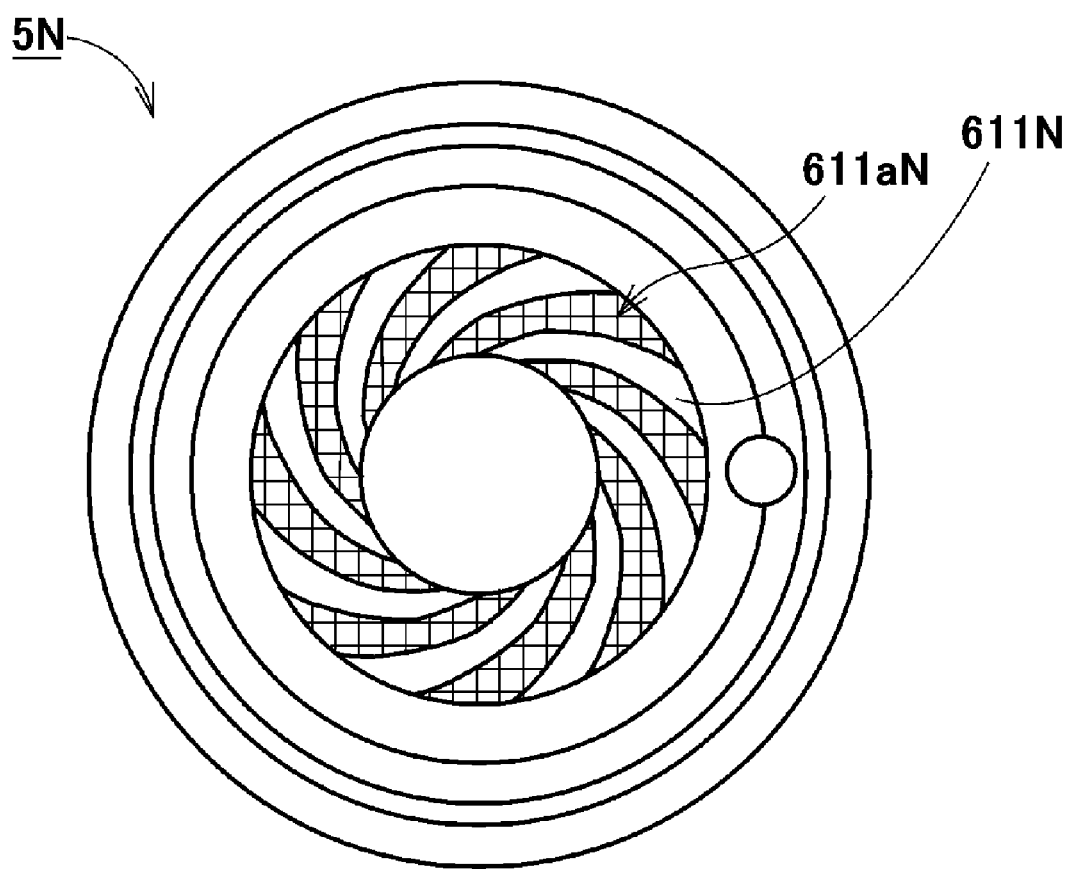
FIG. 38 is a bottom view of a sleeve portion according to the third preferred embodiment of the present invention.

FIG. 38 is an enlarged bottom view of a lower end surface 611N of the sleeve portion 5N and its vicinity. The lower end surface 611N is preferably an annular surface perpendicular or substantially perpendicular to the central axis J1. The lower end surface 611N includes dynamic pressure grooves 611aN in a spiral pattern defined therein. During driving of the motor 12N, the dynamic pressure grooves 611aN are arranged to be rotated to induce (i.e., to pump) the lubricating oil 46N to travel radially inward within the dynamic pressure grooves 611aN, so that a sufficient dynamic pressure will be generated to drive the motor 12N. This contributes to preventing the generation of an air bubble due to a reduction in pressure. Although not shown in the figures, the axially upper end surface of the sleeve portion 5N is also preferably an annular surface perpendicular or substantially perpendicular to the central axis J1. The upper end surface of the sleeve portion 5N preferably includes dynamic pressure grooves having substantially the same configuration as that of the dynamic pressure grooves 611aN illustrated in FIG. 38. More specifically, the configuration of the dynamic pressure grooves when viewed in a plan view corresponds to the configuration of the dynamic pressure grooves 611aN reversely oriented in the circumferential direction about the central axis J1.

Figure 39A:
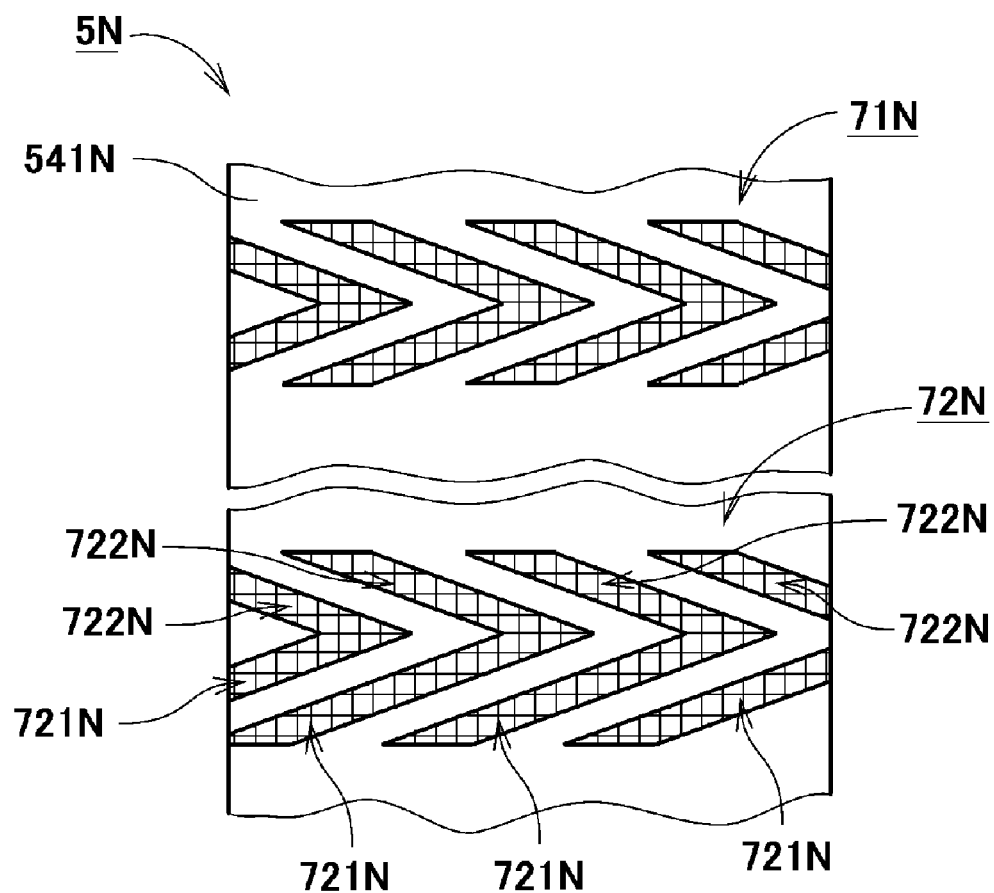
FIG. 39A is a diagram illustrating an inside surface of the sleeve portion according to the third preferred embodiment of the present invention.

Referring to FIG. 39A, an inside surface 541N of the sleeve portion 5N preferably includes dynamic pressure grooves 71N and 72N preferably in, for example, a herringbone pattern defined thereon, at an upper portion and a lower portion thereof, respectively. More specifically, the dynamic pressure grooves 71N and 72N are arranged in the circumferential direction on the inside surface 541N, such that each one of the dynamic pressure grooves 71N and 72N corresponds to the shape of the letter "V" turned sideways. Each one of the lower dynamic pressure grooves 72N includes a lower groove portion 721N longer than an upper groove portion 722N thereof. This arrangement of the dynamic pressure grooves 72N contributes to generating a pressure that acts to cause the lubricating oil 46N to flow axially upward in a radial gap described below, so that the lubricating oil 46N will then travel through the communicating channel 55N as illustrated in FIG. 37 to complete circulation.

Figure 39B:
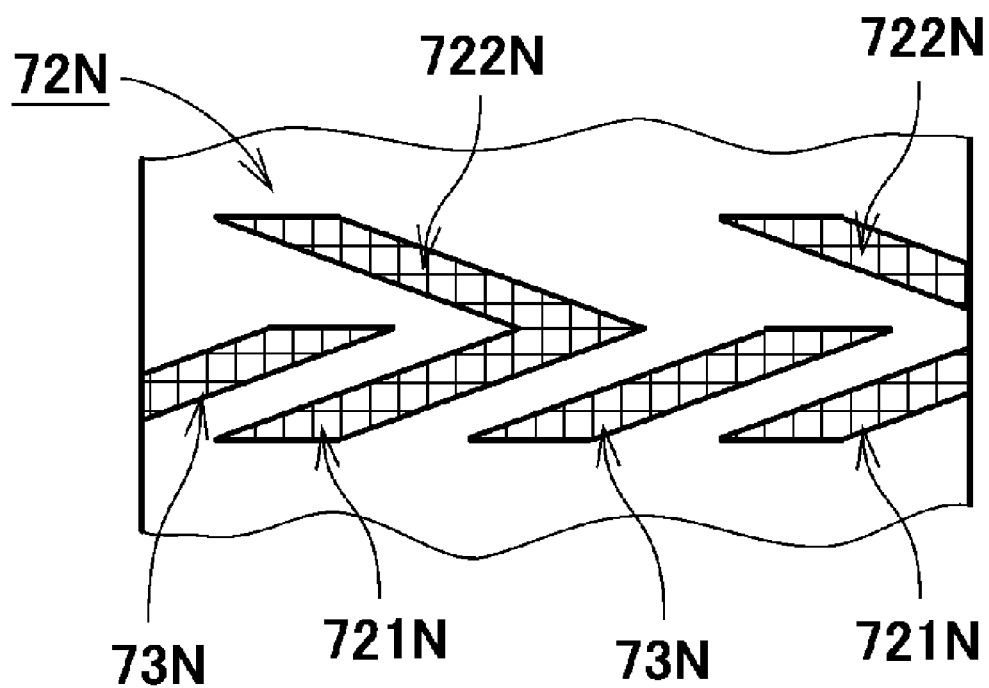
FIG. 39B is a diagram illustrating an inside surface of a sleeve portion according to another preferred embodiment of the present invention.
Figure 39C:
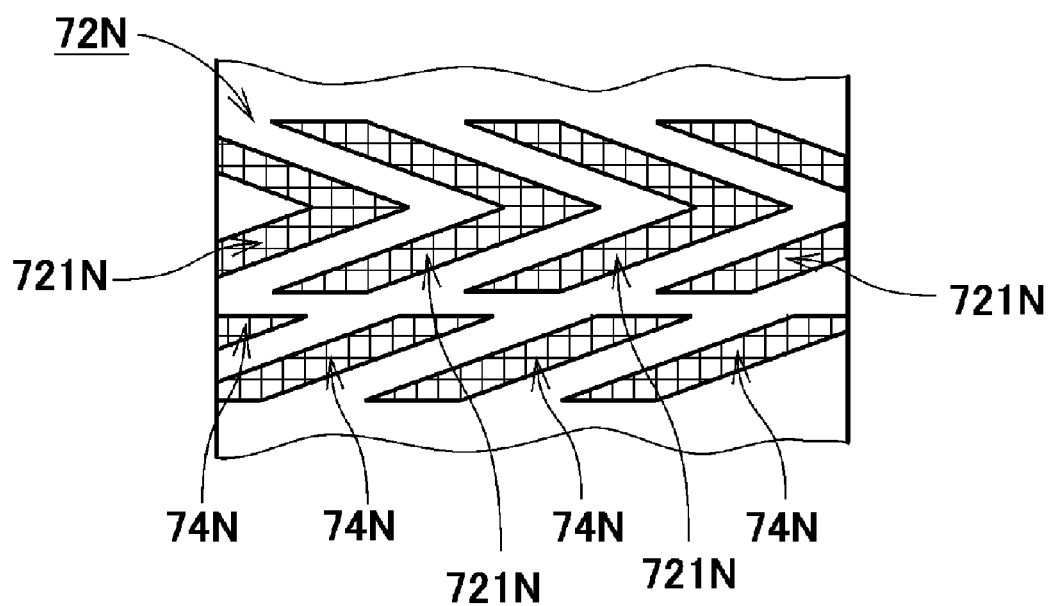
FIG. 39C is a diagram illustrating an inside surface of a sleeve portion according to yet another preferred embodiment of the present invention.

Referring to FIG. 39B, in the case where the lower groove portion 721N of each lower dynamic pressure groove 72N is arranged to have substantially the same length as that of the upper groove portion 722N thereof, an inclined groove 73N extending in parallel or substantially in parallel with the lower groove portions 721N may be arranged between each pair of adjacent lower groove portions 721N. Also, referring to FIG. 39C, an inclined groove 74N extending in parallel or substantially in parallel with the lower groove portions 721N may be arranged below each one of the lower groove portions 721N.

Figure 40:
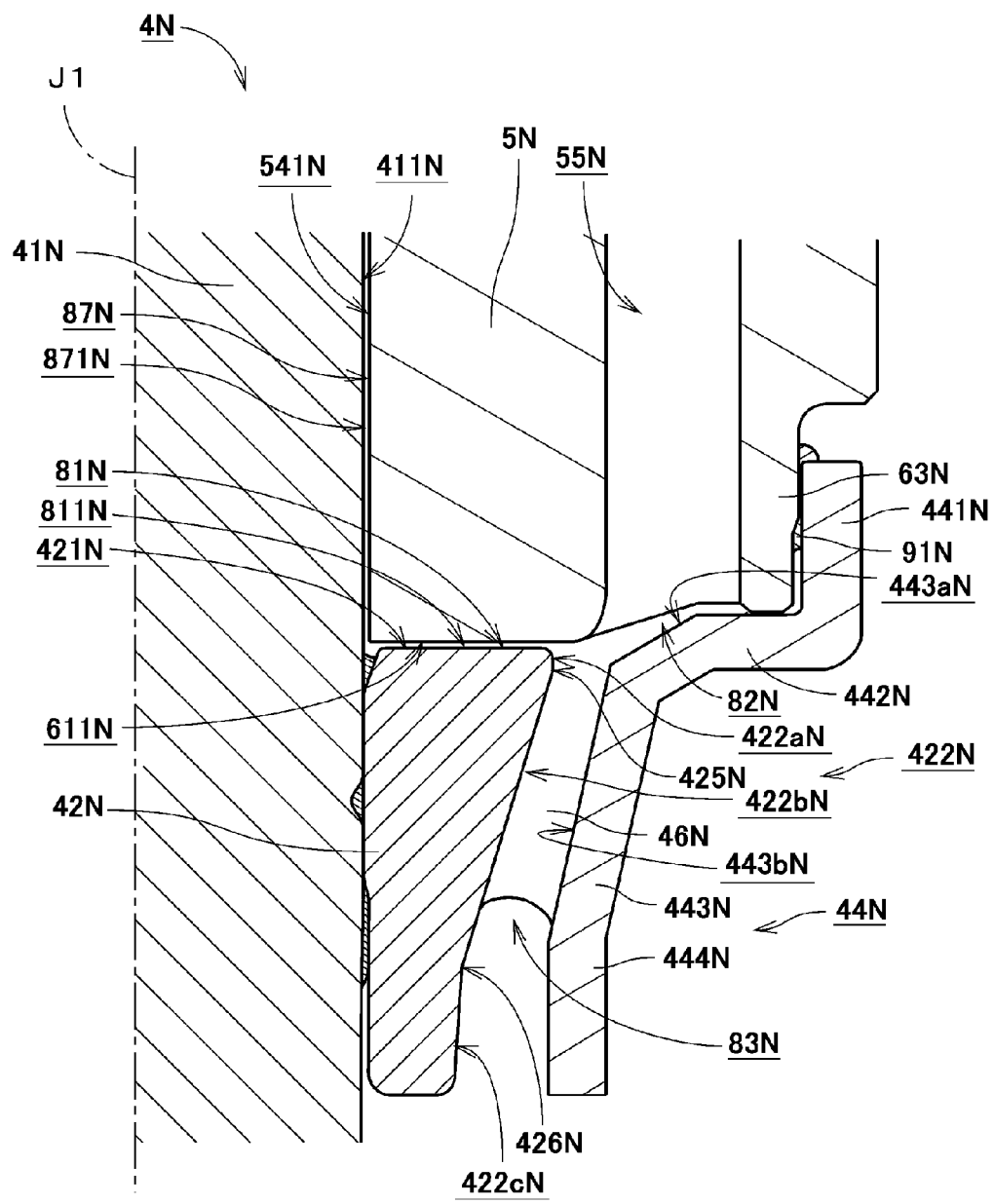
FIG. 40 is a partial cross-sectional view illustrating a lower portion of a bearing mechanism according to the third preferred embodiment of the present invention in an enlarged form.

FIG. 40 is a partial cross-sectional view illustrating a lower portion of the bearing mechanism 4N in an enlarged form. In the bearing mechanism 4N, a minute gap is defined between the inside surface 541N of the sleeve portion 5N and an outside surface 411N of the shaft 41N. This gap will be hereinafter referred to as the "radial gap". During driving of the motor 12N, the dynamic pressure grooves 71N and 72N in the herringbone pattern illustrated in FIG. 39A serve to generate a radial dynamic pressure acting on the lubricating oil 46N in the radial gap, resulting in formation of a radial bearing portion which supports the sleeve portion 5N in directions perpendicular or substantially perpendicular to the central axis J1 in relation to the shaft 41N. Hereinafter, the radial gap and the radial bearing portion will be denoted by reference symbols 87N and 871N, respectively.

An upper end surface 421N of the first thrust portion 42N is arranged opposite to the lower end surface 611N of the sleeve portion 5N. A minute gap 81N is defined between the upper end surface 421N and the lower end surface 611N. Hereinafter, the gap 81N will be referred to as a "first thrust gap 81N". A first thrust bearing portion 811N is defined in the first thrust gap 81N, and during the drive of the motor 12N, the dynamic pressure grooves 611aN in the spiral pattern illustrated in FIG. 38 serve to generate a thrust dynamic pressure acting on the lubricating oil 46N in the gap between the first thrust portion 42N and the sleeve portion 5N.

Referring to FIG. 40, an outside surface 422N of the first thrust portion 42N includes an outside surface top portion 422aN, an outside surface inclined portion 422bN, and an outside surface bottom portion 422cN. The outside surface inclined portion 422bN includes a substantially conical surface that is angled at a substantially constant angle with respect to the central axis J1 to become gradually closer to the central axis J1 with decreasing height. The outside surface top portion 422aN is arranged to extend upward from an upper end 425N of the outside surface inclined portion 422bN. The outside surface top portion 422aN includes a substantially cylindrical surface arranged to extend in parallel or substantially in parallel with the central axis J1. The outside surface bottom portion 422cN is arranged to extend downward from a lower end 426N of the outside surface inclined portion 422bN. The outside surface bottom portion 422cN includes a substantially conical surface that is angled at a substantially constant angle with respect to the central axis J1 to become gradually closer to the central axis J1 with decreasing height. The outside surface bottom portion 422cN has a different inclination angle from that of the outside surface inclined portion 422bN with respect to the central axis J1. The angle of a generatrix of the outside surface bottom portion 422cN with respect to the central axis J1 is smaller than the angle of a generatrix of the outside surface inclined portion 422bN with respect to the central axis J1. Note that the outside surface bottom portion 422cN may be a substantially cylindrical surface arranged to extend in parallel or substantially in parallel with the central axis J1.

The first cover portion 44N includes a cylindrical portion 441N, an annular portion 442N, an inclined portion 443N, and a cover bottom portion 444N. The annular portion 442N is preferably in a substantially annular shape and centered on the central axis J1. The cylindrical portion 441N is arranged to extend upward from an outer circumferential portion of the annular portion 442N in parallel or substantially in parallel with the central axis J1. The cylindrical portion 441N is preferably press fitted, for example, to a cover attachment portion 63N of the sleeve portion 5N, and fixed thereto through an adhesive 91N.

The inclined portion 443N is arranged to extend downward from an inner circumferential portion of the annular portion 442N. An inside surface of the inclined portion 443N includes a first annular inclined surface 443aN and a second annular inclined surface 443bN. The first annular inclined surface 443aN is arranged radially inward of and adjacent to an upper surface of the annular portion 442N. The second annular inclined surface 443bN is arranged radially inward of and adjacent to the first annular inclined surface 443aN. Each of the first annular inclined surface 443aN and the second annular inclined surface 443bN includes a substantially conical surface that is angled at a substantially constant angle with respect to the central axis J1 to become gradually closer to the central axis J1 with decreasing height. The inclination angle of the second annular inclined surface 443bN with respect to the central axis J1 is smaller than the inclination angle of the first annular inclined surface 443aN with respect to the central axis J1.

A minute gap 82N is defined between the first annular inclined surface 443aN and the sleeve portion 5N. During the driving of the motor 12N, the gap 82N serves to guide the lubricating oil 46N from the communicating channel 55N toward the first thrust gap 81N. Hereinafter, the gap 82N will be referred to as a "guide gap 82N". The guide gap 82N is arranged to gradually increase in width in the axially downward direction and with decreasing distance from the central axis J1.

A gap 83N is defined between the second annular inclined surface 443bN and the outside surface inclined portion 422bN of the first thrust portion 42N. The gap 83N is arranged to gradually increase in width in the axially downward direction. Hereinafter, the gap 83N will be referred to as a "first tapered gap 83N". The first tapered gap 83N has an interface of the lubricating oil 46N therewithin. In other words, both of the second annular inclined surface 443bN of the first cover portion 44N and the outside surface inclined portion 422bN of the first thrust portion 42N are arranged in contact with the interface of the lubricating oil 46N. The interface of the lubricating oil 46N is arranged at a level lower than that of a lower end 428N of an inside surface contact portion 424bN of the first thrust portion 42N illustrated in FIG. 43 described below.

Figure 41:
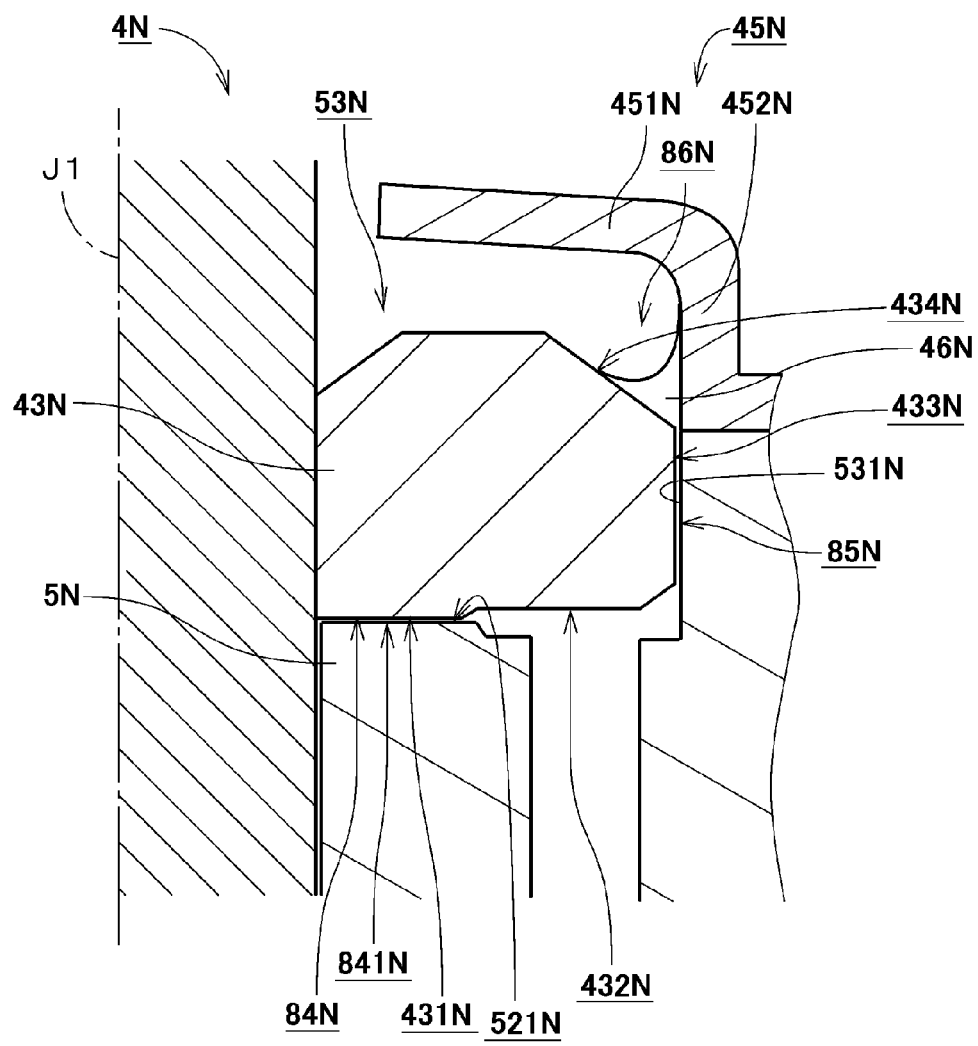
FIG. 41 is a partial cross-sectional view illustrating an upper portion of the bearing mechanism according to the third preferred embodiment of the present invention in an enlarged form.

FIG. 41 is a partial cross-sectional view illustrating an upper portion of the bearing mechanism 4N in an enlarged form. The second thrust portion 43N is preferably in a substantially annular shape and centered on the central axis J1. The second thrust portion 43N is arranged inside the recessed portion 53N of the hub portion 311N. The second thrust portion 43N includes a lower end surface 431N, an outer annular surface 432N, an outside surface 433N, and an inclined surface 434N. The lower end surface 431N includes an annular surface that is arranged to project slightly downward. The outer annular surface 432N is arranged radially outward of the lower end surface 431N. The outside surface 433N includes a substantially cylindrical surface arranged to extend in parallel or substantially in parallel with the central axis J1. The inclined surface 434N is arranged to extend from an upper end of the outside surface 433N obliquely upward toward the central axis J1.

Figure 42:
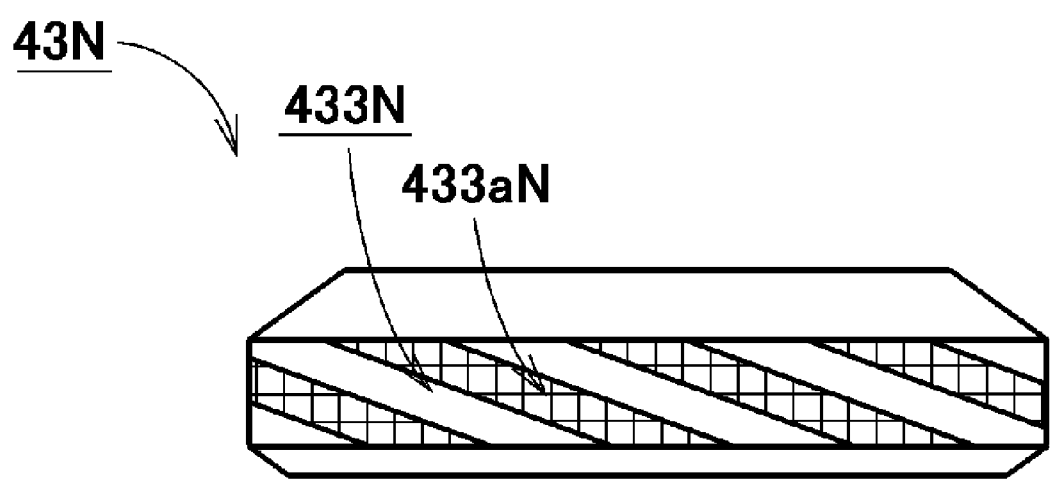
FIG. 42 is a front view of a second thrust portion according to the third preferred embodiment of the present invention.

The lower end surface 431N of the second thrust portion 43N is arranged opposite to an upper end surface 521N of the sleeve portion 5N. A minute gap 84N is defined between the upper end surface 521N and the lower end surface 431N. Hereinafter, the gap 84N will be referred to as a "second thrust gap 84N". The outside surface 433N of the second thrust portion 43N is arranged opposite to a side wall 531N of the recessed portion 53N with a gap 85N defined therebetween. Hereinafter, the gap 85N will be referred to as a "side portion gap 85N". Referring to FIG. 42, the outside surface 433N includes dynamic pressure grooves 433aN arranged to extend obliquely in the same direction defined therein.

During the drive of the motor 12N, a second thrust bearing portion 841N is defined in the second thrust gap 84N illustrated in FIG. 41, and a thrust dynamic pressure acting on the lubricating oil 46N is generated through the dynamic pressure grooves in the spiral pattern. In the side portion gap 85N, a dynamic pressure that acts to cause the lubricating oil 46N to flow downward is generated through the dynamic pressure grooves 433aN. This dynamic pressure contributes to preventing a leakage of the lubricating oil 46N through a second tapered gap 86N, as described below.

The second cover portion 45N includes a disk portion 451N and a side portion 452N. The disk portion 451N is angled slightly downward in the radially outward direction. The side portion 452N is arranged to extend downward from a radially outer end portion of the disk portion 451N. The side portion 452N and the inclined surface 434N of the second thrust portion 43N are arranged to together define the second tapered gap 86N therebetween, such that the second tapered gap 86N gradually increases in width in the axially upward direction. The second tapered gap 86N includes an interface of the lubricating oil 46N therewithin.

In the bearing mechanism 4N, the lubricating oil 46N is arranged to fill, continuously without interruption, the guide gap 82N, the first tapered gap 83N, the first thrust gap 81N, and the radial gap 87N illustrated in FIG. 40, and the second thrust gap 84N, the side portion gap 85N, the second tapered gap 86N, and the communicating channel 55N illustrated in FIG. 41.

When the sleeve portion 5N of the motor 12N is caused to rotate about the central axis J1 relative to the shaft 41N, the first thrust bearing portion 811N and the second thrust bearing portion 841N serve to support the sleeve portion 5N in the axial direction with respect to the shaft 41N. In addition, the radial bearing portion 871N serves to support the sleeve portion 5N in directions perpendicular or substantially perpendicular to the central axis J1 with respect to the shaft 41N. At this time, the lubricating oil 46N is caused to flow through the communicating channel 55N in the downward direction, and the guide gap 82N illustrated in FIG. 40 serves to direct the lubricating oil 46N from a lower end opening of the communicating channel 55N in the direction of the first tapered gap 83N and toward the first thrust gap 81N. When the lubricating oil 46N contains an air bubble, the air bubble is caused to travel through the guide gap 82N and the first tapered gap 83N to be discharged to an outside through the interface of the lubricating oil 46N. In addition, the lubricating oil 46N is caused to flow through the first thrust gap 81N to an axial bottom of the radial gap 87N, then flow through the radial gap 87N to an axial top thereof, and then to flow through the second thrust gap 84N illustrated in FIG. 41 into the communicating channel 55N.

In the bearing mechanism 4N, the shaft 41N is supported without contact with the sleeve portion 5N. Therefore, the rotating portion 3N illustrated in FIG. 37 is able to rotate with respect to the stationary portion 2N with high precision and limited noise.

Figure 43:
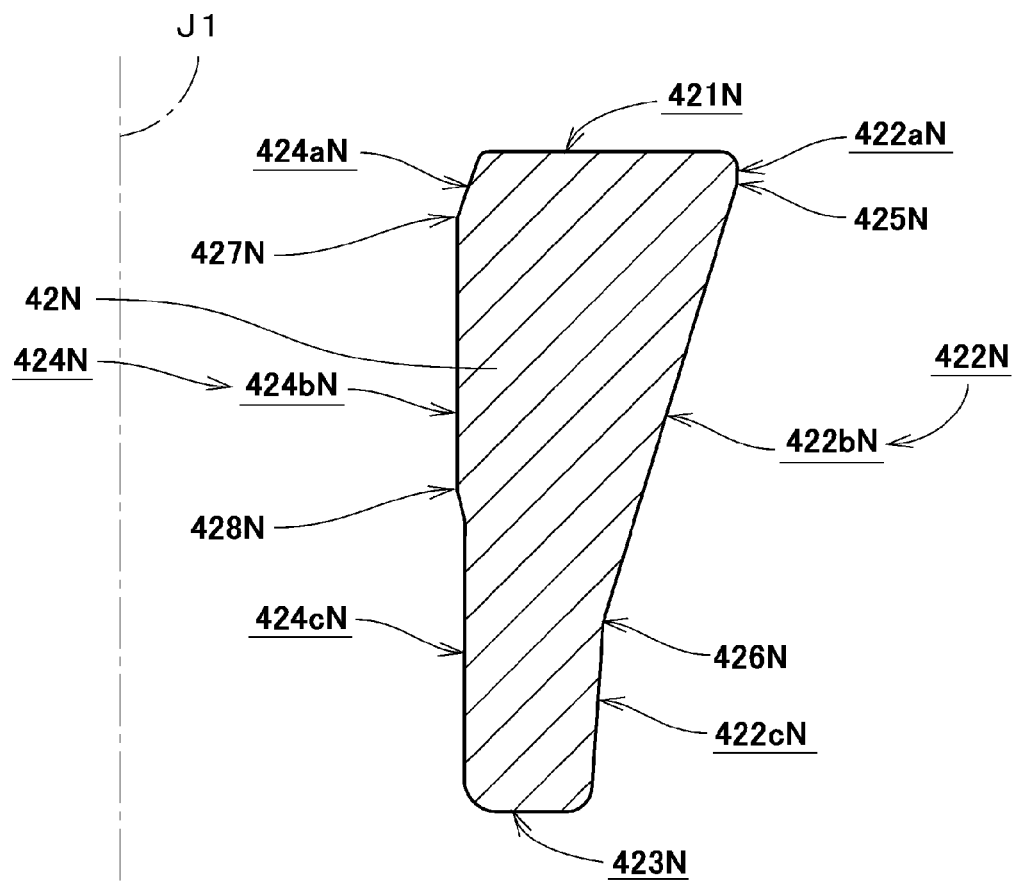
FIG. 43 is a partial cross-sectional view illustrating a first thrust portion according to the third preferred embodiment of the present invention in an enlarged form.
Figure 44:
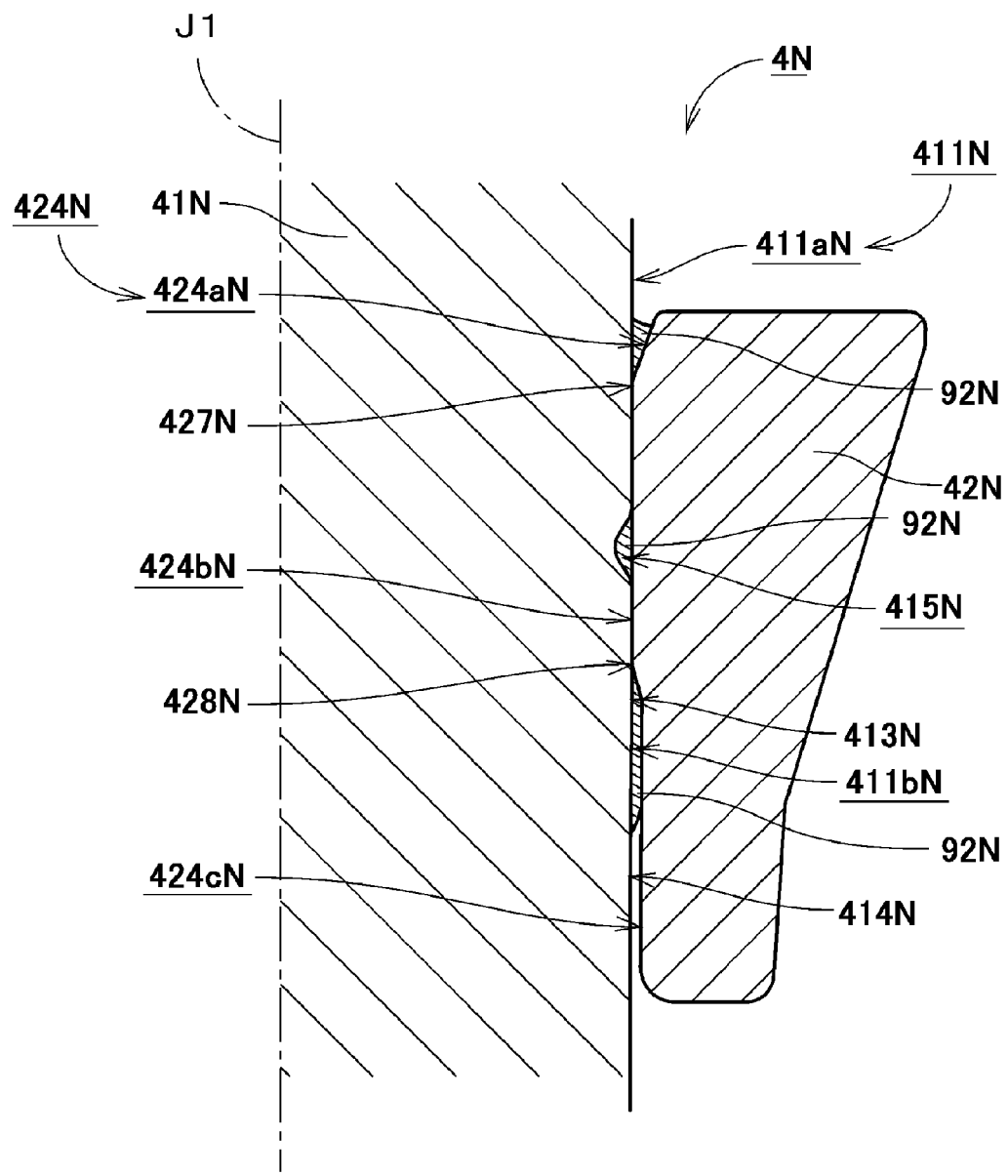
FIG. 44 is a partial cross-sectional view illustrating the first thrust portion and a portion of a shaft according to the third preferred embodiment of the present invention in an enlarged form.

FIG. 43 is a partial cross-sectional view illustrating the first thrust portion 42N in an enlarged form. FIG. 44 is a partial cross-sectional view illustrating the first thrust portion 42N and a portion of the shaft 41N in an enlarged form. An inside surface 424N of the first thrust portion 42N includes an inside surface upper non-contact portion 424aN, the inside surface contact portion 424bN, and an inside surface lower non-contact portion 424cN. Referring to FIG. 44, the inside surface contact portion 424bN of the first thrust portion 42N is arranged in direct contact with the outside surface 411N of the shaft 41N. In addition, each of the inside surface upper non-contact portion 424aN and the inside surface lower non-contact portion 424cN is spaced away from the outside surface 411N of the shaft 41N. The axial dimension of the inside surface lower non-contact portion 424cN is greater than that of the inside surface contact portion 424bN.

Referring to FIG. 43, the inside surface contact portion 424bN of the first thrust portion 42N is preferably a substantially cylindrical surface arranged to extend in parallel or substantially in parallel with the central axis J1. The inside surface upper non-contact portion 424aN is arranged to extend upward from an upper end 427N of the inside surface contact portion 424bN. The inside surface upper non-contact portion 424aN includes a substantially conical surface that is angled at a substantially constant angle with respect to the central axis J1 to become gradually more distant from the central axis J1 with increasing axial height. The inside surface lower non-contact portion 424cN is arranged to extend downward from the lower end 428N of the inside surface contact portion 424bN. The inside surface lower non-contact portion 424cN includes a substantially cylindrical surface arranged to extend in parallel or substantially in parallel with the central axis J1. In the present preferred embodiment, an upper end portion of the inside surface lower non-contact portion 424cN includes a substantially conical surface arranged to extend downward from the lower end 428N of the inside surface contact portion 424bN at a substantially constant angle to the central axis J1 to become gradually more distant from the central axis J1 with decreasing height. In addition, an entire portion of the inside surface lower non-contact portion 424cN except the upper end portion thereof is preferably defined by a cylindrical surface extending in parallel or substantially in parallel with the central axis J1. The diameter of this cylindrical surface is greater than that of the inside surface contact portion 424bN.

In the present preferred embodiment, the axial dimension of the first thrust portion 42N is preferably about 3.9 mm, for example. The axial distance between the upper end surface 421N of the first thrust portion 42N and the upper end 425N of the outside surface inclined portion 422bN is preferably about 0.2 mm, for example. The axial distance between the upper end surface 421N and the lower end 426N of the outside surface inclined portion 422bN is preferably about 2.8 mm, for example. The axial distance between the upper end surface 421N and the upper end 427N of the inside surface contact portion 424bN is preferably about 0.4 mm, for example. The axial distance between the upper end surface 421N and the lower end 428N of the inside surface contact portion 424bN is preferably about 2.0 mm, for example. Accordingly, the axial dimension of the inside surface contact portion 424bN is preferably about 1.6 mm, for example. Moreover, the axial dimension of the inside surface lower non-contact portion 424cN, i.e., the axial distance between the lower end 428N of the inside surface contact portion 424bN and a lower end surface 423N of the first thrust portion 42N is preferably about 1.9 mm, for example. In the first thrust portion 42N, the lower end 428N of the inside surface contact portion 424bN is arranged at a level higher than that of the lower end 426N of the outside surface inclined portion 422bN. In addition, the axial dimension of the inside surface contact portion 424bN is smaller than that of the inside surface lower non-contact portion 424cN.

Furthermore, the maximum diameter of the first thrust portion 42N, i.e., the diameter of the outside surface top portion 422aN, is preferably about 7.3 mm, for example. The angle defined between the generatrix of the outside surface inclined portion 422bN and the central axis J1 is preferably about 17°, for example. The angle defined between the generatrix of the outside surface bottom portion 422cN and the central axis J1 preferably is about 4°, for example. The diameter of the inside surface contact portion 424bN is preferably about 4.0 mm, for example. The diameter of the entire portion of the inside surface lower non-contact portion 424cN except the upper end portion thereof is preferably about 4.1 mm, for example. An angle defined between the central axis J1 and a generatrix of the upper end portion, which is substantially in the shape of a conical surface, of the inside surface lower non-contact portion 424cN is preferably about 15°, for example. An angle defined between the central axis J1 and a generatrix of the inside surface upper non-contact portion 424aN preferably is about 20°, for example.

Figure 45:
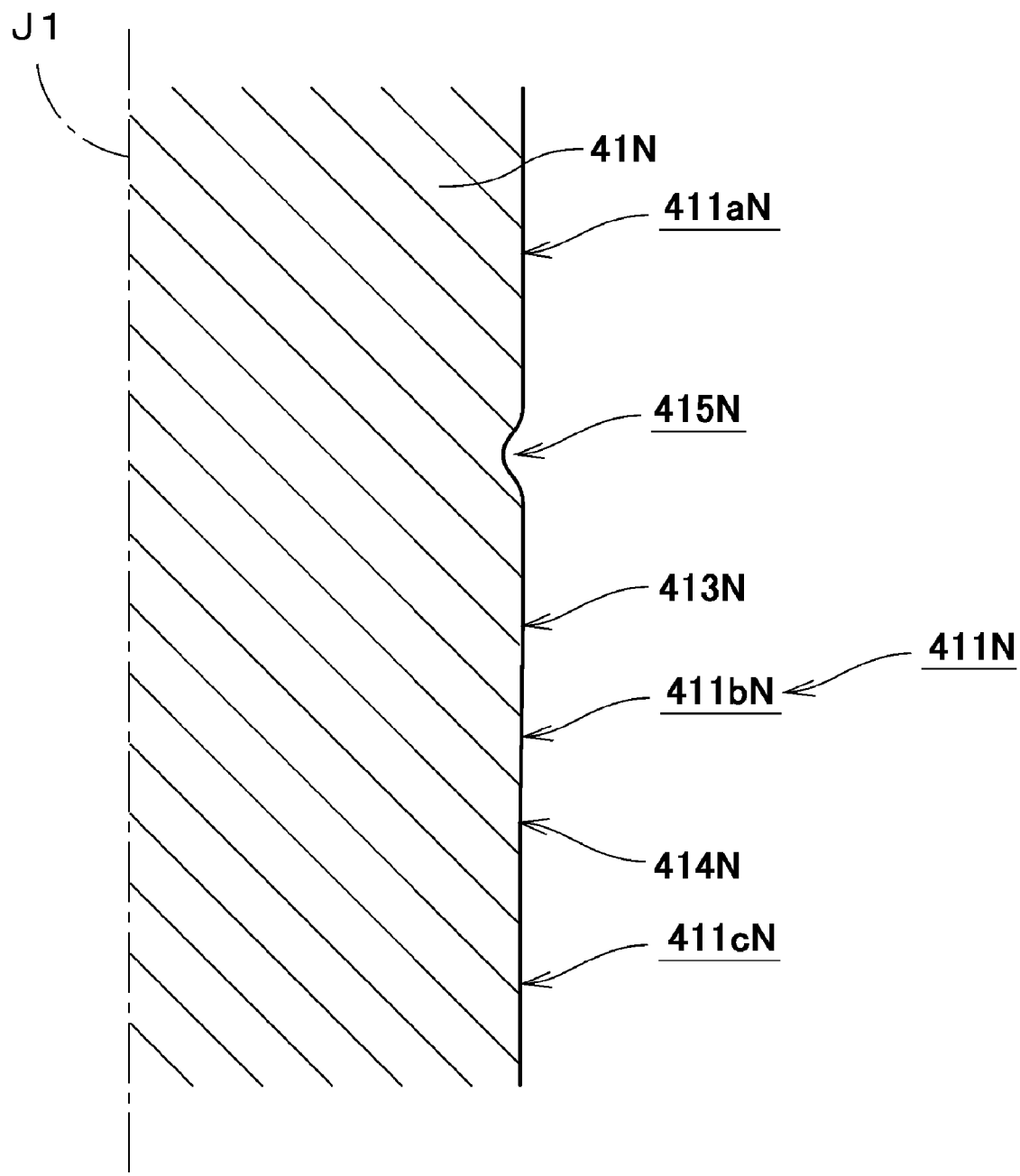
FIG. 45 is a partial cross-sectional view illustrating a portion of the shaft according to the third preferred embodiment of the present invention in an enlarged form.

FIG. 45 is a partial cross-sectional view illustrating a portion of the shaft 41N in an enlarged form. The outside surface 411N of the shaft 41N includes a first cylindrical portion 411aN, an inclined portion 411bN, and a second cylindrical portion 411cN. Each of the first and second cylindrical portions 411aN and 411cN includes a cylindrical surface arranged to extend in parallel or substantially in parallel with the central axis J1. The diameter of the first cylindrical portion 411aN is greater than that of the second cylindrical portion 411cN. The inclined portion 411bN is arranged to extend downward from a lower end 413N of the first cylindrical portion 411aN. The inclined portion 411bN includes a substantially conical surface that is angled at a substantially constant slight angle with respect to the central axis J1 so as to become gradually closer to the central axis J1 with decreasing height. The second cylindrical portion 411cN is arranged to extend downward from a lower end 414N of the inclined portion 411bN. An annular recessed portion 415N centered on the central axis J1 is defined in the first cylindrical portion 411aN.

In the present preferred embodiment, the diameter of the first cylindrical portion 411aN, except for the recessed portion 415N, is preferably about 3.99 mm, for example. The depth of the recessed portion 415N is preferably about 0.1 mm, for example. The axial dimension of the recessed portion 415N is preferably about 0.5 mm, for example. The diameter of the second cylindrical portion 411cN is preferably about 3.96 mm, for example. The axial dimension of the inclined portion 411bN, i.e., the axial distance between the lower end 413N of the first cylindrical portion 411aN and the lower end 414N of the inclined portion 411bN, is preferably about 1.0 mm, for example.

Referring to FIG. 44, the first cylindrical portion 411aN is arranged in contact with the inside surface contact portion 424bN of the first thrust portion 42N. The lower end 413N of the first cylindrical portion 411aN is arranged at a level axially lower than that of the lower end 428N of the inside surface contact portion 424bN. In other words, the inclined portion 411bN is arranged on a lower side of a region where the outside surface 411N of the shaft 41N is in contact with the inside surface contact portion 424bN of the first thrust portion 42N. In addition, an upper end of the first cylindrical portion 411aN is arranged at a level higher than that of the upper end 427N of the inside surface contact portion 424bN. Therefore, the inside surface contact portion 424bN is arranged in contact with the outside surface 411N of the shaft 41N in its entirety except for a portion thereof which is opposite to the recessed portion 415N. An area of contact between the inside surface 424N of the first thrust portion 42N and the outside surface 411N of the shaft 41N is thus increased to enable the first thrust portion 42N to be securely fixed to the shaft 41N. If the first thrust portion 42N were fixed to the shaft 41N with the inside surface contact portion 424bN arranged opposite to the inclined portion 411bN of the shaft 41N, the first thrust portion 42N might be angled with respect to the central axis J1. In the bearing mechanism 4N according to the present preferred embodiment, however, the first thrust portion 42N is prevented from being angled with respect to the central axis J1 because the inside surface contact portion 424bN is arranged axially above the inclined portion 411bN.

When the first thrust portion 42N is fixed to the shaft 41N, an adhesive 92N is applied onto the outside surface 411N of the shaft 41N such that the adhesive 92N assumes a substantially annular shape around the central axis J1. The adhesive 92N is preferably applied to a vicinity of the lower end 414N of the inclined portion 411bN. After the application of the adhesive 92N, the first thrust portion 42N is moved upward relative to the shaft 41N through a lower end of the shaft 41N to preferably be, for example, press fitted to the shaft 41N. This upward movement of the first thrust portion 42N results in a spreading the adhesive 92N, so that the adhesive 92N is spread between the inside surface 424N of the first thrust portion 42N and the outside surface 411N of the shaft 41N.

The adhesive 92N also serves as a lubricant when the first thrust portion 42N is, for example, press fitted to the shaft 41N. The first thrust portion 42N is fixed to the first cylindrical portion 411aN as a result of being press fitted to the shaft 41N. In the outside surface 411N of the shaft 41N, the inclined portion 411bN is arranged below the first cylindrical portion 411aN. The inclined portion 411bN serves as a guide when the first thrust portion 42N is press fitted to the shaft 41N. This makes it easier to press fit the first thrust portion 42N to the shaft 41N.

The adhesive 92N, which has been spread as a result of the, for example, press fit of the first thrust portion 42N, exists between the inside surface upper non-contact portion 424aN of the first thrust portion 42N and the outside surface 411N of the shaft 41N. This contributes to preventing the lubricating oil 46N from leaking through a gap between the first thrust portion 42N and the shaft 41N. In addition, the adhesive 92N also exits at a position between the inside surface lower non-contact portion 424cN and the outside surface 411N. Furthermore, the adhesive 92N also exists at a position between the inside surface contact portion 424bN and the outside surface 411N. This results in an improvement in a joining strength with which the first thrust portion 42N is joined to the shaft 41N. Furthermore, the recessed portion 415N, which is opposite to the inside surface contact portion 424bN, is filled with the adhesive 92N. This contributes to an additional improvement in the strength with which the first thrust portion 42N is joined to the shaft 41N.

In the bearing mechanism 4N, an annular recessed portion centered on the central axis J1 may be defined in the inside surface contact portion of the first thrust portion in place of the recessed portion 415N of the shaft 41N. In this case, the recessed portion defined in the inside surface contact portion is filled with the adhesive, so that an improvement in strength is achieved with which the first thrust portion 42N is joined to the shaft 41N. Furthermore, the annular recessed portion centered on the central axis J1 may be defined in the inside surface contact portion of the first thrust portion without eliminating the recessed portion 415N of the shaft 41N. In this case, an additional improvement in the strength with which the first thrust portion 42N is joined to the shaft 41N can be achieved by spacing the recessed portion 415N of the shaft 41N from the recessed portion of the inside surface contact portion in the vertical direction.

As described above, the inside surface 424N of the first thrust portion 42N includes the inside surface contact portion 424bN and the inside surface lower non-contact portion 424cN, while the outside surface 422N of the first thrust portion 42N includes the outside surface inclined portion 422bN. The lower end 428N of the inside surface contact portion 424bN is arranged at a level higher than that of the lower end 426N of the outside surface inclined portion 422bN. The inside surface 424N is thus spaced away from the shaft 41N in a lower portion of the first thrust portion 42N, which has a decreased outside diameter and is more likely to experience a deformation at the time of the, for example, press fitting. This contributes to preventing a deformation of the first thrust portion 42N at the time of the press fitting. This in turn contributes to an improvement in perpendicularity of the upper end surface 421N of the first thrust portion 42N with respect to the outside surface 411N of the shaft 41N.

The structure as described above is particularly suitable for a thrust portion shaped so as to experience a deformation relatively easily at the time of the press fit, that is, a thrust portion that has a relatively great axial dimension for its thickness. In order to hold a sufficient amount of the lubricating oil 46N in the motor 12N, the outside surface bottom portion 422cN is arranged below the outside surface inclined portion 422bN of the first thrust portion 42N, with a corresponding increase in the axial dimension of the first thrust portion 42N. Therefore, the structure as described above, which contributes to preventing a deformation at the time of the press fit, is particularly suitable for the first thrust portion 42N including the outside surface bottom portion 422cN.

It is assumed here that the axial dimension of the inside surface lower non-contact portion 424cN of the first thrust portion 42N is denoted by the character "B", that the axial dimension of the entire first thrust portion 42N is denoted by the character "A", that the effective width of the upper end surface 421N of the first thrust portion 42N is denoted by the character "L", and that the effective width of the lower end surface 423N of the first thrust portion 42N is denoted by the character "R". Then, it is preferable that B/A should be greater than the square of R/L (i.e., $(R/L)^2$). In this case, an additional improvement is achieved in the perpendicularity of the upper end surface 421N of the first thrust portion 42N with respect to the outside surface 411N of the shaft 41N.

Note that the effective width L of the upper end surface 421N refers to a half of a difference between the outside diameter and the inside diameter of the upper end surface 421N, which is defined by a substantially annular surface. When the outside diameter and the inside diameter of the upper end surface 421N are determined, chamfered portions defined radially outward and inward of the upper end surface 421N are not considered to constitute portions of the upper end surface 421N. Also note that the effective width R of the lower end surface 423N refers to a half of a difference between the outside diameter and the inside diameter of the lower end surface 423N, which is defined by a substantially annular surface. When the outside diameter and the inside diameter of the lower end surface 423N are determined, chamfered portions defined radially outward and inward of the lower end surface 423N are not considered to constitute portions of the lower end surface 423N.

Moreover, because the axial dimension of the inside surface lower non-contact portion 424cN of the first thrust portion 42N is greater than that of the inside surface contact portion 424bN thereof, the probability of a deformation of the first thrust portion 42N is additionally reduced. This contributes to an additional improvement in the perpendicularity of the upper end surface 421N of the first thrust portion 42N with respect to the outside surface 411N of the shaft 41N.

Figure 46:
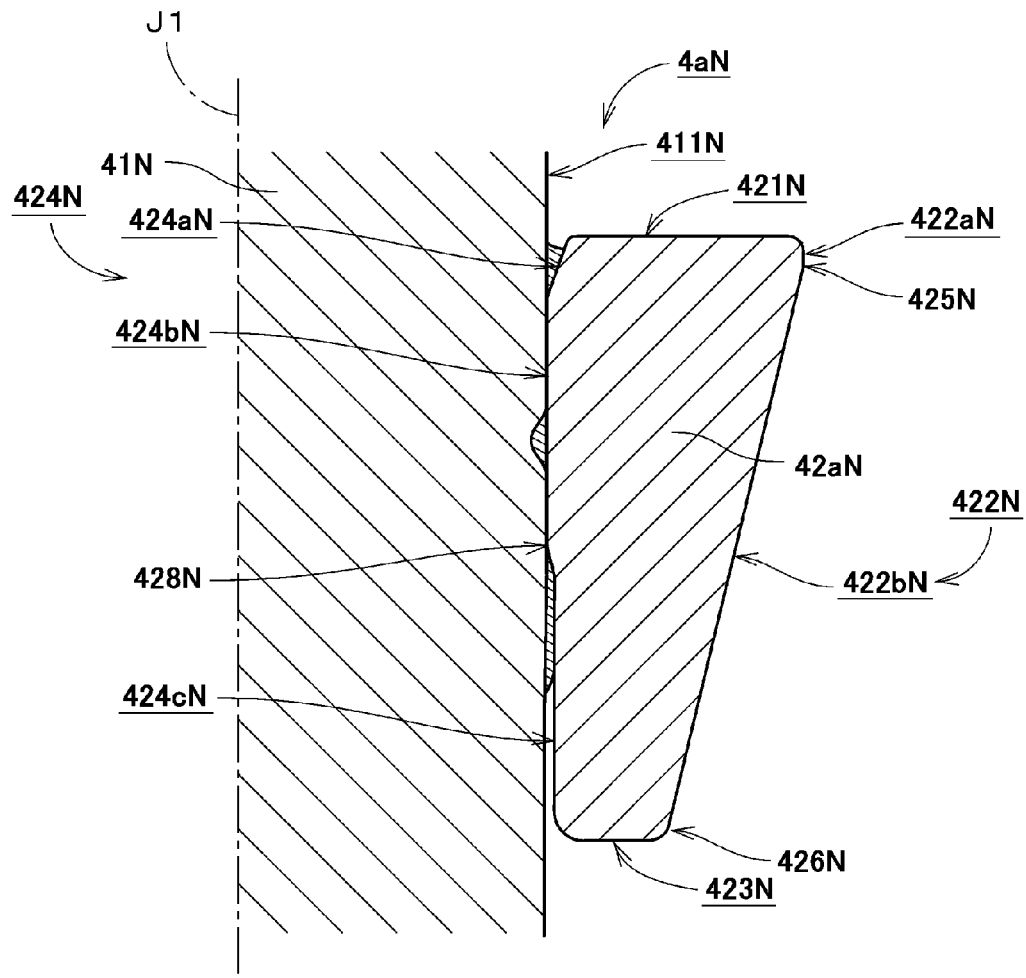
FIG. 46 is a partial cross-sectional view illustrating a lower portion of a bearing mechanism in a motor according to a fourth preferred embodiment of the present invention in an enlarged form.

FIG. 46 is a partial cross-sectional view illustrating a lower portion of a bearing mechanism 4aN in a motor according to a fourth preferred embodiment of the present invention in an enlarged form. In the bearing mechanism 4aN, a first thrust portion 42aN having a different shape from that of the first thrust portion 42N illustrated in FIG. 44 is preferably, for example, press fitted and thereby fixed to the shaft 41N. The motor according to the fourth preferred embodiment is otherwise similar in structure to the motor 12N illustrated in FIG. 37, and the same reference symbols as used in the description of the motor 12N will be used where appropriate in the description of the motor according to the fourth preferred embodiment.

Referring to FIG. 46, in the first thrust portion 42aN, the outside surface inclined portion 422bN is arranged to extend over almost an entire axial extent of the outside surface 422N. Specifically, the outside surface 422N includes the outside surface top portion 422aN and the outside surface inclined portion 422bN. The outside surface top portion 422aN is arranged to extend upward from the upper end 425N of the outside surface inclined portion 422bN until it reaches the vicinity of the upper end surface 421N of the first thrust portion 42aN. The outside surface inclined portion 422bN includes a substantially conical surface that is angled at a substantially constant angle with respect to the central axis J1 to become gradually closer to the central axis J1 with decreasing height. The lower end 426N of the outside surface inclined portion 422bN is located in the vicinity of the lower end surface 423N of the first thrust portion 42aN.

The shape of the inside surface 424N of the first thrust portion 42aN is substantially similar to that of the inside surface 424N of the first thrust portion 42N illustrated in FIG. 43. The inside surface 424N of the first thrust portion 42aN includes the inside surface upper non-contact portion 424aN, the inside surface contact portion 424bN, and the inside surface lower non-contact portion 424cN. The lower end 428N of the inside surface contact portion 424bN is arranged at an axial level higher than that of the lower end 426N of the outside surface inclined portion 422bN. In the bearing mechanism 4aN, as well as in the bearing mechanism 4N, the inside surface 424N is spaced away from the shaft 41N in an axially lower portion of the first thrust portion 42aN so that a deformation of the first thrust portion 42aN can be prevented. This contributes to an improvement in the perpendicularity of the upper end surface 421N of the first thrust portion 42aN with respect to the outside surface 411N of the shaft 41N. Moreover, because the axial dimension of the inside surface lower non-contact portion 424cN is greater than that of the inside surface contact portion 424bN, the probability of a deformation of the first thrust portion 42aN is additionally reduced.

While preferred embodiments of the present invention have been described above, the present invention is not limited to the above-described preferred embodiments, but a variety of modifications are possible.

For example, the first thrust portion may be tight fitted and thereby fixed to the shaft not through the press fit but by other methods such as, for example, a shrink fit. Also in that case, the first thrust portion shaped as described above contributes to an improvement in the perpendicularity of the upper end surface of the first thrust portion with respect to the outside surface of the shaft.

Figure 47:
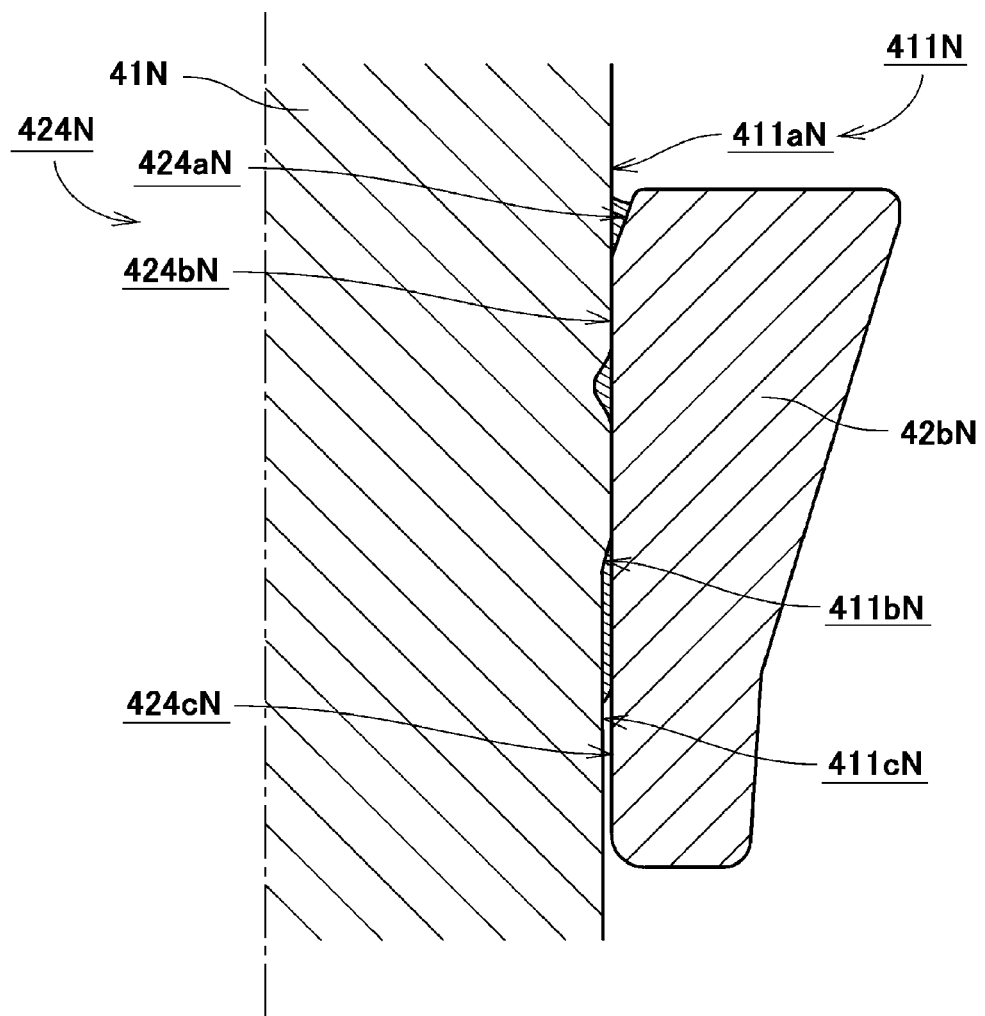
FIG. 47 is a partial cross-sectional view illustrating a bearing mechanism in a motor according to another preferred embodiment of the present invention.

In the first thrust portion 42N, the diameter of the inside surface lower non-contact portion 424cN is greater than that of the inside surface contact portion 424bN. However, referring to FIG. 47, the inside surface contact portion 424bN and the inside surface lower non-contact portion 424cN of a first thrust portion 42bN according to another preferred embodiment of the present invention may be defined by substantially cylindrical surfaces having substantially the same diameter. In other words, the entire inside surface 424N of the first thrust portion 42bN except for the inside surface upper non-contact portion 424aN is defined by a substantially cylindrical surface having a substantially constant diameter. A portion of the substantially cylindrical surface which is arranged in contact with the first cylindrical portion 411aN of the outside surface 411N of the shaft 41N defines the inside surface contact portion 424bN, while a portion of the substantially cylindrical surface which is arranged opposite to and spaced away from the inclined portion 411bN and the second cylindrical portion 411cN defines the inside surface lower non-contact portion 424cN.

In the first thrust gap 81N, the dynamic pressure grooves 611aN are defined in the lower end surface 611N of the sleeve portion 5N. Note, however, that dynamic pressure grooves may be defined in the axially upper end surface of the first thrust portion. Also note that the dynamic pressure grooves may be defined in both the axially lower end surface of the sleeve portion and the axially upper end surface of the first thrust portion. Similarly, note that, in the second thrust gap 84N, dynamic pressure grooves may be defined in the axially lower end surface of the second thrust portion, instead of in the upper end surface 521N of the sleeve portion 5N. Also note that the dynamic pressure grooves may be defined in both the axially upper end surface of the sleeve portion and the axially lower end surface of the second thrust portion.

In the preferred embodiments described above, the first thrust portion 42N or 42aN is arranged between the sleeve portion 5N and the base bracket 21N. Note, however, that the structure of the first thrust portion 42N or 42aN may be applied to the thrust portion that is arranged on the upper side of the sleeve portion, i.e., on an opposite side of the sleeve portion with respect to the base bracket.

In this case, a side on which the base bracket is arranged with respect to the sleeve portion in a direction parallel or substantially parallel to the central axis is considered as the upper side, while the opposite side is considered as the lower side. In addition, the inside surface of the thrust portion includes an inside surface contact portion and an inside surface lower non-contact portion. In other words, the inside surface of the thrust portion includes an inside surface contact portion defined by a substantially cylindrical surface arranged in contact with the outside surface of the shaft, and an inside surface non-contact portion arranged to extend from an end of the inside surface contact portion away from the sleeve portion in a direction away from the sleeve portion. The probability of a deformation of the thrust portion is thereby reduced, and an improvement is achieved in the perpendicularity of the end surface of the thrust portion with respect to the outside surface of the shaft.

The sleeve portion and the rotor hub may be defined by separate members in modifications of the above-described preferred embodiments. Motors according to other preferred embodiments of the present invention may be installed in other types of disk drive apparatuses such as, for example, optical disk drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fluid dynamic bearing mechanism comprising:
 a stationary shaft arranged to extend in a vertical direction along a central axis;
 a sleeve portion arranged to rotate with respect to the shaft;
 a tubular thrust portion fixed to the shaft on a lower side of the sleeve portion, and including an upper end surface arranged opposite to a lower end surface of the sleeve portion;
 a cover portion attached to the sleeve portion and arranged opposite to an outside surface of the thrust portion; and
 a lubricating oil; wherein
 the shaft and the sleeve portion are arranged together to define a radial gap therebetween, the lower end surface of the sleeve portion and the upper end surface of the thrust portion are arranged together to define a thrust gap therebetween, and the lubricating oil is arranged in the radial gap, the thrust gap, and a gap between the thrust portion and the cover portion;
 the radial gap includes a radial bearing portion arranged to generate a radial dynamic pressure acting on the lubricating oil through a dynamic pressure groove;
 the thrust gap includes a thrust bearing portion arranged to generate a thrust dynamic pressure acting on the lubricating oil through a dynamic pressure groove;
 the cover portion and the outside surface of the thrust portion are arranged together to define a tapered gap therebetween, the tapered gap gradually increasing in width in a downward direction, and including an interface of the lubricating oil located therein;
 the thrust portion is fixed to the shaft;
 an inside surface of the thrust portion includes:
 an inside surface contact portion arranged in direct contact with an outside surface of the shaft; and
 an inside surface lower non-contact portion spaced away from the outside surface of the shaft, and arranged to extend downward from a lower end of the inside surface contact portion;
 the outside surface of the thrust portion includes an outside surface inclined portion defined by a substantially conical surface arranged to become gradually closer to the central axis with decreasing height, and arranged in contact with the interface of the lubricating oil; and
 the lower end of the inside surface contact portion is arranged at a level higher than that of a lower end of the outside surface inclined portion.

2. The fluid dynamic bearing mechanism according to claim 1, wherein the outside surface of the thrust portion further includes an outside surface bottom portion arranged to extend downward from the lower end of the outside surface inclined portion.

3. The fluid dynamic bearing mechanism according to claim 2, wherein the outside surface bottom portion is defined by a cylindrical surface arranged to extend in parallel or substantially in parallel with the central axis.

4. The fluid dynamic bearing mechanism according to claim 2, wherein the outside surface bottom portion is defined by a substantially conical surface arranged to become gradually closer to the central axis with decreasing height, and having a different inclination angle from that of the outside surface inclined portion with respect to the central axis.

5. The fluid dynamic bearing mechanism according to claim 1, wherein the outside surface inclined portion of the thrust portion is arranged to extend over almost all of an entire axial extent of the outside surface of the thrust portion.

6. The fluid dynamic bearing mechanism according to claim 1, further comprising an adhesive arranged between the inside surface contact portion of the thrust portion and the outside surface of the shaft.

7. The fluid dynamic bearing mechanism according to claim 6, wherein one of the inside surface of the thrust portion and the outside surface of the shaft includes a recessed portion including the adhesive arranged therein.

8. The fluid dynamic bearing mechanism according to claim 7, wherein
 the inside surface of the thrust portion further includes an inside surface upper non-contact portion;
 the inside surface upper non-contact portion includes a substantially conical surface arranged to extend upward from an upper end of the inside surface contact portion while becoming gradually more distant from the central axis with increasing height; and
 an adhesive is arranged between the inside surface upper non-contact portion and the outside surface of the shaft.

9. The fluid dynamic bearing mechanism according to claim 6, wherein the inside surface of the thrust portion further includes an inside surface upper non-contact portion;

the inside surface upper non-contact portion includes a substantially conical surface arranged to extend upward from an upper end of the inside surface contact portion while becoming gradually more distant from the central axis with increasing height; and an adhesive arranged is between the inside surface upper non-contact portion and the outside surface of the shaft.

10. The fluid dynamic bearing mechanism according to claim 1, wherein the outside surface of the shaft includes an inclined portion; and the inclined portion includes a substantially conical surface arranged to become gradually closer to the central axis with decreasing height, the substantially conical surface being arranged on a lower side of a region where the outside surface of the shaft is in contact with the inside surface contact portion of the thrust portion.

11. The fluid dynamic bearing mechanism according to claim 1, wherein the sleeve portion includes a communicating channel arranged to extend through the sleeve portion from an upper surface to a lower surface of the sleeve portion, and arranged to be in communication with an upper portion of the radial gap;

the communicating channel has the lubricating oil arranged therein;

an end opening of the communicating channel is arranged in an outer circumferential portion of the lower surface of the sleeve portion arranged radially outward of the thrust gap;

a radially outermost portion of the outside surface of the thrust portion is arranged, in plan view, to be either tangent to a wall surface of the communicating channel, or closer to the central axis than the wall surface is to the central axis; and the sleeve portion and the cover portion are arranged to together define a guide gap therebetween, the guide gap being arranged to direct the lubricating oil from the end opening of the communicating channel in a direction of the tapered gap and toward the thrust gap.

12. The fluid dynamic bearing mechanism according to claim 11, wherein the cover portion includes a first annular inclined surface and a second annular inclined surface;

the guide gap is defined between the sleeve portion and the first annular inclined surface; and the tapered gap is defined between the second annular inclined surface and the outside surface of the thrust portion.

13. A motor comprising:

the fluid dynamic bearing mechanism of claim 1;

a stationary portion including the stationary shaft; and a rotating portion including the sleeve portion.

14. A disk drive apparatus comprising:

the motor of claim 13 arranged to rotate a disk;

an access portion arranged to perform at least one of reading and writing of information from or to the disk; and a housing arranged to contain the motor and the access portion.

* * * * *